(12) United States Patent
Zupanick et al.

(10) Patent No.: US 7,360,595 B2
(45) Date of Patent: Apr. 22, 2008

(54) METHOD AND SYSTEM FOR UNDERGROUND TREATMENT OF MATERIALS

(75) Inventors: Joseph A. Zupanick, Pineville, WV (US); Monty H. Rial, Dallas, TX (US)

(73) Assignee: CDX GAS, LLC, Dallas, TX (US)

( * ) Notice: Subject to any disclaimer, the term of this patent is extended or adjusted under 35 U.S.C. 154(b) by 0 days.

(21) Appl. No.: 10/142,817

(22) Filed: May 8, 2002

(65) Prior Publication Data

US 2005/0087340 A1 Apr. 28, 2005

(51) Int. Cl.
*E21B 43/30* (2006.01)
*E21B 43/12* (2006.01)

(52) U.S. Cl. .................... 166/245; 166/50; 166/52; 166/268; 166/279

(58) Field of Classification Search ............ 166/268, 166/270–270.2, 400–403, 272.1–272.7, 269, 166/275, 279, 310, 50, 313
See application file for complete search history.

(56) References Cited

U.S. PATENT DOCUMENTS

| | | | |
|---|---|---|---|
| 54,144 | A | 4/1866 | Hamar |
| 274,740 | A | 3/1883 | Douglass |
| 526,708 | A | 10/1894 | Horton |
| 639,036 | A | 12/1899 | Heald |
| 1,189,560 | A | 7/1916 | Gondos |
| 1,285,347 | A | 11/1918 | Otto |
| 1,467,480 | A | 9/1923 | Hogue |
| 1,485,615 | A | 3/1924 | Jones |
| 1,488,106 | A | 3/1924 | Fitzpatrick |
| 1,520,737 | A | 12/1924 | W .................. right |

(Continued)

FOREIGN PATENT DOCUMENTS

| | | |
|---|---|---|
| AU | 85/49964 A | 11/1986 |
| CA | 2210866 | 1/1998 |
| CA | 2278735 | 8/1998 |
| CH | 653741 A5 | 1/1986 |
| DE | 197 25 996 A1 | 1/1998 |
| EP | 0 819 834 A1 | 1/1998 |
| EP | 0 875 661 A1 | 11/1998 |
| EP | 0 952 300 A1 | 10/1999 |
| EP | 1 316 673 A2 | 6/2003 |
| FR | 964503 | 4/1944 |

(Continued)

OTHER PUBLICATIONS

Notification of Transmittal of the International Search Report or the Declaration (PCT Rule 44.1) mailed Nov. 6, 2003 (8 pages) re International Application No. PCT/US 03/21626, Filed Jul. 11, 2003.

Notification of Transmittal of the International Search Report or the Declaration (PCT Rule 44.1) mailed Nov. 5, 2003 (8 pages) re International Application No. PCT/US 03/21627, Filed Jul. 11, 2003.

Notification of Transmittal of the International Search Report or the Declaration (PCT Rule 44.1) mailed Nov. 4, 2003 (7 pages) re International Application No. PCT/US 03/21628, Filed Jul. 11, 2003.

(Continued)

*Primary Examiner*—Zakiya W. Bates
(74) *Attorney, Agent, or Firm*—Fish & Richardson P.C.

(57) ABSTRACT

A method for underground treatment of subsurface materials comprises providing an injection pattern and a recovery pattern, the injection pattern and the recovery pattern located proximate to a subsurface treatment zone and at least one of the injection pattern and the recovery pattern comprising a plurality of lateral bores extending from a main bore. A treatment solution is injected through the injection pattern and recovered through the recovery pattern.

35 Claims, 16 Drawing Sheets

U.S. PATENT DOCUMENTS

| | | | |
|---|---|---|---|
| 1,674,392 A | 6/1928 | Flansburg | |
| 1,777,961 A | 10/1930 | Capeliuschnicoff | |
| 2,018,285 A | 10/1935 | Schweitzer et al. | |
| 2,069,482 A | 2/1937 | Seay | |
| 2,150,228 A | 3/1939 | Lamb | |
| 2,169,718 A | 8/1939 | Boll et al. | |
| 2,335,085 A | 11/1943 | Roberts | |
| 2,450,223 A | 9/1948 | Barbour | |
| 2,452,654 A | 11/1948 | Hayes et al. | |
| 2,490,350 A | 12/1949 | Grable | |
| 2,679,903 A | 6/1954 | McGowen, Jr. et al. | |
| 2,726,063 A | 12/1955 | Ragland et al. | |
| 2,726,847 A | 12/1955 | McCune et al. | |
| 2,783,018 A | 2/1957 | Lytle | |
| 2,797,893 A | 7/1957 | McCune et al. | |
| 2,847,189 A | 8/1958 | Shook | |
| 2,911,008 A | 11/1959 | Du Bois | |
| 2,934,904 A | 5/1960 | Hendrix | |
| 2,980,142 A | 4/1961 | Turak | |
| 3,163,211 A | 12/1964 | Henley | |
| 3,208,537 A | 9/1965 | Scarborough | |
| 3,347,595 A | 10/1967 | Dahms et al. | |
| 3,362,475 A | 1/1968 | Huitt et al. | |
| 3,385,382 A | 5/1968 | Canalizo et al. | |
| 3,443,648 A | 5/1969 | Howard | |
| 3,473,571 A | 10/1969 | Dugay | |
| 3,503,377 A | 3/1970 | Beatenbough et al. | |
| 3,528,516 A | 9/1970 | Brown | |
| 3,530,675 A | 9/1970 | Turzillo | |
| 3,534,822 A | 10/1970 | Campbell et al. | |
| 3,578,077 A | 5/1971 | Glenn, Jr. et al. | |
| 3,582,138 A | 6/1971 | Loofbourow et al. | |
| 3,587,743 A | 6/1971 | Howard | |
| 3,684,041 A | 8/1972 | Kammerer, Jr. et al. | 175/267 |
| 3,687,204 A | 8/1972 | Marshall et al. | |
| 3,692,041 A | 9/1972 | Bondi | 137/238 |
| 3,744,565 A | 7/1973 | Brown | |
| 3,757,876 A | 9/1973 | Pereau | 175/267 |
| 3,757,877 A | 9/1973 | Leathers | 175/269 |
| 3,759,328 A * | 9/1973 | Ueber et al. | 166/272.1 |
| 3,763,652 A | 10/1973 | Rinta | |
| 3,800,830 A | 4/1974 | Etter | 137/625.41 |
| 3,809,519 A | 5/1974 | Garner | 425/245 |
| 3,825,081 A | 7/1974 | McMahon | 175/73 |
| 3,828,867 A | 8/1974 | Elwood | 175/45 |
| 3,874,413 A | 4/1975 | Valdez | 137/625.47 |
| 3,887,008 A | 6/1975 | Canfield | 166/267 |
| 3,902,322 A | 9/1975 | Watanabe | 61/35 |
| 3,907,045 A | 9/1975 | Dahl et al. | 175/45 |
| 3,934,649 A | 1/1976 | Pasini, III et al. | 166/254 |
| 3,957,082 A | 5/1976 | Fuson et al. | 137/625.41 |
| 3,961,824 A | 6/1976 | Van Eek et al. | 299/17 |
| 4,011,890 A | 3/1977 | Anderrson | 137/625.4 |
| 4,020,901 A | 5/1977 | Pisio et al. | 166/50 |
| 4,022,279 A | 5/1977 | Driver | 166/271 |
| 4,030,310 A | 6/1977 | Schirtzinger | |
| 4,037,658 A | 7/1977 | Anderson | 166/272 |
| 4,060,130 A | 11/1977 | Hart | |
| 4,073,351 A | 2/1978 | Baum | 175/14 |
| 4,089,374 A | 5/1978 | Terry | 166/259 |
| 4,116,012 A | 9/1978 | Abe et al. | 405/238 |
| 4,134,463 A | 1/1979 | Allen | |
| 4,136,996 A | 1/1979 | Burns | |
| 4,151,880 A | 5/1979 | Vann | |
| 4,156,437 A | 5/1979 | Chivens et al. | 137/554 |
| 4,169,510 A | 10/1979 | Meigs | 175/65 |
| 4,182,423 A | 1/1980 | Ziebarth et al. | |
| 4,189,184 A | 2/1980 | Green | 299/8 |
| 4,220,203 A | 9/1980 | Steeman | 166/271 |
| 4,221,433 A | 9/1980 | Jacoby | 299/4 |
| 4,222,611 A | 9/1980 | Larson et al. | |
| 4,224,989 A | 9/1980 | Blount | |
| 4,226,475 A | 10/1980 | Frosch et al. | |
| 4,257,650 A | 3/1981 | Allen | 299/2 |
| 4,278,137 A | 7/1981 | Van Eek, deceased | 175/267 |
| 4,283,088 A | 8/1981 | Tabakov et al. | 299/2 |
| 4,296,785 A | 10/1981 | Vitello et al. | 141/105 |
| 4,296,969 A | 10/1981 | Willman | |
| 4,299,295 A | 11/1981 | Gossard | 175/45 |
| 4,303,127 A | 12/1981 | Freel et al. | 166/266 |
| 4,305,464 A | 12/1981 | Masszi | 166/370 |
| 4,312,377 A | 1/1982 | Knecht | 137/625.19 |
| 4,317,492 A | 3/1982 | Summers et al. | 175/79 |
| 4,328,577 A | 5/1982 | Abbott et al. | 370/84 |
| 4,333,539 A | 6/1982 | Lyons et al. | |
| 4,356,866 A | 11/1982 | Savins | |
| 4,366,988 A | 1/1983 | Bodine | 299/14 |
| 4,372,398 A | 2/1983 | Kuckes | 175/45 |
| 4,386,665 A | 6/1983 | Dellinger | 175/61 |
| 4,390,067 A | 6/1983 | Willman | 166/245 |
| 4,396,075 A | 8/1983 | Wood et al. | |
| 4,396,076 A | 8/1983 | Inoue | 175/265 |
| 4,397,360 A | 8/1983 | Schmidt | 175/61 |
| 4,401,171 A | 8/1983 | Fuchs | 175/267 |
| 4,407,376 A | 10/1983 | Inoue | 175/267 |
| 4,415,205 A | 11/1983 | Rehm et al. | |
| 4,417,829 A | 11/1983 | Berezoutzky | |
| 4,422,505 A | 12/1983 | Collins | |
| 4,437,706 A | 3/1984 | Johnson | 299/7 |
| 4,442,896 A | 4/1984 | Reale et al. | 166/278 |
| 4,458,767 A | 7/1984 | Hoehn, Jr. | |
| 4,463,988 A | 8/1984 | Bouck et al. | 299/2 |
| 4,494,616 A | 1/1985 | McKee | 175/67 |
| 4,502,733 A | 3/1985 | Grubb | |
| 4,512,422 A | 4/1985 | Knisley | 175/99 |
| 4,519,463 A | 5/1985 | Schuh | 175/61 |
| 4,527,639 A | 7/1985 | Dickinson, III et al. | 175/61 |
| 4,532,986 A | 8/1985 | Mims et al. | 166/50 |
| 4,533,182 A | 8/1985 | Richards | |
| 4,536,035 A | 8/1985 | Huffman et al. | |
| 4,544,037 A | 10/1985 | Terry | 166/369 |
| 4,558,744 A | 12/1985 | Gibb | 166/335 |
| 4,565,252 A | 1/1986 | Campbell et al. | 175/269 |
| 4,573,541 A | 3/1986 | Josse et al. | 175/78 |
| 4,599,172 A | 7/1986 | Gardes | 210/314 |
| 4,600,061 A | 7/1986 | Richards | 175/62 |
| 4,603,592 A | 8/1986 | Siebold et al. | |
| 4,605,076 A | 8/1986 | Goodhart | 175/61 |
| 4,611,855 A | 9/1986 | Richards | 299/2 |
| 4,618,009 A | 10/1986 | Carter et al. | 175/267 |
| 4,638,949 A | 1/1987 | Mancel | 239/307 |
| 4,646,836 A | 3/1987 | Goodhart | 166/303 |
| 4,651,836 A | 3/1987 | Richards | |
| 4,662,440 A | 5/1987 | Harmon et al. | |
| 4,674,579 A | 6/1987 | Geller et al. | 175/45 |
| 4,676,313 A | 6/1987 | Rinaldi | |
| 4,702,314 A | 10/1987 | Huang et al. | 166/245 |
| 4,705,109 A | 11/1987 | Ledent et al. | |
| 4,705,431 A | 11/1987 | Gadelle et al. | 405/267 |
| 4,715,440 A | 12/1987 | Boxell et al. | 166/100 |
| 4,718,485 A | 1/1988 | Brown et al. | |
| RE32,623 E | 3/1988 | Marshall et al. | |
| 4,727,937 A | 3/1988 | Shum et al. | |
| 4,753,485 A | 6/1988 | Goodhart | |
| 4,754,808 A | 7/1988 | Harmon et al. | |
| 4,754,819 A | 7/1988 | Dellinger | 175/61 |
| 4,756,367 A | 7/1988 | Puri et al. | 166/263 |
| 4,763,734 A | 8/1988 | Dickinson et al. | 175/61 |
| 4,773,488 A | 9/1988 | Bell et al. | 175/61 |
| 4,776,638 A | 10/1988 | Hahn | |
| 4,830,105 A | 5/1989 | Petermann | 166/241 |

| Patent No. | | Date | Inventor | Class |
|---|---|---|---|---|
| 4,832,122 A | * | 5/1989 | Corey et al. | 166/266 |
| 4,836,611 A | | 6/1989 | El-Saie | 299/7 |
| 4,842,081 A | | 6/1989 | Parant | 175/23 |
| 4,844,182 A | | 7/1989 | Tolle | 175/215 |
| 4,852,666 A | | 8/1989 | Brunet et al. | 175/61 |
| 4,883,122 A | | 11/1989 | Puri et al. | 166/263 |
| 4,889,186 A | * | 12/1989 | Hanson et al. | 166/252.1 |
| 4,978,172 A | | 12/1990 | Schwoebel et al. | 299/12 |
| 5,016,709 A | | 5/1991 | Combe et al. | |
| 5,016,710 A | | 5/1991 | Renard et al. | 166/245 |
| 5,033,550 A | | 7/1991 | Johnson et al. | |
| 5,035,605 A | | 7/1991 | Dinerman et al. | 481/18 |
| 5,036,921 A | | 8/1991 | Pittard et al. | 166/298 |
| 5,074,360 A | | 12/1991 | Guinn | 166/281 |
| 5,074,365 A | | 12/1991 | Kuckes | 175/40 |
| 5,074,366 A | | 12/1991 | Karlsson et al. | 175/76 |
| 5,082,054 A | | 1/1992 | Kiamanesh | 166/248 |
| 5,111,893 A | | 5/1992 | Kvello-Aune | 175/258 |
| 5,115,872 A | | 5/1992 | Brunet et al. | |
| 5,121,244 A | | 6/1992 | Takasaki | 359/161 |
| 5,127,457 A | * | 7/1992 | Stewart et al. | 166/306 |
| 5,135,058 A | | 8/1992 | Millgard et al. | 175/71 |
| 5,148,875 A | | 9/1992 | Karlsson et al. | 175/62 |
| 5,148,877 A | | 9/1992 | MacGregor | |
| 5,165,491 A | | 11/1992 | Wilson | 175/62 |
| 5,168,942 A | | 12/1992 | Wydrinski | 175/50 |
| 5,174,374 A | | 12/1992 | Hailey | 166/55.8 |
| 5,193,620 A | | 3/1993 | Braddick | 166/382 |
| 5,194,859 A | | 3/1993 | Warren | 340/853.4 |
| 5,194,977 A | | 3/1993 | Nishio | 359/110 |
| 5,197,553 A | | 3/1993 | Leturno | 175/57 |
| 5,197,783 A | | 3/1993 | Theimer et al. | 299/17 |
| 5,199,496 A | | 4/1993 | Redus et al. | 166/366 |
| 5,201,817 A | | 4/1993 | Hailey | 175/269 |
| 5,207,271 A | * | 5/1993 | Sanchez et al. | 166/281 |
| 5,217,076 A | | 6/1993 | Masek | 166/303 |
| 5,226,495 A | | 7/1993 | Jennings, Jr. | 166/278 |
| 5,240,350 A | | 8/1993 | Yamaguchi et al. | 405/143 |
| 5,242,017 A | | 9/1993 | Hailey | 166/55.8 |
| 5,242,025 A | | 9/1993 | Neill et al. | 175/26 |
| 5,246,273 A | | 9/1993 | Rosar | 299/4 |
| 5,255,741 A | | 10/1993 | Alexander | 166/278 |
| 5,271,472 A | | 12/1993 | Leturno | 175/107 |
| 5,287,926 A | | 2/1994 | Grupping | |
| 5,289,888 A | | 3/1994 | Talley | |
| 5,301,760 A | | 4/1994 | Graham | 175/61 |
| 5,343,965 A | | 9/1994 | Talley et al. | |
| 5,355,967 A | | 10/1994 | Mueller et al. | |
| 5,363,927 A | | 11/1994 | Frank | 175/67 |
| 5,385,205 A | | 1/1995 | Hailey | 166/55.8 |
| 5,394,950 A | | 3/1995 | Gardes | 175/45 |
| 5,402,851 A | | 4/1995 | Baiton | 166/369 |
| 5,411,082 A | | 5/1995 | Kennedy | 166/181 |
| 5,411,085 A | | 5/1995 | Moore et al. | 166/242 |
| 5,411,088 A | | 5/1995 | LeBlanc et al. | |
| 5,411,104 A | | 5/1995 | Stanley | 175/65 |
| 5,411,105 A | | 5/1995 | Gray | 175/69 |
| 5,431,220 A | | 7/1995 | Lennon et al. | 166/55.7 |
| 5,431,482 A | | 7/1995 | Russo | |
| 5,435,400 A | | 7/1995 | Smith | 175/61 |
| 5,447,416 A | | 9/1995 | Wittrisch | 417/442 |
| 5,450,902 A | | 9/1995 | Matthews | 166/268 |
| 5,454,419 A | | 10/1995 | Vloedman | 166/277 |
| 5,458,209 A | | 10/1995 | Hayes et al. | 175/61 |
| 5,462,116 A | | 10/1995 | Carroll | 166/264 |
| 5,462,120 A | | 10/1995 | Gondouin | 166/380 |
| 5,469,155 A | | 11/1995 | Archambeault et al. | 340/853.4 |
| 5,477,923 A | | 12/1995 | Jordan, Jr. et al. | 66/313 |
| 5,485,089 A | | 1/1996 | Kuckes | 324/346 |
| 5,494,121 A | | 2/1996 | Nackerud | 175/263 |
| 5,499,687 A | | 3/1996 | Lee | 175/317 |
| 5,501,273 A | | 3/1996 | Puri | 166/252.5 |
| 5,501,279 A | | 3/1996 | Garg et al. | 166/372 |
| 5,520,252 A | | 5/1996 | McNair | |
| 5,584,605 A | | 12/1996 | Beard et al. | 405/128 |
| 5,613,242 A | | 3/1997 | Oddo | 588/17 |
| 5,615,739 A | | 4/1997 | Dallas | 166/306 |
| 5,653,286 A | | 8/1997 | McCoy et al. | |
| 5,659,347 A | | 8/1997 | Taylor | 347/85 |
| 5,664,911 A | * | 9/1997 | Bridges et al. | 405/128.4 |
| 5,669,444 A | | 9/1997 | Riese et al. | 166/263 |
| 5,676,207 A | * | 10/1997 | Simon et al. | 166/268 |
| 5,680,901 A | | 10/1997 | Gardes | 166/313 |
| 5,690,390 A | | 11/1997 | Bithell | 299/4 |
| 5,697,445 A | | 12/1997 | Graham | |
| 5,706,871 A | | 1/1998 | Anderson et al. | 141/59 |
| 5,720,356 A | | 2/1998 | Gardes | 175/62 |
| 5,727,629 A | | 3/1998 | Blizzard, Jr. et al. | 166/298 |
| 5,733,067 A | * | 3/1998 | Hunt et al. | 405/128.5 |
| 5,735,350 A | | 4/1998 | Longbottom et al. | 166/313 |
| 5,771,976 A | | 6/1998 | Talley | 166/370 |
| 5,775,433 A | | 7/1998 | Hammett et al. | |
| 5,775,443 A | | 7/1998 | Lott | |
| 5,785,133 A | | 7/1998 | Murray et al. | 175/61 |
| 5,832,958 A | | 11/1998 | Cheng | 137/625.41 |
| 5,852,505 A | | 12/1998 | Li | 359/118 |
| 5,853,054 A | | 12/1998 | McGarian et al. | 175/267 |
| 5,853,056 A | | 12/1998 | Landers | 175/424 |
| 5,853,224 A | | 12/1998 | Riese | |
| 5,863,283 A | | 1/1999 | Gardes | 588/250 |
| 5,867,289 A | | 2/1999 | Gerstel et al. | 359/110 |
| 5,868,202 A | | 2/1999 | Hsu | 166/256 |
| 5,868,210 A | * | 2/1999 | Johnson et al. | 175/40 |
| 5,879,057 A | | 3/1999 | Schwoebel et al. | 299/17 |
| 5,884,704 A | | 3/1999 | Longbottom et al. | 16/313 |
| 5,912,754 A | | 6/1999 | Koga et al. | 359/179 |
| 5,914,798 A | | 6/1999 | Liu | 359/161 |
| 5,917,325 A | | 6/1999 | Smith | 324/326 |
| 5,934,390 A | | 8/1999 | Uthe | 175/67 |
| 5,938,004 A | | 8/1999 | Roberts et al. | 198/812 |
| 5,941,307 A | | 8/1999 | Tubel | |
| 5,941,308 A | | 8/1999 | Malone et al. | |
| 5,944,107 A | | 8/1999 | Ohmer | |
| 5,957,539 A | | 9/1999 | Durup et al. | 299/4 |
| 5,971,074 A | | 10/1999 | Longbottom et al. | 166/313 |
| 5,988,278 A | | 11/1999 | Johnson | |
| 5,992,524 A | | 11/1999 | Graham | |
| 6,012,520 A | | 1/2000 | Yu et al. | 166/245 |
| 6,015,012 A | | 1/2000 | Reddick | 166/313 |
| 6,019,173 A | | 2/2000 | Saurer et al. | |
| 6,024,171 A | | 2/2000 | Montgomery et al. | 166/308 |
| 6,030,048 A | * | 2/2000 | Hsu | 299/4 |
| 6,050,335 A | | 4/2000 | Parsons | 166/272.3 |
| 6,056,059 A | | 5/2000 | Ohmer | 166/313 |
| 6,062,306 A | | 5/2000 | Gano et al. | |
| 6,065,550 A | | 5/2000 | Gardes | 175/62 |
| 6,065,551 A | | 5/2000 | Gourley et al. | |
| 6,079,495 A | | 6/2000 | Ohmer | |
| 6,089,322 A | | 7/2000 | Kelley et al. | |
| 6,119,771 A | | 9/2000 | Gano et al. | 166/50 |
| 6,119,776 A | | 9/2000 | Graham et al. | |
| 6,135,208 A | | 10/2000 | Gano et al. | 166/313 |
| 6,170,571 B1 | | 1/2001 | Ohmer | |
| 6,179,054 B1 | | 1/2001 | Stewart | |
| 6,189,616 B1 | | 2/2001 | Gano et al. | |
| 6,192,988 B1 | | 2/2001 | Tubel | |
| 6,199,633 B1 | | 3/2001 | Longbottom | |
| 6,209,636 B1 | | 4/2001 | Roberts et al. | 166/117.6 |
| 6,237,284 B1 | | 5/2001 | Erickson | |
| 6,244,340 B1 | | 6/2001 | McGlothen et al. | |
| 6,247,532 B1 | | 6/2001 | Ohmer | |
| 6,263,965 B1 | | 7/2001 | Schmidt et al. | |

| | | | |
|---|---|---|---|
| 6,279,658 B1 * | 8/2001 | Donovan et al. ............ 166/313 |
| 6,280,000 B1 | 8/2001 | Zupanick ...................... 299/12 |
| 6,283,216 B1 | 9/2001 | Ohmer |
| 6,318,457 B1 | 11/2001 | Den Boer et al. |
| 6,349,769 B1 | 2/2002 | Ohmer ........................ 166/313 |
| 6,357,523 B1 | 3/2002 | Zupanick ...................... 166/52 |
| 6,357,530 B1 | 3/2002 | Kennedy et al. |
| 6,425,448 B1 | 7/2002 | Zupanick et al. .............. 175/61 |
| 6,439,320 B2 | 8/2002 | Zupanick ...................... 175/161 |
| 6,450,256 B2 | 9/2002 | Mones .................. 166/250.01 |
| 6,454,000 B1 | 9/2002 | Zupanick |
| 6,457,540 B2 | 10/2002 | Gardes |
| 6,470,978 B2 | 10/2002 | Trueman et al. |
| 6,491,101 B2 | 12/2002 | Ohmer |
| 6,497,556 B2 | 12/2002 | Zupanick et al. |
| 6,554,063 B2 | 4/2003 | Ohmer |
| 6,557,628 B2 | 5/2003 | Ohmer |
| 6,564,867 B2 | 5/2003 | Ohmer |
| 6,566,649 B1 | 5/2003 | Mickael ................... 250/269.3 |
| 6,571,888 B2 | 6/2003 | Comeau et al. ............... 175/61 |
| 6,575,235 B2 | 6/2003 | Zupanick et al. |
| 6,577,129 B1 | 6/2003 | Thompson et al. ......... 324/338 |
| 6,581,455 B1 | 6/2003 | Berger et al. |
| 6,581,685 B2 | 6/2003 | Burgess et al. |
| 6,585,061 B2 | 7/2003 | Radzinski et al. ............. 175/45 |
| 6,590,202 B2 | 7/2003 | Mickael ................... 250/269.2 |
| 6,591,903 B2 | 7/2003 | Ingle et al. .................... 166/50 |
| 6,604,580 B2 | 8/2003 | Zupanick et al. |
| 6,604,910 B1 | 8/2003 | Zupanick |
| 6,607,042 B2 | 8/2003 | Hoyer et al. ................... 175/38 |
| 6,636,159 B1 | 10/2003 | Winnacker ............... 340/854.3 |
| 6,639,210 B2 | 10/2003 | Odom et al. ............. 250/269.6 |
| 6,646,441 B2 | 11/2003 | Thompson et al. ......... 324/338 |
| 6,653,839 B2 | 11/2003 | Yuratich et al. ............ 324/355 |
| 6,668,918 B2 | 12/2003 | Zupanick |
| 6,679,322 B1 | 1/2004 | Zupanick |
| 6,688,388 B2 | 2/2004 | Zupanick |
| 6,708,764 B2 | 3/2004 | Zupanick |
| 6,725,922 B2 | 4/2004 | Zupanick |
| 6,758,289 B2 | 7/2004 | Kelley et al. |
| RE38,642 E | 11/2004 | Gondouin |
| 2002/0043404 A1 | 4/2002 | Trueman et al. |
| 2002/0050358 A1 | 5/2002 | Algeroy et al. ............. 166/313 |
| 2002/0074120 A1 | 6/2002 | Scott ........................ 166/313 |
| 2002/0189801 A1 | 12/2002 | Zupanick et al. |
| 2003/0062198 A1 | 4/2003 | Gardes ........................ 175/61 |
| 2003/0066686 A1 | 4/2003 | Conn ........................... 175/57 |
| 2003/0075334 A1 | 4/2003 | Haugen et al. ............. 166/313 |
| 2003/0164253 A1 | 9/2003 | Trueman et al. |
| 2003/0217842 A1 | 11/2003 | Zupanick et al. |
| 2003/0221836 A1 | 12/2003 | Gardes |
| 2003/0234120 A1 | 12/2003 | Paluch et al. |
| 2004/0007389 A1 | 1/2004 | Zupanick |
| 2004/0007390 A1 | 1/2004 | Zupanick |
| 2004/0011560 A1 | 1/2004 | Rial et al. |
| 2004/0020655 A1 | 2/2004 | Rusby et al. |
| 2004/0031609 A1 | 2/2004 | Zupanick |
| 2004/0033557 A1 | 2/2004 | Scott et al. |
| 2004/0035582 A1 | 2/2004 | Zupanick |
| 2004/0050552 A1 | 3/2004 | Zupanick |
| 2004/0050554 A1 | 3/2004 | Zupanick et al. |
| 2004/0055787 A1 | 3/2004 | Zupanick |
| 2004/0060351 A1 | 4/2004 | Gunter et al. |
| 2004/0140129 A1 | 7/2004 | Gardes |
| 2004/0226719 A1 | 11/2004 | Morgan et al. |
| 2005/0133219 A1 | 6/2005 | Zupanick |
| 2005/0252689 A1 | 11/2005 | Gardes |
| 2005/0257962 A1 | 11/2005 | Zupanick |
| 2006/0096755 A1 | 5/2006 | Zupanick |
| 2006/0266521 A1 | 11/2006 | Pratt et al. |

FOREIGN PATENT DOCUMENTS

| | | |
|---|---|---|
| GB | 442008 | 1/1936 |
| GB | 444484 | 3/1936 |
| GB | 651468 | 4/1951 |
| GB | 893869 | 4/1962 |
| GB | SU-750108 | 6/1975 |
| GB | SU-1448078 A1 | 3/1987 |
| GB | SU-1770570 A1 | 3/1990 |
| GB | 2 255 033 A | 10/1992 |
| GB | 2 297 988 | 8/1996 |
| GB | 2 347 157 A | 8/2000 |
| RU | 876968 | 10/1981 |
| RU | 1709076 A1 | 1/1992 |
| RU | 2097536 C1 | 11/1997 |
| RU | 1448078 A1 | 12/1998 |
| RU | 2136566 C1 | 9/1999 |
| RU | 2176311 C2 | 11/2001 |
| RU | 2179234 C1 | 2/2002 |
| RU | 2205935 C1 | 6/2003 |
| UA | 37720 A | 5/2001 |
| WO | 94/21889 | 9/1994 |
| WO | WO 94/28280 | 12/1994 |
| WO | WO 97/21900 | 6/1997 |
| WO | WO 98/25005 | 6/1998 |
| WO | WO 98/35133 | 8/1998 |
| WO | WO 99/60248 | 11/1999 |
| WO | WO 00/31376 | 6/2000 |
| WO | WO 00/79099 | 12/2000 |
| WO | WO 01/44620 A1 | 6/2001 |
| WO | WO 02/18738 | 3/2002 |
| WO | WO 02/059455 | 8/2002 |
| WO | WO 02/061238 A1 | 8/2002 |
| WO | WO 038233 | 5/2003 |
| WO | WO 03/036023 A1 | 5/2003 |
| WO | WO 03/102348 A2 | 12/2003 |
| WO | WO 2004/035984 A1 | 4/2004 |
| WO | WO 2005/003509 A1 | 1/2005 |
| WO | 2005/012688 A1 | 2/2005 |

OTHER PUBLICATIONS

Notification of Transmittal of the International Search Report or the Declaration (PCT Rule 44.1) mailed Dec. 5, 2003 (8 pages) re International Application No. PCT/US 03/21750, Filed Jul. 11, 2003.

Examiner of Record, Office Action Response regarding the Interpretation of the three Russian Patent Applications listed above under Foreign Patent Documents (9 pages), date unknown.

B. Gotas et al., "*Performance of Openhole Completed and Cased Horizontal/Undulating Wells in Thin–Bedded, Tight Sand Gas Reservoirs*," Society of Petroleum Engineers, Inc., Oct. 17 through Oct. 19, 2000, pp. 1–7.

R. Sharma, et al., "*Modelling of Undulating Wellbore Trajectories, The Journal of Canadian Petroleum Technology*", XP–002261908, Oct. 18–20, 1993, pp 16–24.

E.F. Balbinski et al., "*Prediction of Offshore Viscous Oil Field Performance*," European Symposium on Improved Oil Recovery, Aug. 18–20, 1999, pp. 1–10.

Robert W. Taylor and Richard Russell, Multilateral Technologies Increase Operational Efficiencies in Middle East, Oil & Gas Journal, pp. 76–80, Mar. 16, 1998.

Adam Pasiczynk, "Evolution Simplifies Multilateral Wells", Directional Drilling, pp. 53–55, Jun. 2000.

Steven S. Bell, "Multilateral System with Full Re–Entry Access Installed", World Oil, p. 29, Jun. 1996.

P. Jackson and S. Kershaw, Reducing Long Term Methane Emissions Resulting from Coal Mining, Energy Convers. Mgmt, vol. 37, Nos. 6–8, pp. 801–806, 1996.

Pascal Breant, "Des Puits Branches, Chez Total : les puits multi drains", Total Exploration Production, pp. 1–5, Jan. 1999.

Susan Eaton, "Reversal of Fortune", New Technology Magazine, pp. 30–31, Sep. 2002.

James Mahony, "A Shadow of Things to Come", New Technology Magazine, pp. 28–29, Sep. 2002.

Documents Received from Third Party, Great Lakes Directional Drilling, Inc., (12 pages), received Sep. 12, 2002.

"Enhanced Coal Bed Methane Production and Sequestration of CO2 in Unmineable Coal Seams", "*U.S. Department of Energy Notice of Financial Assistance Award,*" 50 pages, under cover of two–page letter from the United States Department of Energy, received via letter dated Feb. 22, 2002.

R.J. "Bob" Stayton, "Horizontal Wells Boost CBM Recovery", Special Report: Horizontal & Directional Drilling, *The American Oil & Gas Reporter*, pp. 71–75, Aug. 2002.

Kelley et al., U.S. Patent Application Publication No. U.S. 2002/0074122 A1 Method and Apparatus for Hydrocarbon Subterranean Recover, Jun. 20, 2002.

Arfon H. Jones et al., "A Review of the Physical and Mechanical Properties of Coal with Implications for Coal–Bed Methane Well Completion and Production", *Rocky Mountain Association of Geologists*, pp 169–181, 1988.

Joseph C. Stevens, Horizontal Applications for Coal Bed Methane Recovery, 3rd Annual Coalbed and Coal Mine Conference, *Strategic Research Institute*, pp 1–10 slides, Mar. 25, 2002.

Chi, Weiguo, "*A Feasible Discussion on Exploitation Coalbed Methane through Horizontal Network Drilling in China*", SPE 64709, Society of Petroleum Engineers (SPE International), 4 pages, Nov. 7, 2000.

Chi, Weiguo, "*Feasibility of Coalbed Methane Exploitation in China*", synopsis of paper SPE 64709, 1 page, Nov. 7, 2000.

Ian D. Palmer et al., "*Coalbed Methane Well Completions and Stimulations*", Chapter 14, pp. 303–339, Hydrocarbons from Coal, Published by the American Association of Petroleum Geologists, 1993.

Notification of Transmittal of the International Search Report or the Declaration (PCT Rule 44.1) mailed Sep. 5, 2003 (7 pages) re International Application No. PCT/US 03/13954, May 2, 2003.

McCray and Cole, "Oil Well Drilling and Technology, " *University of Oklahoma Press*, pp. 315–319, 1959.

Berger and Anderson, "Modern Petroleum;" *PennWell Books*, pp. 106–108, 1978.

Howard L. Hartman, et al.; "SME Mining Engineering Handbook;" *Society for Mining, Metallurgy, and Exploration, Inc.*; pp. 1946–1950, 2nd Edition, vol. 2, 1992.

Dave Hassan, Mike Chernichen, Earl Jensen, and Morley Frank; "Multi–lateral technique lowers drilling costs, provides environmental benefits", *Drilling Technology*, pp. 41–47, Oct. 1999.

Joseph A. Zupanick; Declaration of Experimental Use with attached Exhibits A–D, dated Nov. 12, 2000, 308 total pages.

Gopal Ramaswamy, "Production History Provides CBM Insights," *Oil & Gas Journal*, pp. 49, 50 and 52, Apr. 2, 2001.

Weiguo Chi and Luwu Yang, "Feasibility of Coalbed Methane Exploitation in China," *Horizontal Well Technology*, p. 74, Sep. 2001.

Nackerud Product Description, *Harvest Tool Company, LLC*, 1 page, Received Sep. 27, 2001.

Gopal Ramaswamy, "Advances Key For Coalbed Methane," *The American Oil & Gas Reporter*, pp. 71 & 73, Oct. 2001.

Fipke, S., et al., "*Economical Multilateral Well Technology for Canadian Heavy Oil,*" Petroleum Society, Canadian Institute of Mining, Metallurgy & Petroleum, Paper 2002–100, to be presented in Calgary Alberta, Jun. 11–13, 2002, pp. 1–11.

PowerPoint Presentation entitled, "Horizontal Coalbed Methane Wells," by Bob Stayton, Computalog Drilling Services, date is believed to have been in 2002 (39 pages).

Denney, Dennis, "*Drilling Maximum–Reservoir–Contact Wells in the Shaybah Field*," SPE 85307, pp. 60, 62–63, Oct. 20, 2003.

Notification of Transmittal of the International Search Report or the Declaration (PCT Rule 44.1)(3 pages) and International Search Report (7 pages) re International Application No. PCT/US 03/04771 mailed Jul. 4, 2003.

Notification of Transmittal of the International Search Report or the Declaration (PCT Rule 44.1)(3 pages) and International Search Report (5 pages) re International Application No. PCT/US 03/21891 mailed Nov. 13, 2003.

Notification of Transmittal of the International Search Report or the Declaration (PCT Rule 44.1)(3 pages) and International Search Report (4 pages) re International Application No. PCT/US 03/38383 mailed Jun. 2, 2004.

Notification of Transmittal of the International Search Report or the Declaration (PCT Rule 44.1)(3 pages) and International Search Report (3 pages) re International Application No. PCT/US 03/28137 mailed Dec. 19, 2003.

Notification of Transmittal of the International Search Report or the Declaration (PCT Rule 44.1)(3 pages) and International Search Report (5 pages) re International Application No. PCT/US 03/26124 mailed Feb. 4, 2004.

Notification of Transmittal of the International Search Report or the Declaration (PCT Rule 44.1)(3 pages) and International Search Report (6 pages) re International Application No. PCT/US 03/28138 mailed Feb. 9, 2004.

Notification of Transmittal of the International Search Report or the Declaration (PCT Rule 44.1)(3 pages) and International Search Report (6 pages) re International Application No. PCT/US 03/30126 mailed Feb. 27, 2004.

Smith, Maurice, "*Chasing Unconventional Gas Unconventionally,*" CBM Gas Technology, New Technology Magazine, Oct./Nov. 2003, pp. 1–4.

Gardes, Robert, "*A New Direction in Coalbed Methane and Shale Gas Recovery,*" (to the best of Applications' recollection, first received at The Canadian Institute Coalbed Methane Symposium conference on Jun. 16, 2002), 1 page pf conference flyer, 6 pages.

Gardes, Robert, "*Under–Balance Multi–Lateral Drilling for Unconventional Gas Recovery,*" (to the best of Applicants' recollecction, first received at The Uncoventional Gas Revolution conference on Dec. 9, 2003, 4 pages of conference flyer, 33 pages.

Boyce, Richard G., "*High Resolution Selsmic Imaging Programs for Coalbed Methane Development,* " (to the best of Applicants' recollection, first received at The Unconventional Gas Revolution conference on Dec. 10, 2003), 4 pages of conference flyer, 24 pages.

Mazzela, Mark, et al., "*Well Control Operations on a Multiwell Platform Blowout*," WorldOil.com–Online Magazine Article, vol. 22, Part 1 –pp. 1–7, Jan. 2001, and Part II, Feb. 2001.

Vector Magnetics, LLC, Case History, California, May 1999, "*Successful Kill of a Surface Blowout*," 1999, pp. 1–12.

Cudd Pressure Control, Inc. "*Sucessful Well Control Operations –A Case Study: Surface and Subsurface Well Intervention on a Multi–Well Offshore Platform Blowout and Fire*," 2000, pp. 1–17, http://www.cuddwellcontrol.com/literature/successful/successful_well.htm.

Purl, R., et al., "*Damage to Coal Permeability During Hydraulic Fracturing*," SPE 21812, 1991, pp. 109–115.

U.S. Dept. of Energy–Office of Fossil Energy, "*Multi–Seam Well Completion Technology: Implications for Powder River Basin Coalbed Methane Production*," pp. 1–100, A–1 through A–10, Sep. 2003.

U.S. Dept. of Energy–Office of Fossil Energy, "*Powder River Basin Coalbed Methane Development and Produced Water Management Study*," pp. 1–111, A–1 through A–14, Nov. 2002.

Fletcher, Sam, "*Anadarko Cuts Route Under Canadian River Gorge*," Oil & Gas Journal, pp. 28–30, Jan. 5, 2004.

Kalinin, et al., Translation of Selected Pages from Ch. 4, Sections 4.1, 4.4, 4.4.1, 4.4.3, 11.2.2, 11.2.4 and 11.4, "*Drilling Inclined and Horizontal Well Bores*," Moscow, Nedra Publishers, 15 pages, 1997.

Kalinin, et al., Translation of Selected Pages from Ch. 4, Sections 4.2 (p. 135), 10.1 (p. 402), 10.4 (pp. 418–419), "*Drilling Inclined and Horizontal Well Bores*," Moscow, Nedra Publishers, 14 pages, 1997.

Arens, V. Zh., Translation of Selected Pages, "*Well–Drilling Recovery of Minerals*," Moscow, Nedra Publishers, 7 pages 1986.

Jet Lavanway Exploration, "*Well Survery*," Key Energy Surveys, 3 pages, Nov. 2, 1997.

Precision Drilling, "*We Have Roots in Coal Bed Methane Drilling*," Technology Services Group, 1 page, Published on or before Aug. 5, 2002.

U.S. Dept. of Energy, "*New Breed of CBM/CMM Recovery Technology*," 1 page, Jul. 2003.

Ghiselin, Dick, "*Unconventional Vision Frees Gas Reserves*," Natual Gas Quarterly, 2 pages, Sep. 2003.

CBM Review; World Coal, "*US Drilling into Asia*," 4 pages, Jun. 2003.

Skrebowski, Chris, "*US Interest in North Korean Reserves*," Petroleum, Energy Institute, 4 pages, Jul. 2003.

Field, T.W., "*Surface to In–seam Drilling–The Australian Experience*," 10 pages, Undated.

Drawings included in CBM well permit issued to CNX stamped Apr. 15, 2004 by the West Virginia Department of Environmenal Protection (4 pages).

Website of Mitchell Drilling Contractors, "*Services: Dymaxion–Surface to In–seam*," http://www.mitchell drilling.com/dymaxion.htm, printed as of Jun. 17, 2004, 4 pages.

Website of CH4, "About Natural Gas–Technology," http://www.ch4.com.au/ng_technology.html, copyright 2003, printed as of Jun. 17, 2004, 4 pages.

Thomson, et al., "*The Application of Medium Radius Directional Drilling for Coal Bed Methane Extraction*," Lucas Technical Paper, copyrighted 2003, 11 pages.

U.S. Department of Energy, "Slant Hole Drilling," Mar. 1999, 1 page.

Desai, Praful, et al., "*Innovative Design Allows Construction of Level 3 or Level 4 Junction Using the Same Platform*," SPE/Petroleum Society of CIM/CHOA 78965, Canadian Heavy Oil Association, 2002, pp. 1–11.

Bybee, Karen, "*Advanced Openhole Multilaterals*," Horizontal Wells, Nov. 2002, pp. 41–42.

Notification of Transmittal of the International Search Report and the Written Opinion of the International Searching Authority, or Declaration (3 pages), International Search Report (5 pages) and Written Opinion of the International Searching Authority (6 pages) re International Application No. PCT/US2004/012029 mailed Sep. 22, 2004.

Brunner, D.J. and Schwoebel, J.J., "Directional Drilling for Methane Drainage and Exploration in Advance of Mining," REI Drilling Directional Underground, World Coal, 1999, 10 pages.

Thakur, P.C., "A History of Coalbed Methane Drainage From United States Coal Mines," 2003 SME, Annual Meeting, Feb. 24–26, Cincinnati, OH, 4 pages.

U.S. Climate Change Technology Program, "Technology Options for the Near and LOng Term," 4.1.5 Advances in Coal Mine Methane Recovery Systems, pp. 162–164.

Notification of Transmittal of the International Search Report and the Written Opinion of the International Searching Authority, or Declaration (3 pages), International Search Report (3 pages) and Written Opinion of the International Searching Authority (7 pages) re International Application No. PCT/US2004/017048 mailed Oct. 21, 2004.

Gardes, Robert, "Multi–Seam Completion Technology," Natural Gas Quarterly, E&P, Jun. 2004, pp. 78–81.

Baiton, Nicholas, "Maximize Oil Production and Recovery," Vertizontal Brochure, received Oct. 2, 2002, 4 pages.

Dreiling, Tim, McClelland, M.L. and Bilyeu, Brad, "Horizontal & High Angle Air Drilling in the San Juan Basin, New Mexico," Dated on or about Mar. 6, 2003, pp. 1–11.

Fong, David K., Frank Y., and McIntyre, Frank J., "An Unexpected Benefit of Horizontal Wells on Offset Vertical Well Productivity in Vertical Miscible Floods," Canadian SPE/CIM/CANMET Paper No. HWC94–09, paper to be presented Mar. 20–23, 1994, Calgary, Canada, 10 pages.

Fischer, Perry A., "What's Happening in Production," World Oil, Jun. 2001, p. 27.

Website of PTTC Network News vol. 7, $1^{st}$ Quarter 2001, Table of Contents, http://www.pttc.org/. . . /news/v7n1nn4.htm printed Apr. 25, 2005, 3 pages.

Cox, Rachard J.W., "Testing Horizontal Wells While Drilling Underbalanced," Delft University of Technology, Aug. 1998, 68 pages.

McLennan, John, et al., "Unerbalanced Drilling Manual," Gas Research Institute, Chicago, Illinois, GRI Reference No. GRI–97/0236, copyright 1997, 502 pages.

The Need for a Viable Multi–Seam Completion Technology for the Powder River Basin, Current Practice and Limitations, Gardes Energy Services, Inc., Believed to be 2003 ( 8 pages).

Langley, Diane, "Potential Impact of Microholes Is Far From Diminutive," JPT Online, http://www.spe.org/spe/jpt/jps, Nov. 2004 (5 pages).

Consol Energy Slides, "Generating Solutions, Fueling Change," Presented at Appalachian E&P Forum, Harris Nesbitt Corp., Boston, Oct. 14, 2004 (29 pages).

Notification of Transmittal of the International Search Report and the Written Opinion of the International Searching Authority, or the Declaration (3 pages), International Search Report (3 pages), and Written Opinion of the International Searching Authority (5 pages) re International Application No. PCT/US2004/024518 mailed Nov. 10, 2004.

Schenk, Christopher J., "Geologic Definition and Resource Assessment of Continuous (Unconventional) Gas Accumulations–the U.S. Experience," Website, http://aapg.confex.com/. . . //, printed Nov. 16, 2004 (1 page).

U.S. Department of Interior, U.S. Geological Survey, "Characteristics of Discrete and Basin–Centered Parts of the Lower Silurian Regional Oil and Gas Accumulation, Appalachian Basin; Preliminary Results From a Data Set of 25 oil and Gas Fields," U.S. Geological Survey Open–File Report 98–216, Website, http://pubs.usgs.gov/of/1998/of98–216/introl.htm, printed Nov. 16, 2004 (2 pages).

Zupanick, J., "Coalbed Methane Extraction," 28$^{th}$ Mineral Law Conference, Lexington, Kentucky, Oct. 16–17, 2003 (48 pages).

Zupanick, J., "CDX Gas–Pinnacle Project," Presentation at the 2002 Fall Meeting of North American Coal Bed Methane Forum, Morgantown, West Virginia, Oct. 30, 2002 (23 pages).

Lukas, Andrew, Lucas Drilling Pty Ltd., "Technical Innovation and Engineering Xstrata–Oaky Creek Coal Pty Limited," Presentation at Coal Seam Gas & Mine Methane Conference in Brisbane, Nov. 22–23, 2004 (51 pages).

Field, Tony, Mitchell Drilling, "Let's Get Technical–Drilling Breakthroughs in Surface to In–Seam in Australia," Presentation at Coal Seam Gas & Mine Methane conference in Brisbane, Nov. 22–23, 2004 (20 pages).

Zupanick, Joseph A, "Coal Mine Methane Drainage Utilizing Multilateral Horizontal Wells," 2005 SME Annual Meeting & Exhibit, Feb. 28–Mar. 2, 2005, Salt Lake City, Utah (6 pages).

The Official Newsletter of the Cooperative Research Centre for Mining Technology and Equipent, CMTE News 7, "Tight–Radius Drilling Clinches Award," Jun. 2001, 1 page.

Listing of 174 References received from Third Party on Feb. 16, 2005 (9 pages).

Gardes Directional Drilling, "Multiple Directional Wells From Single Borehole Developed," Reprinted from Jul. 1989 edition of Offshore, Copyright 1989 by PennWell Publishing Company (4 pages).

"Economic Justification and Modeling of Multilateral Wells," Economic Analysis, Hart's Petroleum Engineer International, 1997 (4 pages).

Mike Chambers, "Multi–Lateral Completions at Mobil Past, Present, and Future," presented at the 1998 Summit on E&P Drilling Technologies, Strategic Research Institute, Aug. 18–19, 1998 in San Antonio, Texas (26 pages).

David C. Oyler and William P. Diamond, "Drilling a Horizontal Coalbed Methane Drainage System From a Directional Surface Borehole," PB82221516, National Technical Information Service, Bureau of Mines, Pittsburgh, PA, Pittsburgh Research Center, Apr. 1982 (56 pages).

P. Corlay, D. Bossie–Codreanu, J.C. Sabathier and E.R. Delamaide, "Improving Reservoir Management With Complex Well Architectures," Field Production & Reservoir Management, World Oil, Jan. 1997 (5 pages).

Eric R. Skonberg and Hugh W. O'Donnell, "Horizontal Drilling for Underground Coal Gasification," presented at the Eighth Underground Coal Conversion Symposium, Keystone, Colorado, Aug. 16, 1982 (8 pages).

Gamal Ismail, A.S. Fada'q, S. Kikuchi, H. El Khatib, "Ten Years Experience in Horizontal Application & Pushing the Limits of Well Construction Approach in Upper Zakum Field (Offshore Abu Dhabi)," SPE 87284, Society of Petroleum Engineers, Oct. 2000 (17 pages).

Gamal Ismail, H. El–Khatib–ZADCO, Abu Dhabi, UAE, "Multi–Lateral Horizontal Drilling Problems & Solutions Experienced Offshore Abu Dhabi," SPE 36252, Society of Petroleum Engineers, Oct. 1996 (12 pages).

C.M. Mathews and L.J. Dunn, "Drilling and Production Practices of Mitigate Sucker Rod/Tubing Wear–Related Failures in Directional Wells," SPE 22852, Society of Petroleum Engineers, Oct. 1991 (12 pages).

H.H. Fields, Stephen Krickovic, Albert Sainato, and M.G. Zabetakis, "Degasification of Virgin Pittsburgh Coalbed Through a Large Borehole," RI–7800, Bureau of Mines Report of Investigations/1973, United States Department of the Interior, 1973 (31 pages).

William P. Diamond, "Methane Control for Underground Coal Mines," IC–9395, Bureau of Mines Information Circular, United States Department of the Interior, 1994 (51 pages).

Notes on Consol Presentation (by P. Thakur) made at IOGA PA in Pittsburgh, Pennsylvania on May 22, 2002 (3 pages).

Robert E. Snyder, "Drilling Advances," *World Oil*, Oct. 2003, 1 page.

"Meridian Tests New Technology," Western Oil World, Jun. 1990, Cover, Table of Contents and p. 13.

Clint Leazer and Michael R. Marquez, "Short–Radius Drilling Expands Horizontal Well Applications," Petroleum Engineer International, Apr. 1995, 6 pages.

Terry R. Logan, "Horizontal Drainhole Drilling Techniques Used in Rocky Mountains Coal Seams," Geology and Coal–Bed Methane Resources of the Northern San Juan Basin, Colorado and New Mexico, Rocky Mountain Association of Geologists, Coal–Bed Methane, San Juan Basin, 1988, pp. cover, 133–142.

Daniel J. Brunner, Jeffrey J. Schwoebel, and Scott Thomson, "Directional Drilling for Methane Drainage & Exploration in Advance of Mining," Website: http://www.advmingtech.com.au/Paper4.htm, printed Apr. 6, 2005, Copyright 1999, Last modified Aug. 7, 2002 (8 pages).

Karen Bybee, highlights of paper SPE 84424, "Coalbed–Methane Reservoir Simulation: An Evolving Science," by T.L. Hower, JPT Online, Apr. 2004, Website: http://www.spe.org/spe/jpt/jsp/jptpapersynopsis/0,2439,1104_11038_2354946_2395832,00.html, printed Apr. 14, 2005, 4 pages.

Kevin Meaney and Lincoln Paterson, "Relative Permeability in Coal," SPE 36986, Society of Petroleum Engineers, Copyright 1996, pp. 231–236.

Calendar of Events–Conference Agenda, Fifth Annual Unconventional Gas and Coalbed Methane Conference, Oct. 22–24, 2003, in Calgary Alberta, Website: http://www.csug.ca/cal/calc0301a.html. printed Mar. 17, 2005, 5 pages.

Tom Engler and Kent Perry, "Creating a Roadmap for Unconventional Gas R&D," Gas TIPS, Fall 2002, pp. 16–20.

CSIRO Petroleum–SIMEDWin, "Summary of SIMEDWin Capabilities," Copyright 1997–2005, Website: http://www.dpr.csiro.au/ourcapabilities/petroleumgeoengineering/reservoirengineering/projects/simedwin/assets/simed/index.html, printed Mar. 17, 2005, 10 pages.

Solutions From the Field, "Coalbed Methane Resources in the Southeast," Copyright 2004, Website: http://www.pttc.org/solutions/sol_2004/537.htm, printed Mar. 17 2005, 7 pages.

Jeffrey R. Levine, Ph.D., "Matrix Shrinkage Coefficient," Undated, 3 pages.

G. Twombly, S.H. Stepanek, T.A. Moore, Coalbed Methane Potential in the Waikato Coalfield of New Zealand: A Comparison With Developed Basins in the United States, 2004 New Zealand Petroleum Conference Proceedings, Mar. 7–10, 2004, pp. 1–6.

R.W. Cade, "Horizontal Wells: Development and Applications," Presented at the Fifth International Symposium on Geophysics for Mineral, Geotechnical and Environmental Applications, Oct. 24–28, 1993 in Tulsa, Oklahoma, Website: http://www.mgls.org/93Sym/Cade/cade.html, printed Mar. 17, 2005, 6 pages.

Solutions From the Field, "Horizontal Drilling, A Technology Update for the Appalachian Basin," Copyright 2004, Website: http://www.pttc.org/solutions/sol_2004/535.htm, printed Mar. 17, 2005, 6 pages.

R. Purl, J.C. Evanoff and M.L. Brugler, "Measurement of Coal Cleat Porosity and Relative Permeability Characteristics," SPE 21491, Society of Petroleum Engineers, Copyright 1991, pp. 93–104.

Peter Jackson, "Drilling Technologies for Underground Coal Gasification," IMC Geophysics Ltd., International UCG Workshop–Oct. 2003 (20 pages).

Notification of Transmittal of the International Search Report and the Written Opinion of the International Searching Authority, or the Declaration (3 pages), International Search Report (3 pages) and Written Opinion of the International Searching Authority (5 pages) re International Application No. PCT/US2005/002162 mailed Apr. 22, 2005.

Notification of Transmittal of the International Search Report and the Written Opinion of the International Searching Authority, or the Declaration (3 pages), International Search Report (3 pages) and Written Opinion of the International Searching Authority (5 pages) re International Application No. PCT/US2005/005289 mailed Apr. 29, 2005.

Notification of Transmittal of the International Search Report and the Written Opinion of the International Searching Authority, or the Declaration (3 pages), International Search Report (5 pages) and Written Opinion of the International Searching Authority (5 pages) re International Application No. PCT/US2004/036616 mailed Feb. 24, 2005.

Notification of Transmittal of International Preliminary Examination Report (1 page) and International Preliminary Examination Report (3 pages) for International Application No. PCT/US03/13954 mailed Apr. 14, 2005.

Notification of Transmittal of International Preliminary Examination Report (1 page) and International Preliminary Examination Report (5 pages) mailed Jan. 18, 2005 and Written Opinion (8 pages) mailed Aug. 25, 2005 for International Application No. PCT/US03/30126.

Notification of Transmittal of the International Search Report or the Declaration (3 pages) and International Search Report (5 pages) mailed Nov. 10, 2000 for International Application No. PCT/US99/27494.

Notification of Transmittal of International Preliminary Examination Report (1 page) and International Preliminary Examination Report (6 pages) mailed Apr. 2, 2001 and Written Opinion mailed Sep. 27, 2000 for International Application No. PCT/US99/27494.

Notification of Transmittal of the International Search Report or the Declaration (3 pages) and International Search Report (5 pages) mailed Jun. 06, 2002 for International Application No. PCT/US02/02051.

Notification of Transmittal of the International Search Report or the Declaration (3 pages) and International Search Report (6 pages) mailed Mar. 13, 2003 for International Application No. PCT/US02/33128.

Notification of Transmittal of International Preliminary Examination Report (1 pages) and International Preliminary Examination Report 3 pages mailed Apr. 22, 2004 and Written Opinion mailed Sep. 4, 2003 for International Application No. PCT/US02/33128.

Dreiling, Tim, McClelland, M.L. and Bilyeu, Brad, "Horizontal & High Angle Air Drilling in the San Juan Basin, New Mexico," Believed to be Apr. 1996, pp. 1–11.

Technology Scene Drilling & Intervention Services, "Weatherford Moves into Advanced Multilateral Well Completion Technology," and "Productivity Gains and Safety Record Speed Acceptance of UBS," *Reservoir Mechanics*, Weatherford International, Inc., 2000 Annual Report (2 pages).

"A Different Direction for CBM Wells," *W Magazine*, 2004 Third Quarter (5 pages).

Snyder, Robert e., "What's New in Production," *WorldOil Magazine*, Feb. 2005, [printed from the internet on Mar. 7, 2005], http://www.worldoil.com/magazine/MAGAZINE DETAIL.asp?ART_ID=2507@MONTH_YEAR (3 pages).

Nazzal, Greg, "Moving Multilateral Systems to the Next Level, Strategic Acquisition Expands Weatherford's Capabilities," 2000 (2 pages).

Bahr, Angie, "Methane Draining Technology Boosts Safety and Energy Production," Energy Review, Feb. 4, 2005, Website: www.energyreview.net/storyviewprint.asp, printed Feb. 7, 2005 (2 pages).

Molvar, Erik M., "Drilling Smarter: Using Directional Drilling to Reduce Oil and Gas Impacts in the Intermountain West," Prepared by Biodiversity Conservation Alliance, Report issued Feb. 18, 2003, 34 pages.

King, Robert F., "Drilling Sideways–A Review of Horizontal Well Technology and Its Domestic Application," DOE/EIA–TR–0565, U.S. Department of Energy, Apr. 1993, 30 pages.

Santos, Helio, SPE, Impact Engineering Solutions and Jesus Olaya, Ecopetrol/ICP, "*No–Damage Drilling: How to Achieve this Challenging Goal?,* " SPE 77189, Copyright 2002, presented at the IADC/SPE Asia Pacific Drilling Technology, Jakarta, Indonesia, Sep. 9–11. 2002, 10 pages.

Santos, Helio, SPE, Impact Engineering Solutions, "*Increasing Leakoff Presure with New Class of Drilling Fluid,*" SPE 78243, Copyright 2000, presented at the SPE/ISRM Rock Mechanics Conference in Irving, Texas, 10/20–23, 2003, 7 pages.

Franck Labenski, Paul Reid, SPE, and Helio Santos, SPE, Impact Solutions Group, "*Drilling Fluids Approaches of Control of Wellbore Instability in Fractured Formations*", SPE/IACS 85304, Society of Petroleum Engineers, Copyright 2003, presented at the SPE/IADC Middle East Drilling Technology Conference & Exhibition in Abu Chabi, UAE, Oct. 20–22, 2003, 8 pages.

Craig C. White and Adrian P. Chesters, NAM; Catalin D. Ivan, Syen Maikranz and Rob Nouris, M–I L.L.C., "*Aphron–based drilling fluid: Novel technology for drilling depleted formations*," World Oil, Drilling Report Special Focus, Oct. 2003, 6 pages.

U.S. Environmental Protection Agency, "Directional Drilling Technology, " prepared for the EPA by Advanced Resources International under Contract 68–W–00–094, Coalbed Methane Outreach Program (CMOP), Website: http://search.epa.gov/s97is.vts, printed Mar. 17, 2005, 13 pages.

Bybee, Karen, "*A New Generation Multilateral System for the Troll Olje Field*," Multilateral/Extended Reach, Jul. 2002, pages 50–51.

Emerson,, A.B., et al., "*Moving Toward Simpler, Highly Functional Multilateral Completions*, " Technical Note, Journal of Canadian Petroleum Technology, May 2002, vol. 41, No. 5, pp. 9–12.

Moritis, Guntis, "*Complex Well Geometries Boost Orinoco Heavy Oil Producing Rates*," XP–00969491, Oil & Gas Journal, Feb. 28, 2000, pp. 42–46.

Themig, Dan, "Multilateral Thinking," New Technology Magazine, Dec. 1999, pp. 24–25.

Smith, R.C., et al., "*The Lateral Tie–Back System: The Ability to Drill and Case Multiple Laterals*," IADC/SPE 27436, Society of Petroleum Engineers, 1994, pp. 55–64, plus Mutilateral Services Profile (1 page) and Multilateral Services Specifications (1 page).

Notification of Transmittal of the International Search Report or the Declaration (PCT Rule 44.1) (3 pages) and International Search Report (4 pages) re International Application No. PCT/US 03/13954 mailed Sep. 1, 2003.

Logan, Terry L., "*Drilling Techniques for Coalbed Methane*," Hydrocarbons From Coal, Chapter 12, Cover Page, Copyright Page, pp. 269–285, Copyright 1993.

Hanes, John, "*Outbursts in Leichhardt Colliery: Lessons Learned*," International Symposium–Cum–Workshop on Management and Control of High Gas Emissions and Outbursts in Underground Coal Mines, Wollongong, NSW, Australia, Mar. 20–24, 1995, Cover page, pp. 445–449.

Williams, Ray, et al., "*Gas Reservoir Properties for Mine Gas Emission Assessment*," Bowen Basin Symposium 2000, pp. 325–333.

Brown, K., et al., "*New South Wales Coal Seam Methane Potential*," Petroleum Bulletin 2, Department of Mineral Resoures, Discovery 2000, Mar. 1996, pp. i–viii, 1–96.

Notification Concerning Transmittal of Copy of International Preliminary Report on Patentability (1 page), International Preliminary Report on Patentability (1 page), and Written Opinion (5 pages) for International Application No. PCT/US2005/005289 mailed Sep. 8, 2006.

Notification of Transmittal of the International Preliminary Report on Patentability (1 page) and International Preliminary Report on Patentability (10 pages) for International Application No. PCT/US2006/021057 mailed Jul. 9, 2007.

William P. Diamond and David C. Oyler, "Effects of Stimulation Treatments on Coalbeds and Surrounding Strata: Evidence From Underground Observations," RI 9083, Bureau of Mines Report of Investigations, 1987 (53 pages).

W.P. Diamond and D.C. Oyler, "Recent Underground Observations of Intercepted Hydraulic Stimulations in Coalbed Methane Drainage Wells," Preprint number 85–332, Society of Mining Engineers of AIME, SME–AIME Fall Meeting, Oct 16–18, 1985 (12 pages).

William P. Diamond, "Underground Observations of Mined–Through Stimulation Treatments of Coalbeds," Methane From Coal Seams Technology, Jun. 1987 (11 pages).

W.P. Diamond, "Characterization of Fracture Geometry and Roof Penetrations Associated with Stimulation Treatments in Coalbeds," 1987 Coalbed Methane Symposium, Nov. 16–19, 1987 (11 pages).

C.M. McCulloch, Maurice Deul and P. W. Jeran, "Cleat in Bituminous Coalbeds," RI 7910, Bureau of Mines Report of Investigations, 1974 (28 pages).

B.E. Law, "The Relationship Between Coal Rank and Cleat Spacing: Implications for the Prediction of Permeability in Coal," Proceedings of the 1993 International Coalbed Methane Symposium, May 17–21, 1993 (7 pages).

C.T. Montgomery and R.E. Steanson, "Proppant Selection: The Key to Successful Fracture Stimulation," Journal Of Petroleum Technology, Dec. 1985 (10 pages).

R.W. Veatch, Jr., "Overview of Current Hydraulic Fracturing Design and Treatment Technology Part 2," Journal Of Petroleum Technology, May 1983 (12 pages).

David D. Cramer, "The Unique Aspects of Fracturing Western U.S. Coalbeds," Journal Of Petroleum Technology, Oct. 1992 (8 pages).

S.A. Holditch, J.W. Ely, R.H. Carter, and M.E. Semmelbeck, Coal Seam Stimulation Manual, Gas Research Institute, Contract No. 5087–214–1469, Apr. 1990 (265 pages).

Jack E. Nolde, "Coalbed Methane in Virginia," Virginia Minerals, Virginia Division Mineral Resources, vol. 41, Feb. 1995 (7 pages).

C.H. Elder and Maurice Deul, "Degasification of the Mary Lee Coalbed Near Oak Grove, Jefferson County, Ala., by Vertical Borehole in Advance of Mining," RI 7968, U.S. Bureau of Mines, 1974 (23 pages).

Maureen Lorenzetti, "Policymakers eye frac regulation to protect groundwater," Oil & Gas Journal, Sep. 10, 2001, p. 40 (1 page).

Peter F. Steidl, "Foam Stimulation To Enhance Production From Degasification Wells in the Pittsburgh Coalbed," RI 8286, Bureau of Mines Report of Investigations, 1978 (11 pages).

David G. Hill, "Contribution of Uncoventional Gas to U.S. Supply Continues to Grow," Gas Research Institute Gas TIPS, Fall 2001 (6 pages).

Vello A. Kuuskraa and Charles F. Brandenburg, "Coalbed Methane Sparks of New Energy Industry," Oil & Gas Journal, Week of Oct. 9, 1989 (8 pages).

Walter B. Ayers Jr. and Bruce S. Kelso, "Knowledge of Methane Potential for Coalbed Resources Grows, But Needs More Study," Oil & Gas Journal, Oct. 23, 1989 (6 pages).

John E. McElhiney, Robert A. Koenig and Richard A. Schraufnagel, "Evaluation of Coalbed Methane Reserves Involves Different Techniques," Oil & Gas Journal, Week of Oct. 9, 1989 (8 pages).

Steven W. Lambert, Stanley L. Graves and Arfon H. Jones, "Warrior Basin Drilling, Stimulation Covered," Oil & Gas Journal, Week of Oct. 9, 1989 (7 pages).

Steven W. Lambert, Stanley L. Graves, "Production Strategy Developed," Oil & Gas Journal, Week of Oct. 9, 1989 (4 pages).

Terry L. Logan, Western Basins Dictate Varied Operations, Oil & Gas Journal, Week of Oct. 9, 1989 (7 pages).

Vello A. Kuukra, Charles M. Boyer II, and Richard A. McBane, "Steps to Assess Resource Economics Covered," Oil & Gas Journal, Week of Oct. 9, 1989 (6 pages).

Richard A. Counts, "Ownership Questions Can Stymie Development of Coalbed Methane," Oil & Gas Journal, Week of Oct. 9, 1989 (6 pages).

Richard A. Schraufnagel, Richard A. McBane and Vello A. Kuuskraa, "Coalbed Methane Development Faces Technology Gaps," Oil & Gas Journal, Week of Oct. 9, 1989 (7 pages.

"US Coalbed Methane Resource Estimates, Issues Aired," Oil & Gas Journal, Sep. 24, 2001 (2 pages).

Dr. Charles R. Nelson, "Coalbed Methane Potential of the U.S. Rocky Mountain Region," Gas TIPS, Fall 2000 (9 pages).

Dr. Charles R. Nelson, "Changing Perceptions Regarding the Size and Production Potential of Coalbed Methane Resources," Gas TIPS, Summer 1999 (9 pages).

Ala. Coalbed Methane Production Hits Record, Coal Age, May 1998 (1 page).

Charles M. Boyer II, "Introduction," Gas Research Institute, Methane From Coal Seams Technology, Aug. 1993 (4 pages).

P. F. Steidl, "Evaluation of Induced Fractures Intercepted by Mining," Proceedings of the 1993 International Coalbed Methane Symposium, May 17–21, 1993 (12 pages).

W.P. Diamond, W.R. Bodden III, M.D. Zuber and R.A. Schraufnagel, "Measuring the Extent of Coalbed Gas Drainage After 10 Years of Production at the Oak Grove Pattern, Alabama," Proceedings of the 1989 Coalbed Methane Symposium, Apr. 17–20, 1989 (10 pages).

W.M. Merritts, W.N. Poundstone and B.A. Light, "Removing Methane (Degasification) From the Pittsburgh Coalbed in Northern West Virginia," Bureau of Mines RI 5977, 1962 (46 pages.

M.L. Skow, Ann G. Kim and Maurice Deul, "Creating a Safer Environment in U.S. Coal Mines," U.S. Bureau of Mines Impact Report, 1980 (56 pages).

Stephen W. Lambert, Michael A. Trevists, and Peter F. Steidl, "Vertical Borehole Design and Completion Practices Used to Remove Methane Gas From Mineable Coalbeds," U.S. Dept. of Energy, 1980 (173 pages).

M.A. Trevits, S.W. Lambert, P.F. Steidl and C.H. Elder, "Methane Drainage Through Small–Diameter Vertical Boreholes," Chapter 9 in U.S. Bureau of Mines Bulletin B687 entitled Methane Control Research: Summary of Results, 1964–80, 1988 (25 pages).

C.M. Boyer II and S.R. Reeves, "A Strategy for Coalbed Methane Production Development Part III: Production Operations," Proceedings of the 1989 Coalbed Methane Symposium, Apr. 17–20, 1989 (5 pages).

R.A. Mills and J.W. Stevenson, "History of Methane Drainage at Jim Walter Resources, Inc., " Proceedings of the 1991 Coalbed Methane Symposium, May 13–16, 1991 (9 pages).

Richard a. Schraufnagel, "Coalbed Methane Production," Chapter 15 of Hydrocarbons from Coal, American Association of Petroleum Geologists, 1993 (21 pages).

Curtis H. Elder, "Effects of Hydraulic Stimulation on Coalbeds and Associated Strata," Bureau of Mines RI 8260, 1977 (25 pages).

A Guide to Coalbed Methane Reservoir Engineering, published by Gas Research Institute, GRI–94/0397, pp. 2.11–2.12, 1996 (3 pages).

Well Performance Manual, Schlumberger, pp. 3–1 and 3–2, Aug. 1993 (4 pages).

Michael Zuber, "Coalbed Methane Engineering Methods," The Society of Petroleum Engineers, Oct. 2006 (161 pages).

James V. Mahoney, P.B. stubbs, F.C. Schwerer III and F.X. Dobscha, "Effects of a No–Proppant Foam Stimulation Treatment on a Coal–Seam Degasification Borehole," Journal of Petroleum Technology, Nov. 1981 (9 pages).

S.J. Jeu, T.L. Logan and R.A. McBane, "Exploitation of Deeply Buried Coaled Methane Using Different Hydraulic Fracturing Techniques in the Piceance Basin, Colorado and San Juan Basin New Mexico," Society of Petroleum Engineers, SPE 18253, copyright 1988 (11 pages).

Stephen E. Laubach, Carol M. Tremain and Walter B. Ayers, Jr., "Coal Fracture Studies: Guides for Coalbed Methane Exploration and Development," Journal of Coal Quality, vol. 10, No. 3, Jul. –Sep. 1991 (8 pages).

Dreiling, Tim, McClelland, M.L., and Bilyeu, Brad, "Hoizontal and High Angle Air Drilling in the San Juan Basin New Mexico," The Brief, published by Amoco and Chevron by Murphy Publishing, Inc., vol. 2, Issue 6, No. 54, Jun. 1996 (9 pages).

Notification of Transmittal of the International Preliminary Report of Patentability (1 page) and International Preliminary Report on Patentability (12 pages) mailed Jan. 9, 2006 for International Application No. PCT/US2004/036616.

Notification Concerning Transmittal of Copy of International Preliminary Report on Patentability (Chapter 1 of the Patent Cooperation Treaty) (1 page), and Written Opinion of the International Searching Authority (7 pages) mailed Dec. 22, 2005 for International Application No. PCT/US2004/017048.

European Search and Examination Report, completed Dec. 5, 2005 for Application No. EP 05020737, 5 pages.

P.C. Takur and W.N. Poundstone, "*Horizontal Drilling Technology for Advance Degasification,*" Society o Mining Engineers of AIME, Preprint No. 79–113, For presentation at the 1979 AIME Annual Meeting, New Orleans, Lousiana, Feb. 18–22, 1979, Engineering Societies Library stamp dated Feb. 5, 1980, 11 pages.

Notification Concerning Transmittal of Copy of International Preliminary Report on Patentability (1 page), International Preliminary Report on Patentability (1 page), and Written Opinion of the Internatioanl Searching Authority (5 pages) mailed Feb. 9, 2006 for International Application No. PCT/US2004/024518.

Wang Weiping, "*Trend of Drilling Technology Abroad,*" Petroleum Drilling and Production Technology, 1995 (vol. 17), Issue 6, www.cnki.net, 8 pages, translation, original in Chinese.

Tver, David, *The Pelroleum Dictionary*, 1980, p. 221.

Rennick, et al., "*Demonstration of Safety Plugging of Oil Wells Pentrating Appalachian Coal Mines*," Bureau of Mines Coal Mine Health and Safety Research Program, Technical Progress Report–56, U.S. Department of the Interior, Jul. 1972, 25 pages.

George N. Aul and Joseph Cervik, "*Grouting Horitzontal Drainage Holes in Coalbeds*," RI 8375, Bureau of Mines Report of Investigation, U.S. Department of the Interior, 1979, 21 pages.

Paul J. Componation, et al., "*Cleaning Out Sealing and Mining Through Wells Penetrating Areas of Active Coal Mines in Northern West Virginia*," MESA Information Report 1052, U.S. Department of the Interior, 1977, 26 pages.

George S. Rice, "*Notes on the Prevention of Dust and Gas Explosions in Coal Mines*," Technical Paper 56, Bureau of Mines, Department of the Interior, copyright 1913, 12 pages.

George S. Rice, "*Oil and Gas Wells Through Workable Coal Beds*," Bulletin 65, Petroleum Technology 7, Bureau of Mines, Department of the Interior, copyright 1913, 54 pages.

Notification of Transmittal of the International Preliminary Report on Patentability (1 page) and International Preliminary Report on Patentability (8 pages) for International Application No. PCT/US2005/002162 mailed May 3, 2006.

D. Nathan Meehan, "*Technology Vital For Horizontal Well Success*," Oil & Gas Journal, Dec. 11, 1995, 8 pages.

B.A. Tarr, A.F. Kuckes and M.V. Ac, "*Use of New Ranging Tool to Position a Vertical Well Adjacent to a Horizontal Well*," SPE Drilling Engineering , Jun. 1992, 7 pages.

William J. McDonald, Ph.D., John H. Cohen, and C. Mel Hightower, "*New Lightweight Fluids for Underbalanced Drilling*," presented at the U.S. Department of Energy (DOE) 1999 Oil & Gas Conference, Dallas, Texas, Jun. 28–30, 1999, 10 pages.

Philip C. Crouse, "*Application and Needs for Advanced Multilateral Technologies and Strategies*," Webite: www.netl.doe.gov/publications/proceedings/97/97ng/ng97_pdf/NG2–5.pdf; presented at the U.S. Department of Energy (DOE) 1997 Natural Gas Conference on Mar. 24–27, 1997 in Houston, Texas, 9 pages.

Dan Themig, "*Multi–Laterals Providing New Options*," The American Oil & Gas Reporter, V. 39, No. 7, Jul. 1996, 4 pages.

Daniel D. Gleltman, "*Integrated Underbalanced Directional Drilling System*," Interim Report for Period of Performance Oct. 1, 1995–Feb. 14, 1996, DOE FETC Contract DE–AC21–95MC31103, Mar. 1997, 23 pages.

J.D. Gallivan, N.R. Hewitt, M. Olsen, J.M. Peden, D. Tehrani and A.A.P. Tweedie, "*Quantifying the Benefits of Multi–Lateral Producing Wells*," SPE 30441, Society of Petroleum Engineers, Inc., Copyright 1995, 7 pages.

C.A. Ehlig–Economides, G.R. Mowat and C. Corbett, "*Techniques for Multibranch Well Trajectory Design in the context of a Three–Dimensional Reservoir Model*," SPE 35505, Society of Petroleum Engineers, Copyright 1996, 8 pages.

Stephen R. Dittoe, Albertus Retnanto, and Michael J. Exonomides, "*An Analysis of Reserves Enchancement in Petroleum Reservoirs with Horizontal and Multi–Lateral Wells*," SPE 37037, Society of Petroleum Engineers, Copyright 1996, 9 pages.

D.L. Boreck and M.T. Strever, "*Conservation of Methane from Colorado's Mined/Minable Coal Beds: A Feasibility Study*," Open–File Report 80–5, Colorado Geological Survey, Department of Nautral Resources, Denver, Colorado, Oct. 1980, 101 pages.

B.G. kta and T. Ertekin, "*Implementation of a Local Grid Refinement Technique in Modeling Slanted, Undulating Horizontal and Multi–Lateral Wells*," SPE 56624, Society of Petroleum Engineers, Copyright 1999, 10 pages.

W. H. Leach Jr., "*New Technology for CBM Production*," Oil and Gas Investor, Opportunities in Coalbed Methane, Dec. 2002, 6 pages.

David Wagman, "*CBM Investors Keep Their Guard Up*," Oil and Gas Investor, Opportunities in Coalbed Methane, Dec. 2002, 5 pages.

Stephen D. Schwochow, "*CBM: Coming to a Basin Near You*," Oil and Gas Investor, Opportunities in Coalbed Methane, Dec. 2002, 7 pages.

"*White Paper: Guidebook on Coalbed Methane Drainage for Underground Coal Mines*," paper prepared under U.S. Environmental Protection Agency Cooperative Agreement No. CX824467–01–0 with The Pennsylvania State University by Jan M. Mutmansky, Apr. 1999, 50 pages.

M.G. Zabetakis, Maurice Deul, and M.L. Skow, "*Methane Control in United States Coal Mines–1972*," Information Circular 8600, United States Department of the Interior, Bureau of Mines Information Circular/1973, 26 pages.

B. Goktas, "*A Comparative Analysis of the Production Charateristics of Cavity Completions and Hydraulic Fractures in Coalbed Methane Reservoirs*," Society of Petroleum Engineers, SPE 55600, Copyright 1999, 10 pages.

William P. Diamond and David C. Oyler, "*Drilling Long Horizontal Coalbed Methane Drainage Holes from a Directional Surface Borehole*," Society of Petroleum Engineers, SPE/DOE 8968, 1980, 6 pages.

Turgay Ertekin, Wonmo Sung, and Fred C. Schwerer, "*Production Performance Analysis of Horizontal Drainage Wells for the Degasification of Coal Seams*," Journal Of Petroleum Technology, May 1988, 8 pages.

Patrick B. Tracy, "*Lateral Drilling Technology Tested on UCG Project*," IADC/SPE 17237, IADC/SPE Drilling Conference, Copyright 1988, 10 pages.

P.S. Sarkar and J.M. Rajtar, "*Transient Well Testing of Coalbed Methane Reservoirs With Horizontal Wells*," SPE 27681, Society of Petroleum Engineers, Copyright 1994, 9 pages.

R.A. Schraufnagel, D.G. Hill and r.A. McBane, "*Coalbed Methane–A Decade of Success*," SPE 28581, Society of Petroleum Engineers, Copyright 1994, 14 pages.

J.R. Kelafant, C.M. Boyer, and M.D. Zuber, "*Production Potenital and Strategies for Coalbed Methane in the Central Appalachian Basin*," SPE 18550, Society of Petroleum Engineers, Copyright 1988, 8 pages.

Ian Palmer, John McLennan, and Mike Kutas, "*Completions and Stimulations for Coalbed Methane Wells*," SPE 30012, Society of Petroleum Engineers, Copyright 1995, 13 pages.

John E. Jochen and Bradley M. Robinson, "*Survey of Horizontal Gas Well Activiety*," SPE 35639, Society of Petroleum Engineers, Copyright 1996, 5 pages.

R.G. Jeffrey, J.R. Enever, J.H. Wood, J.P. Connors, S.K. Choi, K.T.A. Meaney, D.A. Casey, and R.A. Loenig, "*A Stimulation and Production Experiment in a Vertical Coal Seam Gas Drainage Well*," SPE 36982, Society of Petroleum Engineers, Copyright 1996, 7 pages.

Matt C. Rowan and Michael J. Whims, "*Multilateral Well Enhances Gas Storage Deliverability,*" Oil & Gas Journal, Dec. 25, 1995, 4 pages.

Dan Themig, "*Planning and Evaluation are Crucial to Multilateral Wells,*" Petroleum Engineer International Jan. 1996, 3 pages.

Larry Comeau, Randy Pustanyk, Ray Smith and Ian Gilles, "*Lateral Tie–Back System Increases Reservoir Exposure,*" World Oil, Jul. 1995, 5 pages.

J. Smith, M.J. Economides and T.P. Frick, "*Reducing Economic Risk in Areally Anisotropic Formations With Multiple–Lateral Horizontal Wells,*" SPE 30647, Society of Petroleum Engineers, Copyright 1995, 14 pages.

Scott Thomson, Andrew Lukas, and Duncan McDonald, "*Maximising Coal Seam Methane Extraction through Advanced Drilling Techonolgy,*" Lucas, Technical Paper, Second Annual Australian Coal Seam & Mine Methane Conference, Feb. 19–20, 2003, 14 pages.

William P. Diamond and David C. Oyler, "*Directional Drilling for Coalbed Degasification in Advance of Mining,*" Proceedings of the $2^{nd}$ Annual Methane Recovery from Coalbeds Symposium, Apr. 18–20, 1979, 17 pages.

John L. Stalder, Gregory D. York, Robert J. Kopper, Carl M. Curtis and Tony L. Cole, and Jeffrey H. Copley, "*Multilateral–Horizontal Wells Increase Rate and Lower Cost Per Barrel in the Zuata Field, Faja, Venezuela,*" SPE 69700, Society of Petroleum Engineers, Copyright 2001, 9 pages.

Brent Lowson, "*Multilateral–Well Planning,*" Synopsis of SPE 39245, JPT, Jul. 1998, 4 pages.

A. Njaerheim, R. Rovde, E. Kvale, S.A. Kvamme and H.M. Bjoerneli, "*Multilateral Well in Low–Productivity Zones,*" Synopsis of SPE 39356, JPT, Jul. 1998, 4 pages.

S.W. Bokhari, A.J. Hatch, A. Kyei, and O.C. Werngren, "*Improved Recovery from Tight Gas Sands with Multilateral Drilling,*" Synopsis of SPE 38629, JPT, Jul. 1998, 4 pages.

S.K. Vij, S.L. Narasaiah, Anup Walia, and Gyan Singh, "*Adopting Multilateral Technology,*" Synopsis of SPE 39509, JPT, Jul. 1998, 3 pages.

William P. Diamond, David C. Oyler, and Herbert H. Fields, "*Directionally Controlled Drilling to Horizontally Intercept Selected Strata, Upper Freeport Coalbed, Green County, PA,*" Bureau of Mines Report of Investigations/1977, RI 8231, 1977, 25 pages.

David C. Oyler, William P. Diamond, and Paul W. Jeran, "*Directional Drilling for Coalbed Degasification,*" Program Goals and Progress in 1978, Bureau of Mines Report of Investigations/1979, RI 8380, 1979, 17 pages.

United States Department of the Interior, "*Methane Control Research: Summary of Results, 1964–80,*" Bureau of Mines Bulletin, Bulletin 687, 1988, 188 pages.

EPA, "*Identifying Opportunities for Methane Recovery at U.S. Coal Mines: Profiles of Selected Gassy Underground Coal Mines 1997–2001,*" EPA Publication EPA 430–K–04–003, Jul. 2004, 202 pages.

Marshall DeLuca, "*Multilateral Completions on the Verge of Mainstream,*" Offshore, Apr. 1997, 2 pages.

Bob Williams, "*Operators Unlocking North Slope's Viscous Oil Commerciality,*" Oil & Gas Journal, Aug. 6, 2001, 5 pages.

James P. Oberkircher, "*The Economic Viability of Multilateral Wells,*" IADC/SPE 59202, Society of Petroleum Engineers, Copyright 2000, 10 pages.

Jim Oberkircher, "*What is the Future of Multilateral Technology?,*" World Oil, Jun. 2001, 3 pages.

Rick Von Flatern, "*Operators Are Ready For More Sophisticated Multilateral Well Technology,*" Petroleum Engineer International, Jan. 1996, 4 pages.

Kyle S. Graves, "*Multilateral Horizontal Drainholes Can Improve Production,*" Oil & Gas Journal, OGJ Special, Feb. 14, 1994, 5 pages.

Guntis, Moritis, "*Sincor Nears Upgrading, Plateau Production Phase,*" Oil & Gas Journal, Oct. 29, 2001, 1 page.

Guntis Moritis, "*Smart, Intelligent Wells,*" Oil & Gas Jounal, Apr. 2, 2001, 6 pages.

Craig Coull, "*Intelligent Completion Provides Savings for Snorre TLP,*"Oil & Gas Journal, Apr. 2, 2001, 2 pages.

D.T. Vo and M.V. Madden, "*Performance Evaluation of Trilateral Wells: Field Examples,*" SPE 28376, Society of Petroleum Engineers, copyright 1994, 16 pages.

Dean E. Gaddy, "*Pioneering Work, Economic Factors Provide Insights Into Russian Drilling Technology,*" Oil & Gas Journal, Jul. 6, 1998 3 pages.

"*Optimal Multilateral–Well Design for a Heavy–Oil Reservoir,*" Synopsis of SPE 37554 by D.W. Boardman, JPT, Jul. 1997, 3 pages.

"*Multilateral–Well Completion–System Advances,*" Synopsis of SPE 39125 by J.R. Longbottom et al., JPT, Jul. 1997, 3 pages.

"*Optimal Multilateral/Multibranch Completions,*" Synopsis of SPE 38033 by Hironori Sugiyama et al., JPT, Jul. 1997, 5 pages.

"*Multilateral Experiences: IDD El Shargi North Dome Field (QATAR),*" Synopsis of SPE 37675 by J.R. Scofield et al., JPT, Jul. 1997, 3 pages.

"*Moving Toward the 'Intelligent Well',*" Synopsis of SPE 39126 by Clark E. Robison, JPT, Jul. 1997, 3 pages.

"*Short–Radius Laterals: An Operator's Experience,*" Synopsis of SPE 37493 by C. Ellis et al., JPT, Jul. 1997, 3 pages.

"*Analyzing a Multilateral–Well Failure,*" Synopsis of SPE 38268 by A. Ray Brister, JPT, Jul. 1997, 3 pages.

"*A New Concept for Multibranch Technology,*" Synopsis of SPE 39123 by Mark Stracke et al., JPT, Jul. 1997, 3 pages.

"*Classification Clarifies Multilateral Options,*" Synopsis of SPE 38493 by C. Hogg, JPT, Jul. 1997, 3 pages.

"*Infill Development With Multilateral–Well Technology,*" Synopsis of SPE 38030 by Sau–Wai Wong et al., JPT, Jul. 1997, 3 pages.

Brad Califf and Denny Kerr, "*UPRC Completes First Quad–Lateral Well,*" Petroleum Engineer International, Sep. 1993, 4 pages.

Jack Winton, "*Use of Multi–lateral Wells to Access Marginal Reservoirs,*" Offshore, Feb. 1999, 3 pages.

J.R. Salas, P.J. Clifford and D.P. Jenkins, "*Brief: Multilateral Well Performance Prediction,*" JPT, Sep. 1996, 3 pages.

Mike R. Chambers, "*Multilateral Technology Gains Broader Acceptance,*" Oil & Gas Journal, Nov. 23, 1998, 5 pages.

S. Ikeda, T. Takeuchi, and P.C. Crouse, "*An Investigative Study on Horizontal Well and Extended Reach Technologies With Reported Problem Areas and Operational Practice in North America and Europe,*" IADC/SPE 35054, Society of Petroleum Engineers, Copyright 1996, 8 pages.

Greg Nazzal, "*Extended–Reach Wells Tap Outlying Reserves,*" World Oil, Mar. 1993, 8 pages.

Bambang Tjondrodiputro, Harry Eddyarso and Kim Jones, "*How ARCO Drills High–Angle Wells Offshore Indonesia,*" World Oil, Mar. 1993, 11 pages.

S. Hovda et al., "World's First Application of a Multilateral System Combining a Cased and Cemented Junction With Fullbore Access to Both Laterals," SPE 36488, Society of Petroleum Engineers, Copyright 1996, 15 pages.

Robert A. Gardes, "Micro-annulus Under-balanced Drilling of Multilateral Wells," Offshore, May 1996, 4 pages.

Brent Lowson, "Phillips Multilateral Features Several Firsts for North Sea," Offshore, Feb. 1997, 2 pages.

J.R. Scofield, B. Laney and P. Woodard, "Field Experience With Multi-laterals in the Idd El Shargi North Dome Field (Qatar)," SPE/IADC 37675, Society of Petroleum Engineers, Copyright 1997, 11 pages.

Jeremy Beckman, "Coiled Tubing, Reamer Shoes Push Through Barriers in North Sea Wells," Offshore, Feb. 1997, 1 page.

C.H. Fleming, "Comparing Performance of Horizontal Versus Vertical Wells," World Oil, Mar. 1993, 7 pages.

Larry A. Cress and Stephen W. Miller, "Dual Horizontal Extension Drilled Using Retrievable Whipstock," World Oil, Jun. 1993, 9 pages.

Guntis Moritis, "Heavy Oil Expansions Gather Momentum Worldwide," Oil & Gas Journal, Aug. 14, 1995, 6 pages.

K.W. Hart and L.V. Jankowski, "The Application of Slant Hole Drilling in Development of Shallow Heavy Oil Deposits," The Journal Of Canadain Petroleum Technology,Jan. - Feb. 1984, Montreal, 6 pages.

Jeff Smith and Bob Edwards, "Slant Rigs Offer Big Payoffs in Shallow Drilling," Oil & Gas Journal, Mar. 30, 1992, 3 pages.

Ravil Gabdullinovich Salikhov, Evgeny Fedyorovich Dubrovin, and Vladimir Vladimirovich Sledkov, "Cluster and Dual-Lateral Drilling Technologies Optimize Russian Well Production," Oil & Gas Journal, Nov. 24, 1997, 7 pages.

Dean E. Gaddy, "Inland Barge to Allow Cluster Drilling in Nigeria," Oil & Gas Journal, Aug. 30, 1999, 7 pages.

Cliff Hogg, "Comparision of Multilateral Completion Scenarios and Their Application," SPE 39493, Society of Petroleum Engineers, Copyright 1997, 11 pages.

S.W. Bokhari, A.J. Hatch, A. Kyei and O.C, Wemgren, "Improved Recoveries in the Pickerill Field from Multilateral Drilling into Tight Gas Sands," SPE 38629, Society of Petroleum Engineers, Copyright 1997, 15 pages.

J.R. Longbottom, Dana Dale, Kevin Waddell, Scott Bruha, and John Roberts, "Development, Testing and Field Case Histories of Multilateral Well Completion Systems," SPE 36994, Society of Petroleum Engineers, Copyright 1996, 16 pages.

E.J. Antczak, D.G.L. Smith, D.L. Roberts, Brent Lowson, and Robert Norris, "Implementation of an Advanced Multi-Lateral System With Coiled Tubing Accessibility," SPE/IADC 37673, Society of Petroleum Engineers, Copyright 1997, 9 pages.

H. Azoba, O. Akinmoladun, H. Rothenhofer, D. Kent and N. Nawfal, "World Record Dual-and Tri-lateral Wells," SPE/IADC 39240, Society of Petroleum Engineers, Copyright 1997, 6 pages.

R.W. Taylor and Rick Russell, "Case Histories: Drilling and Completing Multilateral Horizontal Wells in the Middle East," SPE/IADC 39243, Society of Petroleum Engineers, Copyright 1997, 14 pages.

D.K. Triolo and R.A. Mathes, "Review of a Multi-Lateral Drilling and Stimulation Program," SPE/IADC 39242, copyright 1997, Society of Petroleum Engineers, 13 pages.

John H. Perry, Leonard J. Prosser, Jr., Joseph Cervik, "Methane Drainage from the Mary Lee Coalbed, Alabama, Using Horizontal Drilling Techniques," SPE/DOE 8967, Society of Petroleum Engineers, May 18, 1980, 6 pages.

Gerald L. Finfinger, Leonard J. Prosser, and Joseph Cervik, "Influence of Coalbed Characteristics and Geology on Methane Drainage," SPE/DOE 8964, Society of Petroleum Engineers, May 18, 1980, 6 pages.

Hilmer Von Schonfeldt, B. Rao Pothini, George N. Aul and Roger L. Henderson "Production and Utilization of Coalbed Methane Gas in Island Creek Coal Company Mines," SPE/DOE 10817, Society of Petroleum Engineers, May 16, 1982, 10 pages.

Joseph Cervik, H.H. Fields, and G.N. Aul, "Rotary Drilling Holes in Coalbeds for Degasification," RI 8097, Bureau of Mines Reporting of Investigations, 1975, 26 pages.

D.G. Masszi and A.A. Kahil, "Coal Demethanation Principles and Field Experience," The Journal Of Canadian Petroleum Technology, Jul.–Aug. 1982, 4 pages.

Tobias W. Goodman, Joseph Cervik, and George N. Aul, "Degasification Study From an Air Shaft in the Beckley Coalbed," RI 8675, Bureau of Mines Report of Investigations, 1982, 23 pages.

P.C. Thakur and H.D. Dahl, "Horizonial Drilling–A Tool for Improved Productivity," Mining Engineering, Mar. 1982, 3 pages.

P.C. Thakur and J.G. Davis II, "How to Plan for Methane Control in Underground Coal Mines," Mining Engineering, Oct. 1977, 5 pages.

A.B. Yost II and B.H. Javins, "Overview of Appalachian Basin High-Angle and Horizontal Air and Mud Drilling," SPE 23445, Society of Petroleum Engineers, Oct. 22, 1991, 14 pages.

Pramod C. Thakur, "Methane Flow in the Pittsburgh Coal Seam," Third International Mine Ventilation Congress, England, U.K., Jun. 13–19, 1984, 17 pages.

Chapter 10 by Pramod C. Thakur, "Methane Control for Longwall Gobs," Longwall–Shortwall Mining, State Of The Art by R. V. Ramani, published by New York: Society of Mining Engineers of the American Institute of Mining, Metallurgical, and Petroleum Engineers, 1981, 7 pages.

Pramod C. Thakur, Stephen D. Lauer, and Joseph Cervik, "Methane Drainge With Cross-Measure Boreholes on a Retreat Longwall Face," Preprint No. 83–398, Society of Mining Engineers of AIME, for presentation at the SME–AIME Fall Meeting and Exhibit, Salt Lake City, Utah, Oct. 19–21, 1983, 14 pages.

Warren F. Dobson and Daniel R. Seelye, "Mining Technology Assists Oil Recovery from Wyoming Field," SPE 9418, Society of Petroleum Engineers of AIME, Copyright 1980, 7 pages.

T.L. Logan, J.J. Schwoebel and D.M. Horner, "Application of Horizontal Drainhole Drilling Technology for Coalbed Methane Recovery," SPE/DOE 16409, Society of Petroleum Engineers/U.S. Department of Energy, Copyright 1997, 12 pages.

Samuel O. Osisanya and Robert F. Schaffitzel, "A Review of Horizontal Drilling and Completion Techniques for Recovery of Coalbed Methane," SPE 37131, Society of Petroleum Engineers, Copyright 1996, 13 pages.

S.D. Joshi, "A Review of Horizontal Well and Drainhole Technology," SPE 16868, Society of Petroleum Engineers, Copyright 1987, 17 pages.

R. Bitto, A.B. Henderson and L. Broussard, "*Recent Case Histories of New Well Applications for Horizontal Drilling*," SPE 21262, Society of Petroleum Engineers, Copyright 1990, 12 pages.

M.R. Konopezynski, John Hughes and J.E. Best, "*A Novel Approach to Initialing Multi–Lateral Horizontal Wells*," SPE/IADC 29385, Society of Petroleum Engineers, Copyright 1996, 11 pages.

Kelly Falk and Craig McDonald, "*An Overview of Underbalanced Drilling Applications in Canada*," SPE 30129, Society of Petroleum Engineers, Copyright 1995, 9 pages.

"*Evolution Toward Simpler, Less Risky Multilateral Wells*," World Oil, prepared from paper SPE/IADC 67825 by Adam Pasicznky, Jun. 2001, 8 pages.

"*How Multilateral Boreholes Impact Ultimate Recovery Strategies*," Offshore, Jul. 1997, 6 pages.

"*Trilateral Horizontal Wells Add 10 Million bbl for Unocal*," Offshore, Dec. 1993, 2 pages.

Nicholas P. Chironis, "*New Borehole Techniques Offer Hope for Gassy Mines*," Coal Age, Jan. 1973, 4 pages.

A. Retnanto, T.P. Frick, C.W. Brand, and M.J. Economides, "*Optimal Configurations of Multiple–Lateral Horizontal Wells*," SPE 35712, Society of Petroleum Engineers, Copyright 1996, 8 pages.

T.L. Logan, "*Horizontal Drainhole Drilling Techniques Used for Coal Seam Resource Exploitation*," SPE 18254, Society of Petroleum Engineers, Copyright 1988, 13 pages.

David Hill, Eric Neme, Christine Enlig–Economides and Miguel Mollinedo, "*Reentry Drilling Gives New Life to Aging Fields*," Oilfield Review, Autumn 1996, 11 pages.

R.L. Thoms and R.M. Gehle, "*Feasibility of Controlled Solution Mining From Horizontal Wells*,"Solution Mining Research Mining Research Institute, Oct. 24–27, 1993, 8 pages.

"*World's First Trilateral Horizontal Wells on Stream*," Oil & Gas Journal, Nov. 29, 1993, 2 pages.

Margaret A. Adams, Jeanne L. Hewitt and Rodney D. Malone, "*Coalbed Methane Potential of the Appalachians*," SPE/DOE 10802, Society of Petroleum Engineers, Copyright 1982, 10 pages.

F.C. Schwerer and A.M. Pavone, "*Effect of pressure–Dependent Permeability on Well–Test Analyses and Long–Term Production of the Methane From Coal Seams*," SPE/DOE/ 12857, Society of Petroleum Engineers, Copyright 1984, 10 pages.

Stephen Krickovic and J.D. Kalasky, "*Methane Emission Rate Study in a Deep Pocaontas No. 3 Coalbed Mine in Conjunction With Drilling Degasification Holes in the Coalbed*," RI–7703, Bureau of Mines Report of Investigations/ 1972, United States Department of the Interior, 1972, 15 pages.

H.H. Fields, Joseph Cervik, and T.W. Goodman, "*Degasification and Production of Natural Gas From an Air Shaft in the Pittsburgh Coalbed*," RI–8173, Bureau of Mines Report of Investigations,/1976, United States Department of the Interior, 1976, 28 pages.

Gerald L. Finfinger and Joseph Cervik, "*Drainage of Methane From the Overlying Pocahontas No. 4 coalbed From Workings in the Pocahontas No. 3 Coalbed*," RI–8359, Bureau of Mines Report of Investigations/1979, United States Department of the Interior, 1979, 19 pages.

Gerald L. Finfinger and Joseph Cervik, "*Review of Horizontal Drilling Technology for Methane Drainage From U.S. Coalbeds*," IC–8829, Bureau of Mines Information Circular/1980, United States Department of the Interior, 1980, 24 pages.

Andre P. Jourdan and Guy A. Baron, "*Elf Drills 1,000 –Ft Horizontally*," Petroleum Engineer International, Sep. 1981, 4 pages.

P.F. Conti, "*Controlled Horizontal Drilling*," SPE/IADC 18708, Society of Petroleum Engineers, Copyright 1989, 6 pages.

Armando R. Navarro, "*Innovative Techniques Cut Costs in Wetlands Drilling*," Oil & Gas Journal, Oct. 14, 1991, 4 pages.

Victor M. Luhowy and Peter D. Sametz, "*Horizontal Wells Prove Effective in Canadian Heavy–Oil Field*," Oil & Gas Journal, Jun. 28, 1993, 6 pages.

D. Lane Becker, "*Project Management Improved Multiwell Shallow Gas Development*," Oil & Gas Journal, Oct. 16, 1995, 5 pages.

Mike R. Chambers, "*Junction Design Based on Operational Requirements*," Oil & Gas Journal, Dec. 7, 1998, 7 pages.

A.J. Branch, et al., "*Remote Real–Time Monitoring Improves Orinoco Drilling Efficiency*," Oil & Gas Journal, May 28, 2001, 6 pages.

D. Keith Murray, "*Deep Coals Hold Big Part of Resource*," The American Oil & Gas Reporter, May 2002, 8 pages.

Nestor Rivera, et al., "*Multilateral, Intelligent Well Completion Benefits Explored*," Oil & Gas Journal, Apr. 14, 2003, 10 pages.

Handbook On Coal Bed Methane Produced Water: Management And Beneficial Use Alternatives, prepared by ALL Consulting, Jul. 2003, 321 pages.

Nikola Maricic, "*Parametric and Predictive Analysis of Horizontal Well Configurations for Coalbed Methane Reservoirs in Appalachian Basin*," Thesis, West Virginia University, Department of Petroleum and Natural Gas Engineering, 2004, 162 pages.

Nikola Maricic, Shahab D. Mohaghegh, and Emre Artun, "*A Parametric Study on the Benefits of Drilling Horizontal and Multilateral Wells in Coalbed Methane Reservoirs*," SPE 96018, Society of Petroleum Engineers, Copyright 2005, 8 pages.

D.P. Schlick and J.W. Stevenson "*Methane Degasification Experience at Jim Walter's*," Proceedings of the Twelfth Annual Institute on Coal Mining Health, Safety and Research, Aug. 25–27, 1981, 9 pages.

P.C. Thakur, "*Optimum Methane Drainage in Gassy Coal Mines*," 2003 SME Annual Meeting, copyright 2003 by SME, 4 pages.

Global Methane and the Coal Industry: A Two–Part Report on Methane Emissions from the Coal Industry and Coalbed Methane Recovery and Use, Coal Industry Advisory Board, International Energy Agency, copyright 1994, 72 pages.

Paul F. Conti and Michael Schumacher, "*Solution Mining in the Nineties*," Presented at the Fall 1991 meeting of the Solution Mining Research Institute, Oct. 27–30, 1991, 11 pages.

Notification of Transmittal of the International Preliminary Report on Patentability (1 page), International Preliminary Report on Patentability (7 pages) and Amended Sheets (9 pages) for International Application No. PCT/US2004/ 012029 mailed Aug. 11, 2005.

Notification Concerning Transmittal of Copy of International Preliminary Report on Patentability (1 page), International Preliminary Report on Patentability (1 page), and Written Opinion (5 pages) for International Application No. PCT/US2005/005289 mailed Sep. 8, 2006.

Invitation to Pay Additional Fees (2 pages) and Annex to Form PCT/ISA/206 Communication Relating to the Results of the Partial International Search (3 pages) for International Application No. PCT/US2006/021057 mailed Sep. 11, 2006.

Kalinin, D.G., et al., Translation of Selected Pages, "Boring Direction and Horizontal Wells," Moscow,"Nedra", 1997, pp. 11–12, 148–152 (15 pages).

Evaluation of Coalbed Methane Well Types in the San Juan Basin, prepared by Malkewicz Hueni Associates, Inc. for The Bureau of Land Management, Mar. 2004, 23 pages.

Robert William Chase, "*Degasification of Coal Seams Via vertical Boreholes: A Field and Computer Simulation Study*," Thesis in Petroleum and Natural Gas Engineering, Mar. 1980, 174 pages.

L.Z. Shuck and J. Pasini III, "In Situ Gasification of Eastern Coals," presented at the proceedings of the Coal Processing and Conversion Symposium, Jun. 1–3, 1976, Morgantown, West Virginia, 16 pages.

Terry L. Logan, "Application of Medium Radius Horizontal Drainhole Drilling Technology for Underground Coal Gasification," presented at 13[the] Annual Underground Coal Gasification Symposium, Aug. 24–26, 1987, Laramie, Wyoming, 10 pages.

S.R. Lindblom and V.E. Smith, "Rocky Mountain 1 Underground Coal Gasification Test," Hanna, Wyoming, Groundwater Evaluation, DOE Grant No. DE–FG21–88MC25038, Final, Jun. 10, 1988–Jun. 30, 1993, 5 pages.

Coal–Bed Methane: Potential and Concerns, U.S. Department of the Interior, U.S. Geological Survery USGS Fact Sheet FS–123–00, Oct. 2000, 2 pages.

Horizontal and Multilateral Wells Society of Petroleum Engineers, website: http://www.spe.org/spe/jsp/basic_pf/0,, 1104_1714_1003974,00.html, printed Dec. 27, 2006, 5 pages.

Notification of Transmittal of the International Search Report and the Written Opinion of the International Searching Authority, or the Declaration (3 pages), International Search Report (7 pages), and Written Opinion of the International Searching Authority (7 pages) for International Application No. PCT/US2006/021057 dated Jan. 4, 2007.

I.D. Palmer, M.J. Mavor, J.L. Spitler and R.F. Volz, "*Openhole Cavity Completions in Coalbed Methane Wells in the San Juan Basin*," Journal of Petroleum Technology, vol. 45, No. 11, Nov. 1993, 11 pages.

V.S. Orlov, et al., "*Methods for Simultaneous Segregated Production from Multiple Formations Using Single Well*," Series Petroleum Engineering, Moscow, Aurdiomeogi, 1976, translated pp. 6–11, 28–29 and 36–37, 15 pages.

Kalinin A.G. et al., "*Boring of Slanted and Horizontal Well Bores*," Moskva, Nedra, 1997, pp. 453–458, Sections 11.2, 11.22, and 11.23, 10 pages.

* cited by examiner

METHOD AND SYSTEM FOR UNDERGROUND TREATMENT OF MATERIALS

BACKGROUND OF THE INVENTION

The use of underground well bores to access and recover subsurface resources is well-known. For example, water, oil, gas and other hydrocarbons as well as other underground resources may be recovered by drilling from the surface to an underground formation containing the resource and producing the resource through the well bore to the surface.

Underground well bores may be used in conjunction with each other to inject a treatment solution and recover a byproduct. For example, precious metals may be mined by injecting a treatment solution into a deposit and recovering the solution plus dissolved precious minerals. The precious mineral is then recovered from the mixture at the surface. Also, heavy oil may be recovered from a tar sand or other zone by injecting steam into a first well and recovering oil pushed by the steam to a second well. In addition to recovering resources, injection and recovery wells may be used to recover underground contaminants posing a danger to the environment.

SUMMARY OF THE INVENTION

The present invention provides a method and system for underground treatment of materials that substantially reduces or eliminates problems associated with previous methods and systems. A method for underground treatment of subsurface materials comprises providing an injection pattern and a recovery pattern, the injection pattern and the recovery pattern located proximate to a subsurface treatment zone and at least one of the injection pattern and the recovery pattern comprising a plurality of lateral bores extending from a main bore. A treatment solution is injected through the injection pattern and recovered through the recovery pattern.

In a particular embodiment, a pinnate or other suitable pattern operable to access a large subsurface region may be used to inject and/or recover materials underground. In another embodiment, intersection or cooperating patterns may be used to collect, store, and/or process materials underground. In still another embodiment, cavities and horizontal bores are used to create connection points to control and/or regulate the flow of fluids, gases, and other materials underground.

Technical advantages of one or more embodiments of the present invention include providing an improved method and system for underground treatment of materials. In particular, underground resources, contaminants or other materials may be accessed through a pinnate or other access pattern having a large and uniform coverage area to allow underground processing of the materials. As a result, underground materials may be efficiently processed or treated within a formation containing the materials, thus minimizing the need for surface removal and treatment.

Another technical advantage of one or more embodiments of the present invention includes providing an improved method and system for solution mining of underground resources. In particular, the agent or the solution may be injected through a pinnate pattern with a large coverage area to recover a large volume of a resource with minimal drilling and production cost.

Still another technical advantage of one or more embodiments of the present invention includes providing an improved method and system for treating underground contaminants. In particular, underground contaminants may be neutralized by saturation of a treatment solution over a large area of the contaminated zone or driven in large volume between injection and collection patterns. In addition, vertical plumes of contamination may be contained and treated by a plurality of vertical or other pinnate injection and recovery patterns.

Yet another technical advantage of one or more embodiments of the present invention includes providing an underground circuit for processing materials. In particular, materials may be injected through patterns into the ground, pumped within the underground patterns and percolated through target zones between the patterns to process the materials underground without removal to the surface. In addition, connection points between underground zones, bores, and/or patterns are created with cavities and horizontal bores to control and regulate fluid and gas flows and processing. Accordingly, processing costs and equipment are reduced.

Various embodiments of the present invention may include some, all, or none of these and other described technical advantages. In addition, other technical advantages of the present invention may be readily apparent to one skilled in the art from the following figures, description, and claims.

DESCRIPTION OF THE DRAWINGS

For a more complete understanding of the present invention and its advantages, reference is now made to the following description taken in conjunction with the accompanying drawings, wherein like numerals represent like parts, and which.

DETAILED DESCRIPTION OF THE INVENTION

Figure 1A:
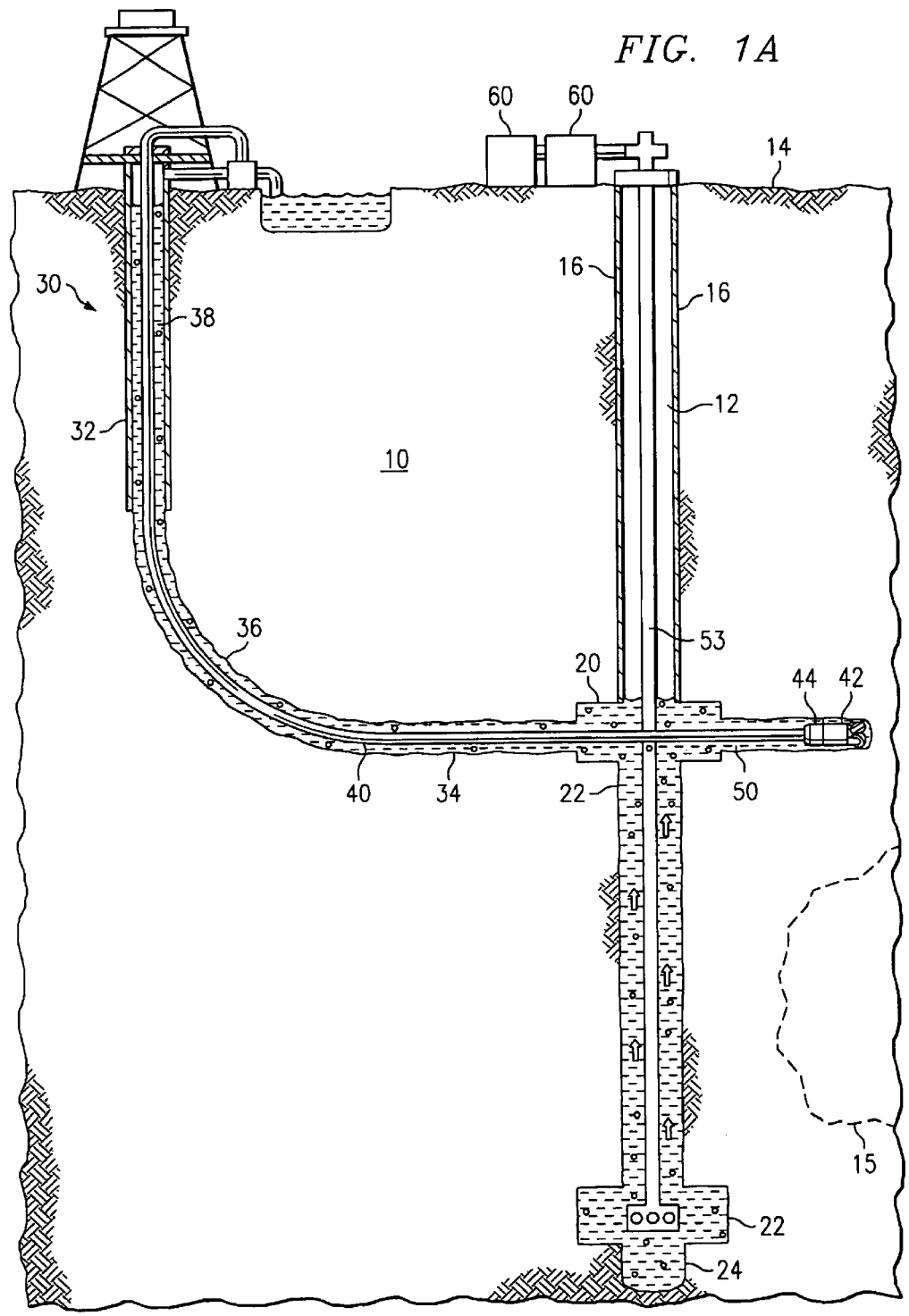
FIGS. 1A and 1B are diagrams illustrating an underground treatment system in accordance with one embodiment of the present invention.
Figure 1B:
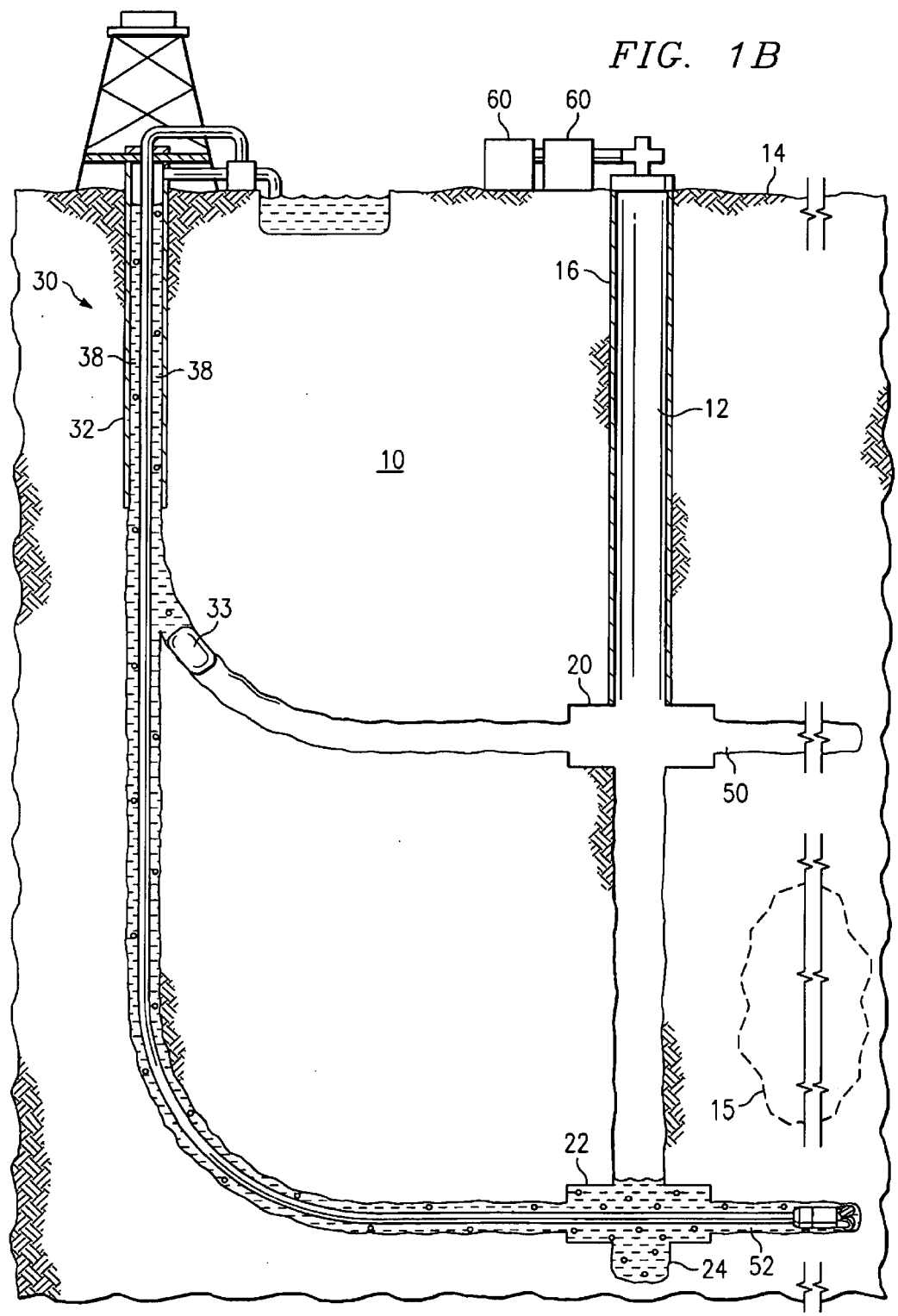

FIG. 1A and 1B are diagrams illustrating a method of providing an underground treatment system in accordance with one embodiment of the present invention.

Referring to FIG. 1A, system 10 includes a well bore 12 extending from the surface 14 to below or otherwise proximate to the level of a subterranean treatment zone 15. In FIGS. 1A and 1B, well bore 12 is illustrated substantially vertical; however, it should be understood that well bore 12 may be formed at other suitable angles. Substantially vertical means vertical or within 40° of vertical.

Subterranean treatment zone 15 may comprise a zone of precious metals mineable with an underground leachate treatment process, a zone of tar sand from which oil may be recoverable by an underground steam treatment process, a plume of underground contaminants treatable with an underground chemical or biological remediation process, or another suitable zone of materials treatable underground using the system and/or method of the present invention.

Enlarged cavities 20 and 22 are formed in the well bore 12. As described in more detail below, the enlarged cavities 20 and 22 provide a junction for intersection of the well bore 12 by an articulated well bore used to form subterranean well bore patterns. The enlarged cavities 20 and 22 may also provide a collection point from fluids drained from the zone 15. Enlarged cavity 20 may be formed at or above a vertical level corresponding to the top of the subterranean treatment zone 15, and cavity 22 may be formed at or below a vertical level corresponding to the bottom of the subterranean treatment zone 15. In this way, subterranean well bore patterns may be formed at or near the top and bottom of the subterranean treatment zone 15, as described further below. While the embodiment shown in FIGS. 1A and 1B shows two cavities, additional cavities may be formed so as to, for example, extend additional well bore patterns into the middle of the zone 15.

In one embodiment, the enlarged cavity 20 has a radius of approximately eight feet and a vertical dimension of approximately eight feet. In another embodiment, the cavity 20 may have a substantially rectangular cross section perpendicular to an articulated well bore for intersection by the articulated well bore and a narrow width through which the articulated well bore passes. The enlarged cavities 20 and 22 are formed using suitable under-reaming techniques and equipment. A portion of the well bore 12 may continue below the enlarged cavity 22 to form a sump 24 for the cavity 22. The well bore 12 may be lined with a suitable well casing 16 that with the illustrated embodiment, terminates at or above the level of the first cavity. In other embodiments, the cavity may be omitted if unnecessary for intersecting bores and/or not needed as a collection point.

An articulated well bore 30 extends from the surface 14 to the enlarged cavity 20 of the well bore 12. In the illustrated embodiment, the articulated well bore 30 includes a vertical portion 32, a first horizontal portion 34, and a first curved or radius portion 36 interconnecting the portions 32 and 34. In FIGS. 1A and 1B the portion 32 is illustrated substantially vertical; however, it should be understood that portion 32 may be formed at any suitable angle relative to surface 14. In the embodiment illustrated in FIGS. 1A and 1B, the portion 34 may lie substantially in a horizontal plane and intersect the enlarged cavity 20 of the well bore 12. Portion 34 may be formed at an angle relative to the surface 14 to allow the flow of fluid towards or away from the well bore 12.

In the embodiment illustrated in FIGS. 1A and 1B, the articulated well bore 30 is offset a sufficient distance from the well bore 12 at the surface 14 to permit the large radius curved section 36 and any desired portion 34 to be drilled before intersecting the enlarged cavity 20. To provide the curved portion 36 with a radius of 100–150 feet, the articulated well bore 30 is offset a distance of about 300 feet from the well bore 12. This spacing minimizes the build angle of the curved portion 36 to reduce friction in the articulated well bore 30 during drilling operations. As a result, reach of the articulated drill string drilled through the articulated well bore 30 is maximized. In another embodiment, the articulated well bore 30 and the substantially vertical well bore 12 may be positioned next to each other at the surface 14 with the substantially vertical well bore 12 slanting underground, in this way providing the necessary radius of the curved portion 36 while minimizing the area of the surface footprint.

The articulated well bore 30 is drilled using an articulated drill string 40 that includes a suitable drown hole motor and bit 42. A measurement while drilling (MWD) device 44 is included in the articulated drill string 40 for controlling the orientation and direction of the well bore drilled by the motor and bit 42. The portion 32 of the articulated well bore 30 is lined with a suitable casing 38.

After the enlarged cavity 20 has been successfully intersected by the articulated bore 30, drilling is continued through the cavity 20 using the articulated drill string 40 in to appropriate drilling apparatus to provide a first subterranean well bore pattern 50 above the level of the zone 15. In FIG. 1A, the well bore pattern 50 is illustrated substantially horizontal; however, well bore pattern 50 may be formed at any suitable angle to allow for the flow of fluid towards and/or away from the zone 15. During this operation, gamma ray logging tools and conventional measurement while drilling devices may be employed to control and direct the orientation of the drill bit 42.

Well bore pattern 50 is shown edge-on in the cross-sectional view shown in FIG. 1A; therefore, the details of the patterning are not shown. However, it will be understood that well bore pattern 50 may comprise a pattern shown in FIGS. 7–9 or another suitable pattern or patterns.

During the process of drilling the well bore pattern 50, drilling fluid or mud is pumped down the articulated drill string 40 and circulated out of the drill string 40 in the vicinity of the bit 42 where it is used to scour the bore hole and to remove formation cuttings. The cuttings are then entrained in the drilling fluid which circulates up through the annulus between the drill string 40 and the walls of the well bore 30 until it reaches the surface 14 where the cuttings are removed from the drilling fluid and the fluid is then recirculated. This conventional drilling operation produces a standard column of drilling fluid having a vertical height equal to the depth of the well bore 30 and produces a hydrostatic pressure on the well bore 30 corresponding to the well bore 30 depth.

To prevent drilling fluid from draining down into the portion of the well bore 12 below the cavity 20, during formation of the well bore pattern 50, air compressors 60 may be provided to circulate compressed air down a pipe 53 below the cavity 20, and back up through the articulated well bore 30. The circulated air velocity prevents drilling fluid and cuttings from draining into the bore below the cavity 20.

Referring to FIG. 1B, after formatting of the first well bore pattern 50, the portion 32 of the articulated well bore 30 is extended downward and intersected with cavity 22 in a similar manner as described above. In the illustrated embodiment, as described above, a second well bore pattern 50 is drilled below the level of the zone 15. Prior to drilling of second pattern 52, the pipe 53 may be removed. A packer or plug 33 may be placed in the first curved or radiused portion 34 to prevent the short circuit flow of fluids into the cavity 20 and the first well bore pattern 50. Further details concerning the packer 33 are described in reference to FIG. 3, below.

Well bore pattern 52 is shown edge-on in the cross-sectional view shown in FIG. 1B; therefore, the details of the patterning are not shown. However, it will be understood that well bore pattern 52 may comprise a pattern shown in FIGS. 7–9 or another suitable pattern or patterns.

Figure 2A:
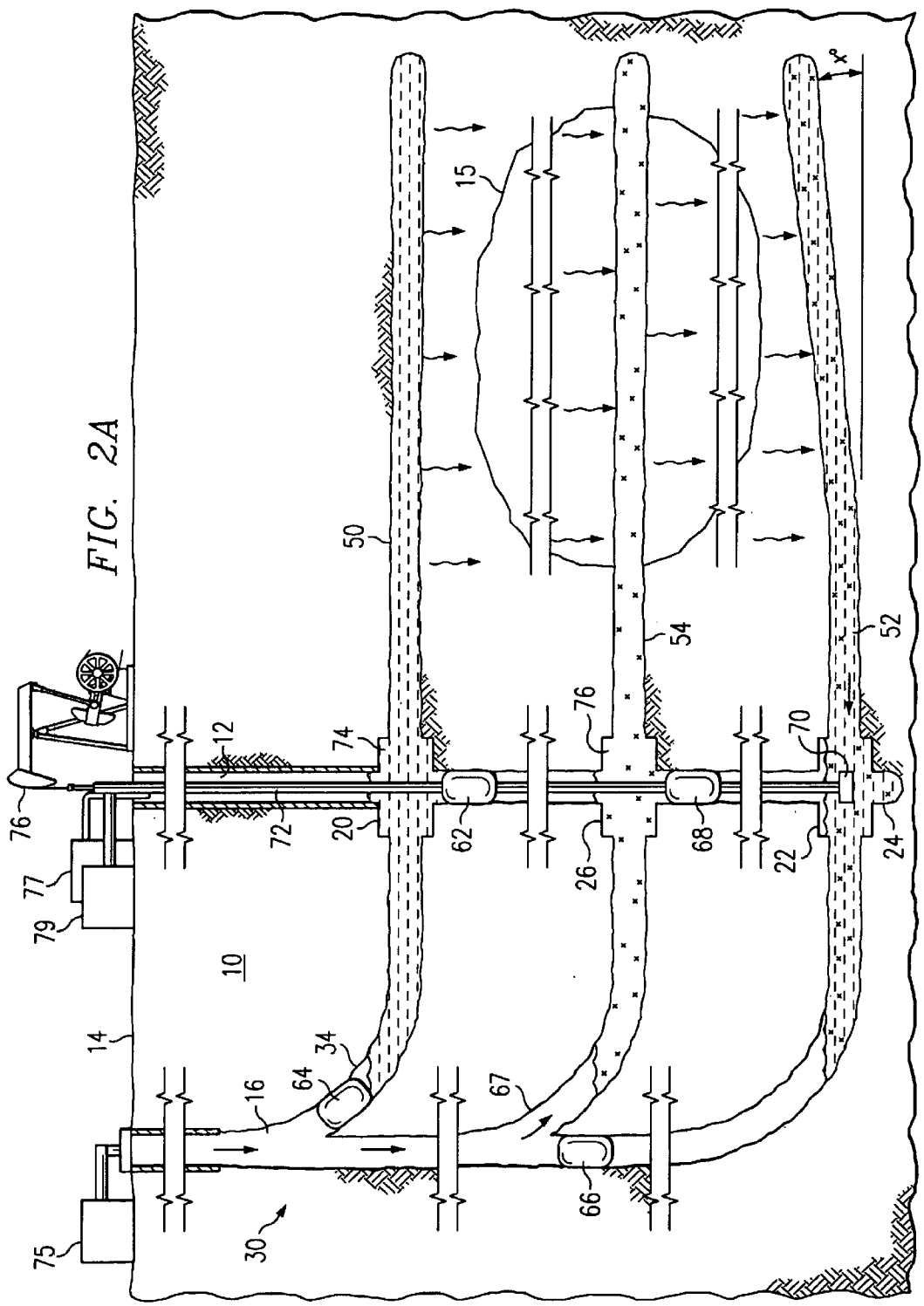
FIG. 2A is a diagram illustrating an underground treatment system in accordance with another embodiment of the present invention.

FIG. 2A is a diagram illustrating an underground treatment system in accordance with another embodiment of the present invention.

Referring to FIG. 2A, in well bore 12, the enlarged cavities 20 and 22, the articulated well bore 30, and the well patterns 50 and 52 are positioned and formed as previously described in connection with FIGS. 1A and 1B. In addition, a cavity 26 and well bore pattern 54 are illustrated, with the well bore pattern 54 penetrating the middle of the zone 15.

A down-hole pump 70 is placed in the cavity 22 proximate to the sump 24 so as to facilitate the pumping of fluid up from the sump 24. The pump is connected to the surface 14 via a tubing string 72 and maybe powered by sucker rods extending down through the tubing string 72. The sucker rods may be reciprocated by a suitable surface-mounted apparatus, such as a powered walking beam 76 to operate the down-hole pump 70. Tanks 75 and 77 may provide storage for unused and used treatment solution, and tank 79 may be provide storage for used treatment solution.

Packers 62, 64, 66 and 68 may be placed so as to provide a barrier to the movement of fluids. Packer 62 may be placed below cavity 20 in the bore 12. Packer 64 may be placed in the first curved or radiused portion 34. Packer 66 may be placed in the vertical portion of the articulated well bore 30 below the junction 67. Packer 68 may be placed below cavity 26 in the bore 12. Packers 62 and 68 may be provisioned so as to attach to the external surface of the pipe 74 and inflated via an air hose or tube (not shown). Packers 64 and 66 may be of an. inflatable or another suitable type. Further details of a packer in accordance with one embodiment of the present invention is described in conjunction with FIG. 3.

With the well bores, patterns and packers positioned as illustrated, a treatment solution 74 may be injected from tank 77 into the well bore pattern 50 via the well bore 12. A second treatment solution 76 may be injected from tank 75 into the well bore pattern 54 via the bore 30. The treatment solution 74 and 76 percolate through the zone 15 and are collected in the well bore pattern 52. In the illustrated embodiment, well bore pattern 52 may be angled slightly upward so as to facilitate the movement of the mixture of solution 74 and 76 into the cavity 22 and sump 24. The angle X° may be approximately 5° or another suitable angle. As the mixture collects in the cavity 22 and sump 24, the pump 70 lifts the mixture up to the surface 14 via the pipe 72 to be stored in tank 79.

Well bore patterns 50, 52, and 54 are shown edge-on in the cross-sectional view shown in FIG. 2A; therefore, the details of the patterning are not shown. However, it will be understood that well bore patterns 50, 52, and 54 may comprise a pattern shown in FIGS. 7–9 or another suitable pattern or patterns.

The treatment solutions 74 and 76 may comprise a reagent, neutralizer, and leaching solution, or other suitable solution used to treat the zone 15. Treatment solutions 74 and 76 may comprise either a liquid or a gas. Treatment in this context may comprise neutralizing leaching, recovery, dissolving, oxidation, reduction, or other suitable process. Treatment may also comprise biological processes or biological mediated processes (including bioremediation) in which case the treatment solution may comprise bacteria, nutrients, or other materials which may affect the metabolism, respiration, or other processes of bacteria or other organisms. In a particular embodiment, the treatment may comprise stripping recoverable product from the zone 15. In yet another embodiment, the treatment solutions may comprise gases, such as $CO_2$, $N_2$, air, or steam, used to re-pressurize depleted formations.

Figure 2B:
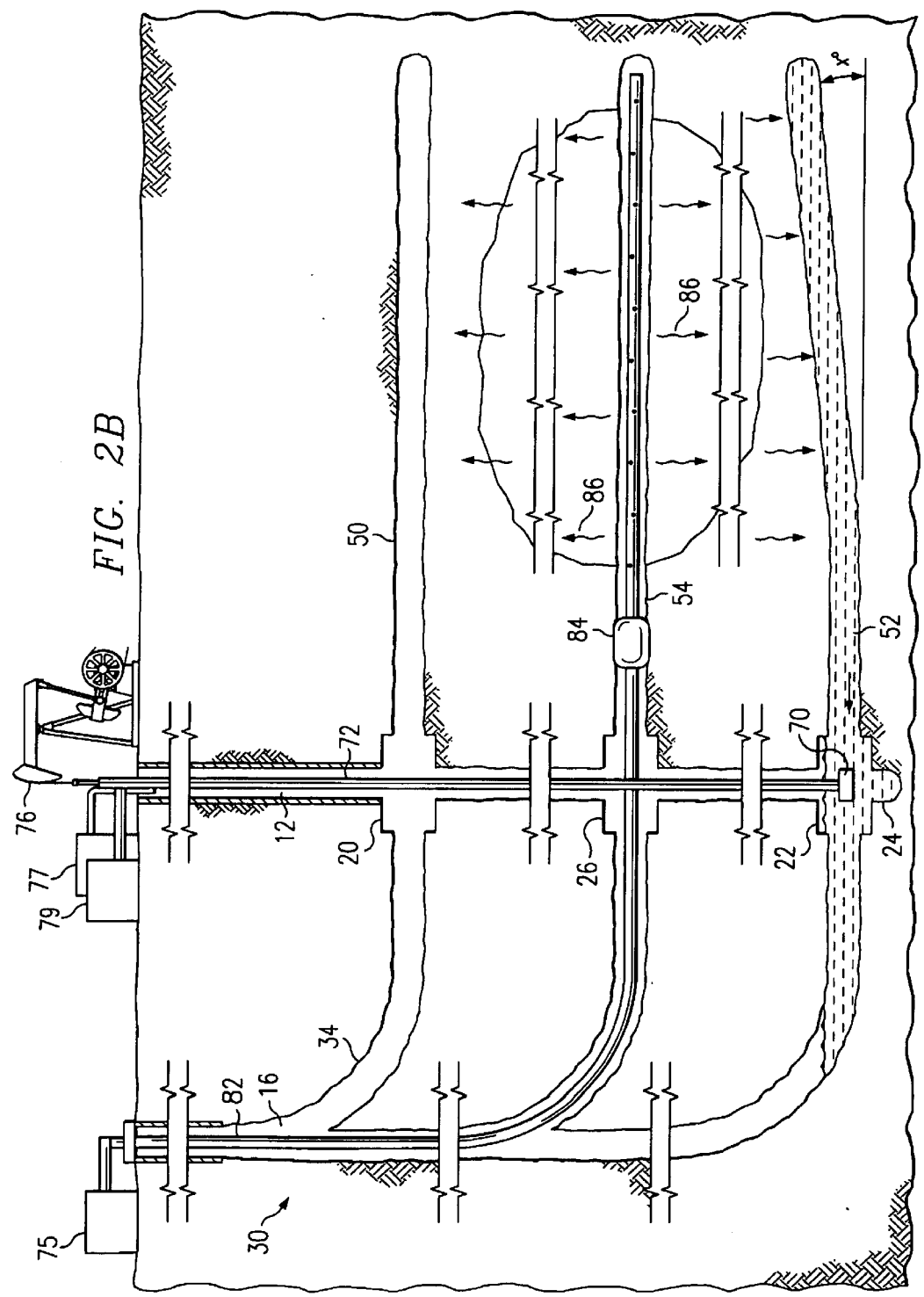
FIG. 2B is a diagram illustrating an underground treatment system in accordance with another embodiment of the present invention.

FIG. 2B is a diagram illustrating an underground treatment system in accordance with another embodiment of the present invention.

Referring to FIG. 2B, the well bore 12, the enlarged cavities 20, 22, and 26, the sump 24, the articulated well bore 30, the articulated well bores 50, 52, and 54, downhole pump 70, tubing string 72, and tanks 77 and 79 are formed as previously described in connection with FIG. 2A.

Injection pipe 82 is placed into the main bore of articulated well bore pattern 54. Packer 84 seals the bore 54, leaving the distal end of the injection pipe 82 in the well bore pattern 54. Injection pipe 82 may inject a treatment solution 86 into well bore pattern 54. Driven by pressure, diffusion, or otherwise, the treatment solution 86 may travel upward and downward to articulate well bore patterns 50 and 52, respectively. The treatment solution is then collected and pumped to the surface via subsurface pump 70 in pipe 72 as described previously in connection with FIG. 2A.

Figure 3:
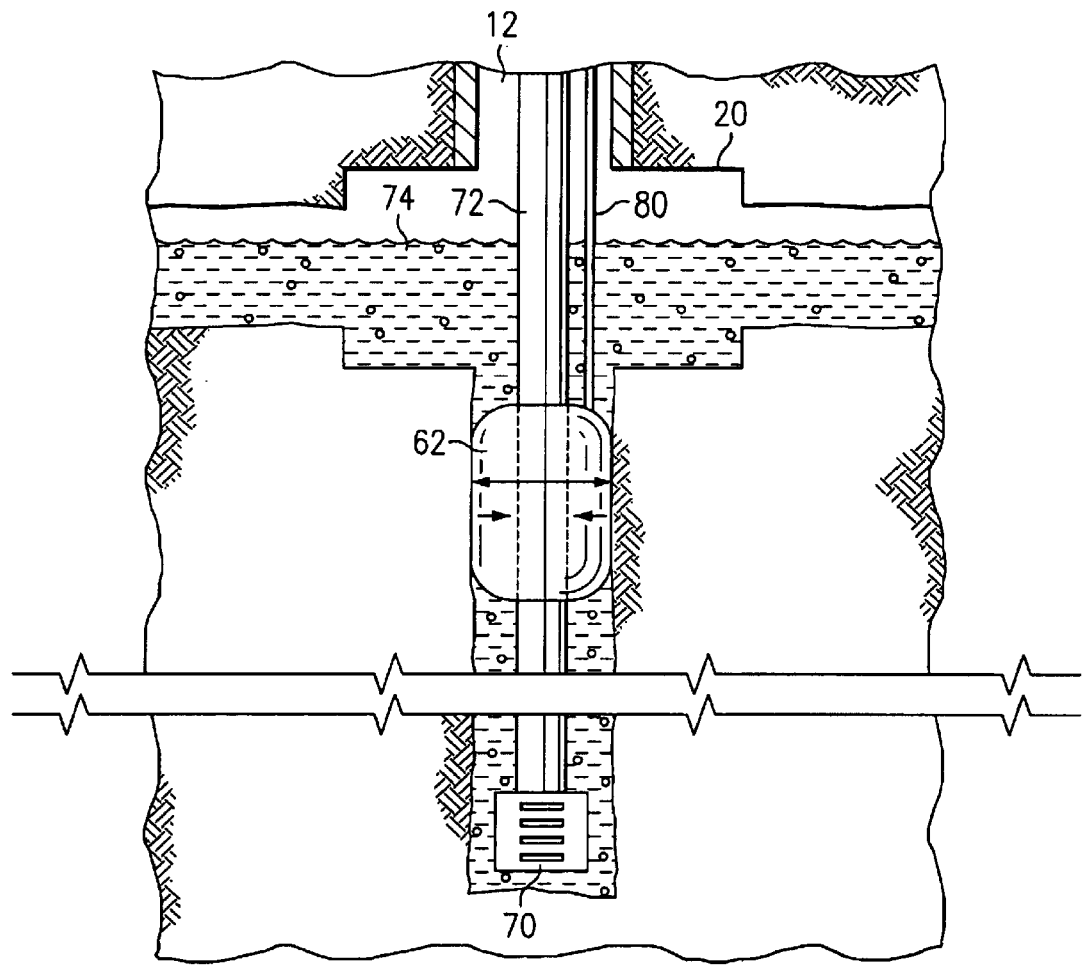
FIG. 3 is a diagram illustrating an inflatable packer in accordance with one embodiment of the present invention.

FIG. 3 is a diagram illustrating an inflatable packer in accordance with one embodiment of the present invention. The packer illustrated in FIG. 3 may be used in the embodiments shown in FIGS. 1B, 2A, 2B, 5, 10, 11, or 13, or in other embodiments of the present invention.

Referring to FIG. 3, the packer 62 may be attached to the external surface of the pipe 72 which is placed within the well bore 12. The packer 62 may be placed below the cavity 20 or at another suitable location. An inflation hose or tube 80 allows for the inflation of the packer 62. In this way, the packer is operable to selectively prevent flow of the treatment fluid through a point within the common bore.

Although FIG. 3 illustrates the packer as particularly shown in FIG. 2B, the packer illustrated in FIG. 3 may be used in the embodiments shown in FIGS. 1B, 2A, 2B, 5, 10, 11, or 13, or in other embodiments of the present invention.

Figure 4:
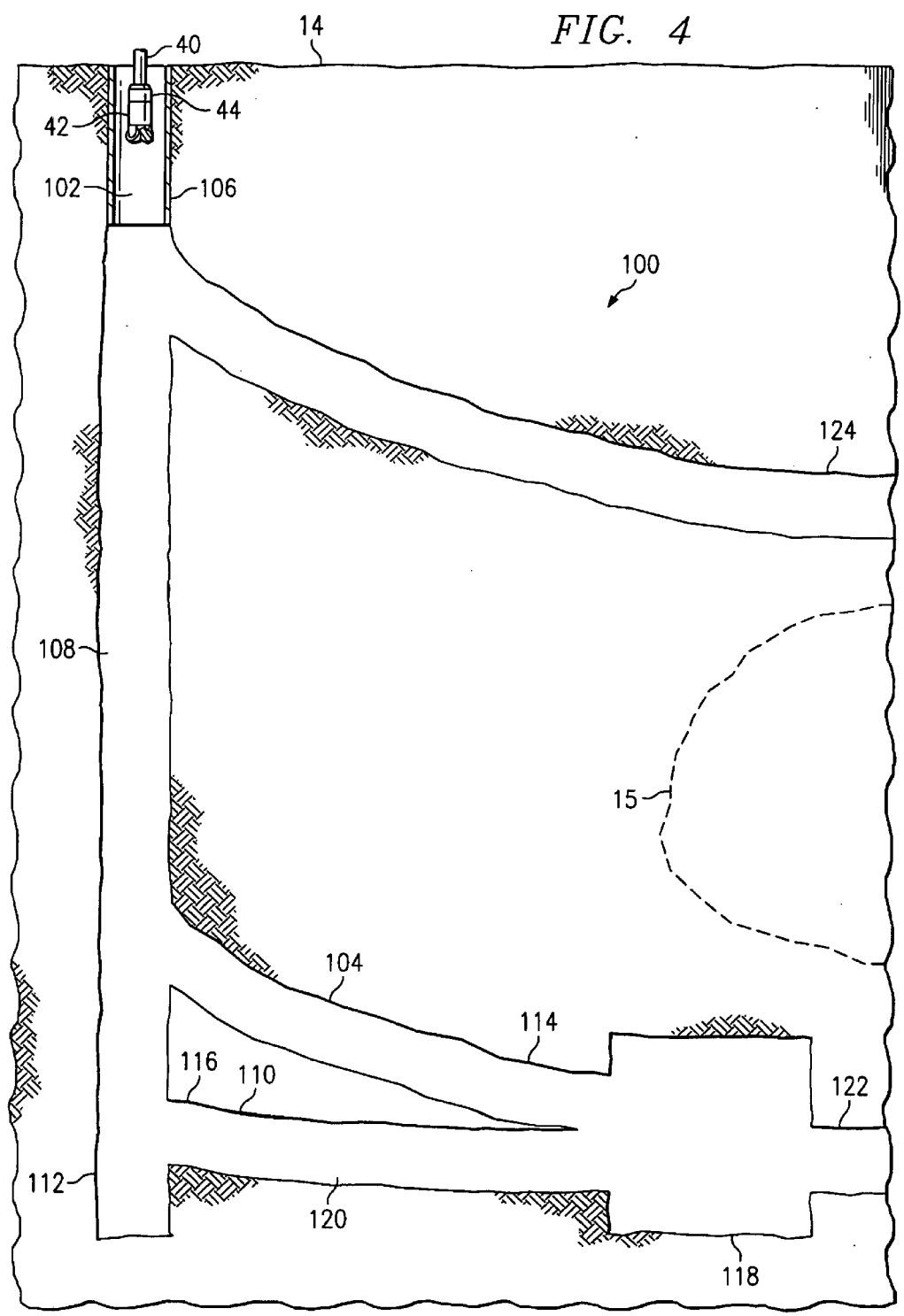
FIG. 4 is a diagram illustrating formation of an underground treatment system in accordance with another embodiment of the present invention.

FIG. 4 is a diagram illustrating a dual radius articulated well system 100 in accordance with another embodiment of the present invention. In this embodiment, two discreet well bore patterns are formed in communication with a single well bore. For ease of illustration, formation of two well bore patterns is described in conjunction with FIG. 4; however, it should be understood that the formation of the well bore pattern may be duplicated for forming the additional well bore patterns.

Returning to FIG. 4, a well bore 102 extends from the surface 14 to a first articulated well bore 104. The well bore 102 may be lined with a suitable well casing 106. A second well bore 108 extends from the intersection of the well bore 102 and the first articulated well bore 104 to a second articulated well bore 110. The second well bore 108 is in substantial alignment with the first well bore 102, such that together they form a continuous well bore. An extension 112 to the second well bore 104 extends from the intersection of the second well bore 104 and a second articulated well bore 110 to a depth below the coal seam 15. In FIG. 4, well bores 102 and 108 are illustrated substantially vertical; however, it should be understood that well bores 102 and 108 may be formed having other angular orientations to accommodate surface 14 and/or subsurface treatment zone 15 geometric characteristics.

The first articulated well bore 104 includes a radius portion 114. The second articulated well bore 110 includes a radius portion 116. The radius portion 116 is generally sized smaller than radius portion 114 to accommodate intersection of the second articulated well bore 110 with the first articulated well bore 104. The first articulated well bore 104 communicates with an enlarged cavity 118. The enlarged cavity 118 is formed at the distal end of the first articulated well bore 104 at the level of zone 15. As described in more detail below, the enlarged cavity 118 provides a junction for intersection of a subsurface channel or well bore 120.

In one embodiment, the enlarged cavity 118 is formed having a radius of approximately eight feet and a vertical dimension which equals or exceeds the vertical dimension of the zone 15. The enlarged cavity 118 is formed using suitable under-reaming techniques and equipment. However, the enlarged cavity 118 may be formed having other suitable geometric characteristics to accommodate fluid accumulation within the enlarged cavity 118.

The well bore 120 is formed at the intersection of the second well bore 108 and the second articulated well bore 110. In FIG. 4, well bore 120 is illustrated substantially horizontal and below the zone 15; however, it should be understood that well bore 120 may be formed at other angular orientations to accommodate the geometric characteristics of the zone 15. After the enlarged cavity 118 has been formed, drilling is continued through the cavity 118 to form a first well bore pattern 122. A second well bore/well bore pattern 124 may be drilled in a manner similar to that described above with respect to well bore pattern 120. In the illustrated embodiment, the second well bore/pattern 124 is drilled horizontally above the zone 15; however, it should be understood that they may be formed at other orientations.

Figure 7:
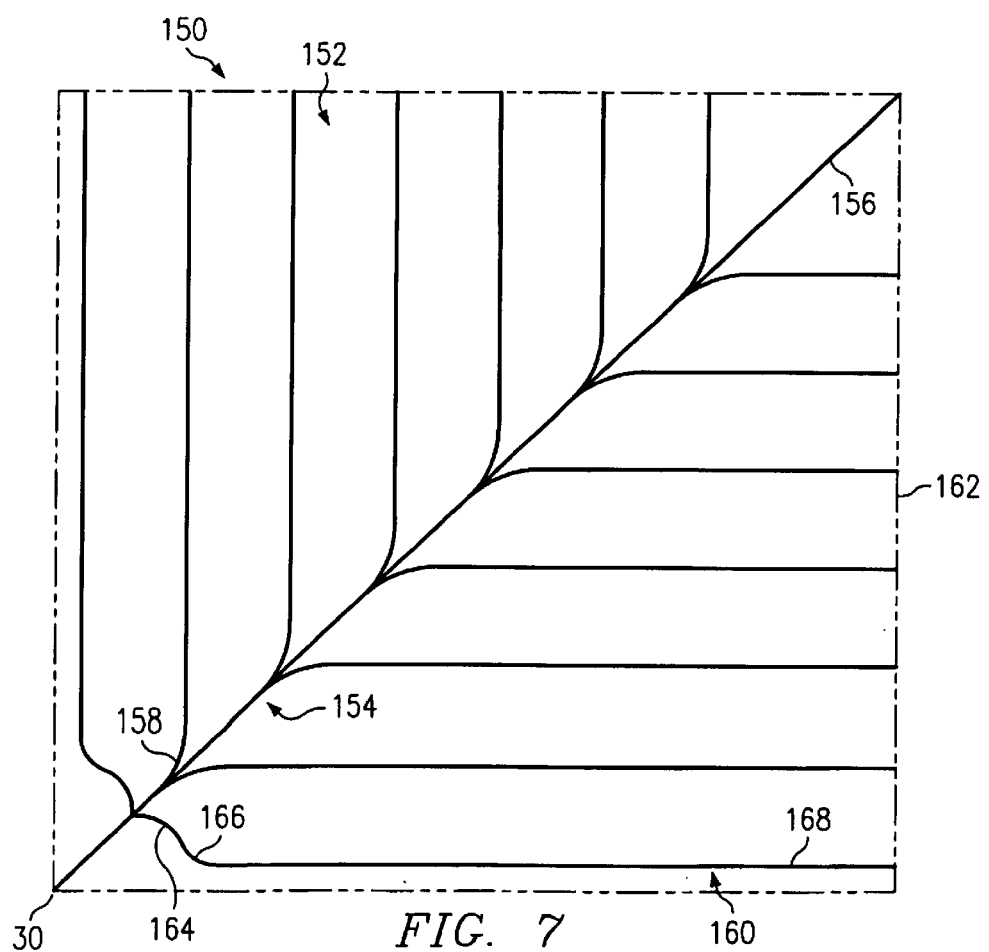
FIG. 7 is a diagram illustrating a well bore pattern in accordance with another embodiment of the present invention.
Figure 8:
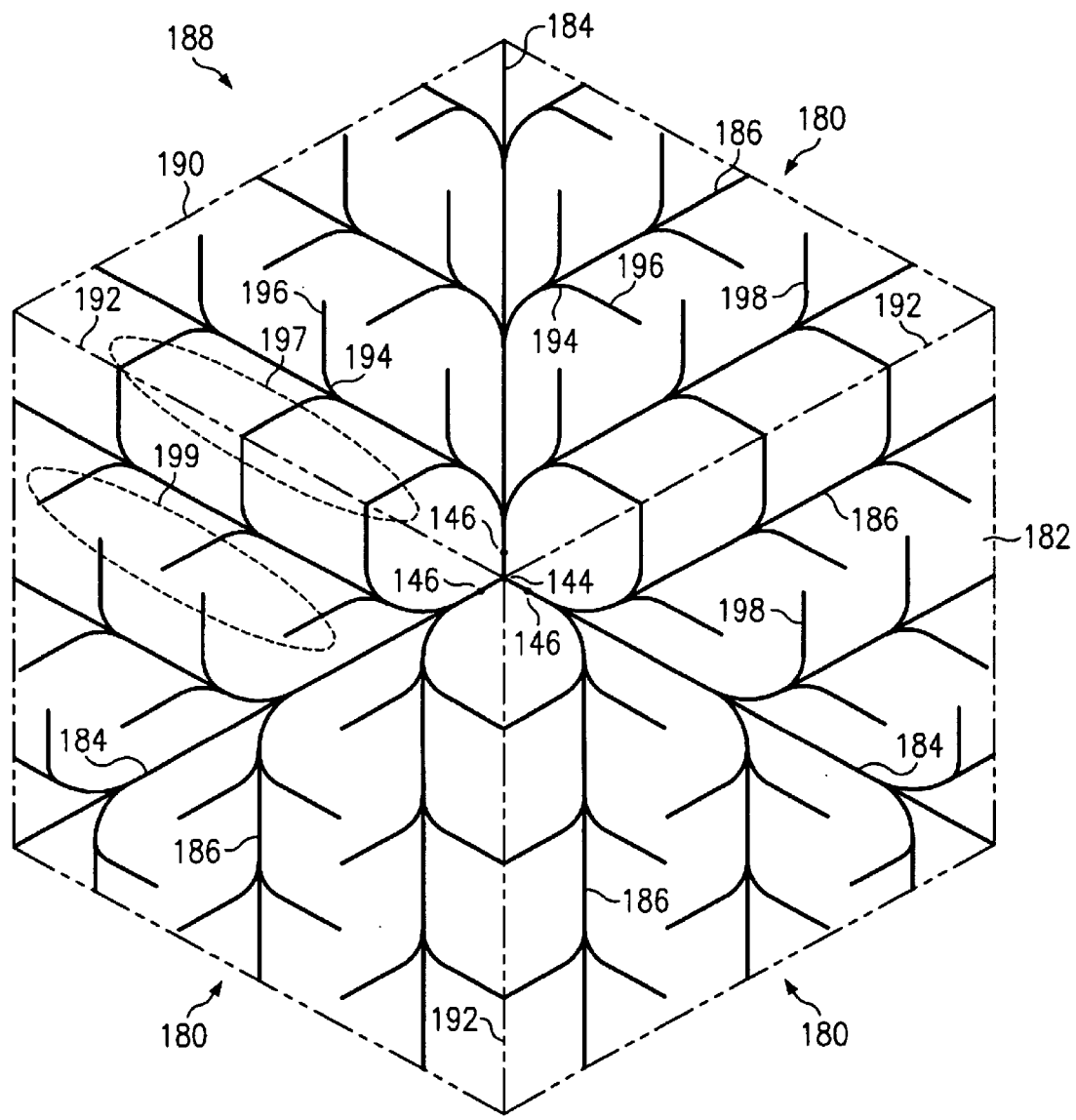
FIG. 8 is a diagram illustrating a well bore pattern in accordance with another embodiment of the present invention.

The well bore patterns 122 and 124 may include sloped, undulating, or other inclinations. During drilling of the well bore patterns 122 and 124 gamma ray logging tools and conventional measurement while drilling devices may be employed to control and direct the orientation of drilling to retain the first well bore pattern 122 to provide substantially uniform coverage of a desired area. The well bore patterns 122 and 124 may comprise patterns as illustrated in FIGS. 7–9; however, other suitable well bore patterns may also be used.

Figure 5:
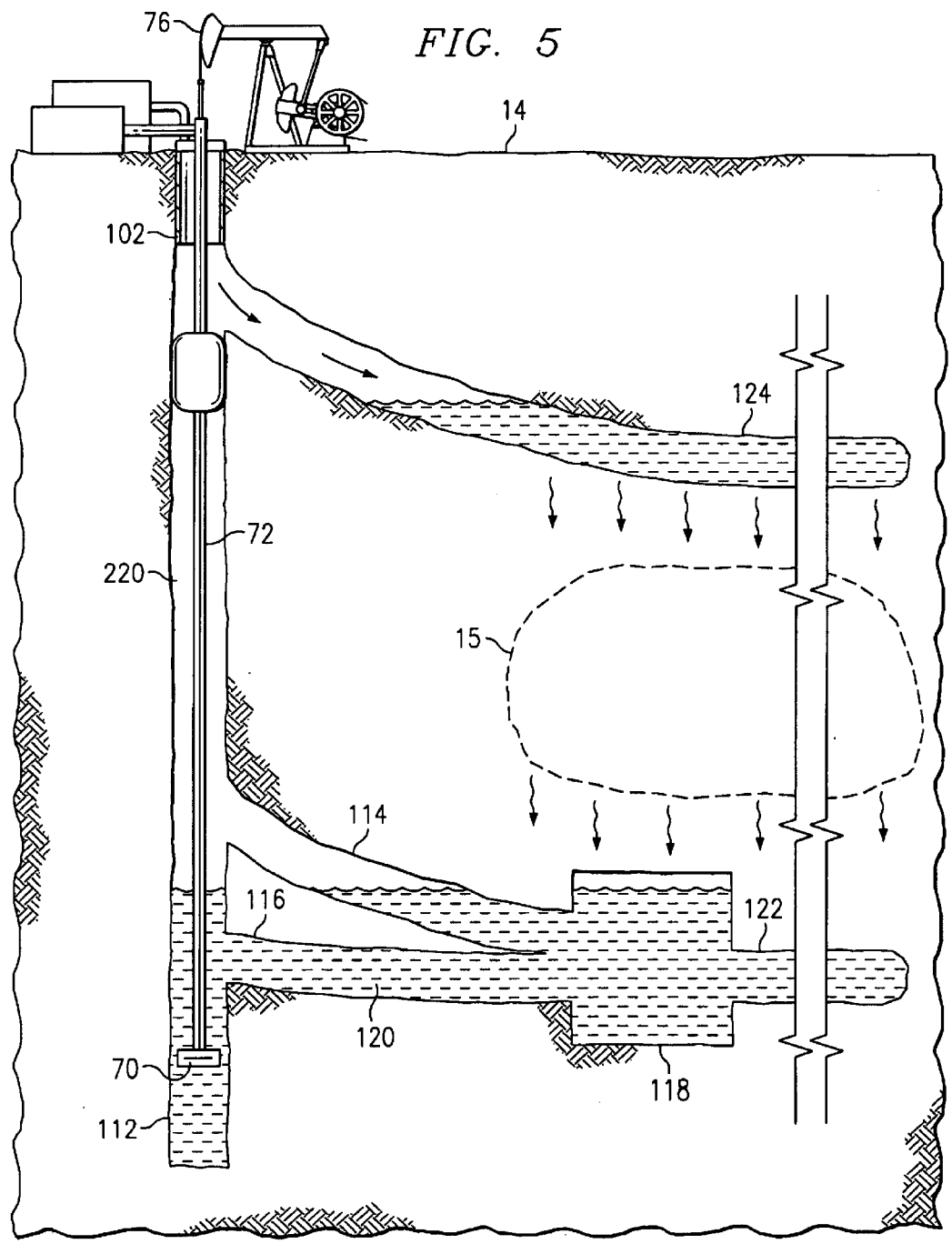
FIG. 5 is a diagram illustrating an underground treatment system in accordance with one embodiment of the present invention.

FIG. 5 is a diagram illustrating an underground treatment system comprising the well bore system formed as described in conjunction with FIG. 4.

Referring to FIG. 5, after the well bores and desired well bore patterns have been drilled in accordance with FIG. 4, the articulated drill string 40 is removed from the well bores. A down hole pump 70 is disposed in the lower portion of the well bore 108 above the extension 112. Treatment fluids are injected or allowed to flow into well bore pattern 124. From well bore pattern 124, the treatment fluids may travel down through zone 15 to well bore pattern 122 to be recovered using down hole pump 70.

The extension 112 provides a reservoir for accumulated fluids allowing intermittent pumping without adverse effects of a hydrostatic head caused by accumulated fluids in the well bore.

The down hole pump 70 is connected to the surface 14 via a tubing string 72 and may be powered by sucker rods extending down through the tubing string 72. The sucker rods (not shown) are reciprocated by a suitable surface mounted apparatus, such as a powered walking beam 76 to operate the down hole pump 70. The down hole pump 70 is used to remove treatment solution 74 via the well bore pattern 122 after treatment of the 15. Once the treatment solution is removed to the surface, the treatment solution may be processed so as to remove precious metals, contaminants, or other components removed from the zone 15 during subsurface treatment.

Figure 6:
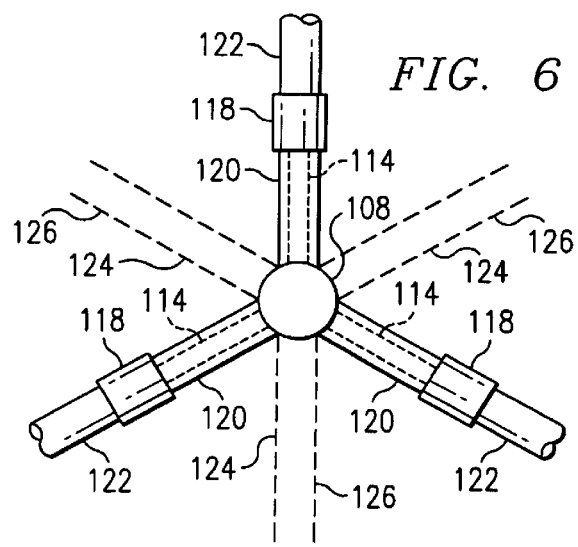
FIG. 6 is a diagram illustrating a top plan view of system 100 illustrated in FIG. 4 in accordance with one embodiment of the present invention.

FIG. 6 is a diagram illustrating a top plan view of system 100 illustrated in FIG. 4 in accordance with one embodiment of the present invention.

Referring to FIG. 6, each of three articulated well bores 120 and articulated well bores 114 extend from well bore 108 in a position approximately 120 degrees apart from each other. Well bore 108 is drilled in a surface location at the approximate center of a desired total well bore area. As described above, articulated well bores 120 are drilled from a surface location proximate to or in common with the well bore 108. Well bore patterns 122 and 126 are drilled proximate to the target subterranean resource from the articulated well bores 120 and 114. Also from each of the articulated well bores 120, an enlarged cavity 118 is formed to collect fluid draining from the well bore patterns 122. Well bores 124 and well bore pattern 126 are also drilled in a position approximated 120 degrees from each other. However well bore 124 is positioned so as to bisect the 120 degree angle formed by well bores 114 and 120. In this way, the well bore patterns 126 are offset from well bore patterns 122, thereby increasing the travel distance of fluids migrating between well bore pattern 122 and well bore pattern 126. Each of three subsurface channel or well bores 114 is drilled to connect each of the enlarged cavities 118 with the well bore 108 as described above in connection with FIG. 4.

Treatment solution may be injected into well bore patterns 126 and may drain into well bore patterns 122, where it is collected in the enlarged cavities 118. From the enlarged cavities 118, the fluids pass through the well bores 114 and into the well bore 108. Once the fluids have been collected in the well bore 108, they may be removed to the surface by the methods as described above.

FIGS. 7–8 are diagrams illustrating well bore patterns for enhanced access to subterranean resources in accordance with embodiments of the present invention. FIGS. 7–8 illustrate a plan view of the well bore patterns. It will be understood that FIGS. 7–8 may illustrate horizontal patterns viewed at an overhead view, or illustrate non-horizontal patterns.

In the embodiments shown in FIGS. 7–8, the well bore patterns comprise pinnate patterns that have a main or central well bore with generally symmetrically arranged and appropriately spaced lateral well bores extending from each side of the main well bore. The pinnate pattern approximates the pattern of veins in a leaf or the design of a feather in that it has similar, substantially parallel, auxiliary well bore bores arranged in substantially equal and parallel spacing on opposite sides of an axis. The pinnate well bore pattern with its main or central bore and generally symmetrically arranged and appropriately spaced auxiliary lateral well bore bores on each side provides a uniform pattern for injecting and/or draining fluids into or from a subterranean zone. As described in more detail below, the pinnate pattern provides substantially uniform coverage of areas of various shapes. It will be understood that other suitable well bore patterns may be used in accordance with the present invention. In accordance with various embodiments of the present invention, lateral bores may be substantially horizontal or may be non-horizontal.

FIG. 7 is a diagram illustrating a well bore pattern 150 in accordance with an embodiment of the present invention. In this embodiment, the well bore pattern 150 provides coverage of a substantially diamond or parallelogram-shaped area 152 of a subterranean zone. A number of the well bore patterns 150 may be used together to provide uniform coverage of a large subterranean region. The articulated well bore 30 defines a first corner of the area 152. The well bore pattern 150 includes a main well bore 154 extending diagonally across the area 152 to a distant corner 156 of the area 152.

A plurality of lateral well bores 160 extend from the opposites sides of well bore 154 to a periphery 162 of the area 152. The lateral well bores 160 may mirror each other on opposite sides of the well bore 154 or may be offset from each other along the well bore 154. Each of the lateral well bores 160 includes a radius curving portion 164 extending from the well bore 154 and an elongated portion 166 formed after the curved portion 164 has reached a desired orientation. For uniform coverage of the area 152, pairs of lateral well bores 160 are substantially equally spaced on each side of the well bore 154 and extend from the well bore 154 at an angle of approximately sixty degrees. The lateral well bores 160 shorten in length based on progression away from the bore in order to facilitate drilling of the lateral well bores 160. The quantity and spacing of lateral well bores 160 may be varied to accommodate a variety of resource areas, sizes and well bore requirements. For example, lateral well bores 160 may be drilled from a single side of the well bore 154 to form a one-half pinnate pattern.

The well bore 154 and the lateral well bores 160 are formed by using an articulated drill string and an appropriate drilling apparatus. During this operation, gamma ray logging tools and conventional measurement while drilling (MWD) technologies may be employed to control the direction and orientation of the drill bit.

FIG. 8 illustrates a well bore pattern 188 in accordance with another embodiment of the present invention. The well bore pattern 188 includes three discrete well bore patterns 180 each draining a portion of a region covered by the well bore pattern 188. Each of the well bore patterns 180 includes a main well bore 184 and a set of lateral well bores 186 extending from main well bore 184. In the tri-pinnate pattern embodiment illustrated in FIG. 8, each of the well bores 184 and 186 are drilled from a common articulated well bore 144 and fluid and/or gas may be removed from or introduced into the subterranean zone through a well bore 146 in communication with each well bore 184. This allows tighter spacing of the surface production equipment, wider coverage of a well bore pattern and reduces drilling equipment and operations.

In the embodiment illustrated in FIG. 8, the spacing between each well bore 184 is substantially equal at an angle of approximately 120 degrees from each other, thereby resulting in each well bore pattern 180 extending in a direction approximately 120 degrees from an adjacent well bore pattern 180. However, other suitable well bore spacing angles, patterns or orientations may be used.

In the embodiment illustrated in FIG. 8, each well bore pattern 180 also includes a set of lateral (or sub-lateral) well bores 198 extending from lateral well bores 186. The lateral well bores 198 may mirror each other on opposite sides of the lateral well bore 186 or may be offset from each other along the lateral well bore 186. Each of the lateral well bores 198 includes a radius curving portion 194 extending from the lateral well bore 186 and an elongated portion 196 formed after the curved portion 194 has reached a desired orientation. For uniform coverage of the region 190, pairs of lateral well bores 198 may be disposed substantially equally spaced on each side of the lateral well bore 186. Additionally, lateral well bores 198 extending from one lateral well bore 186 may be disposed to extend between or proximate lateral well bores 198 extending from an adjacent lateral well bore 186 to provide uniform coverage of the region 190. However, the quantity, spacing, and angular orientation of lateral well bores 198 may be varied to accommodate a variety of areas, sizes and well bore requirements.

Area 197 shows an example of lateral bores connecting at their distal ends. Area 199 shows an example of lateral bores not connecting at their distal ends. It will be understood that the patterns used in the present invention may comprise patters of connecting lateral bores, patterns of non-connecting lateral bores, or patterns comprising mixtures of connecting and non-connecting bores.

Figure 9A:
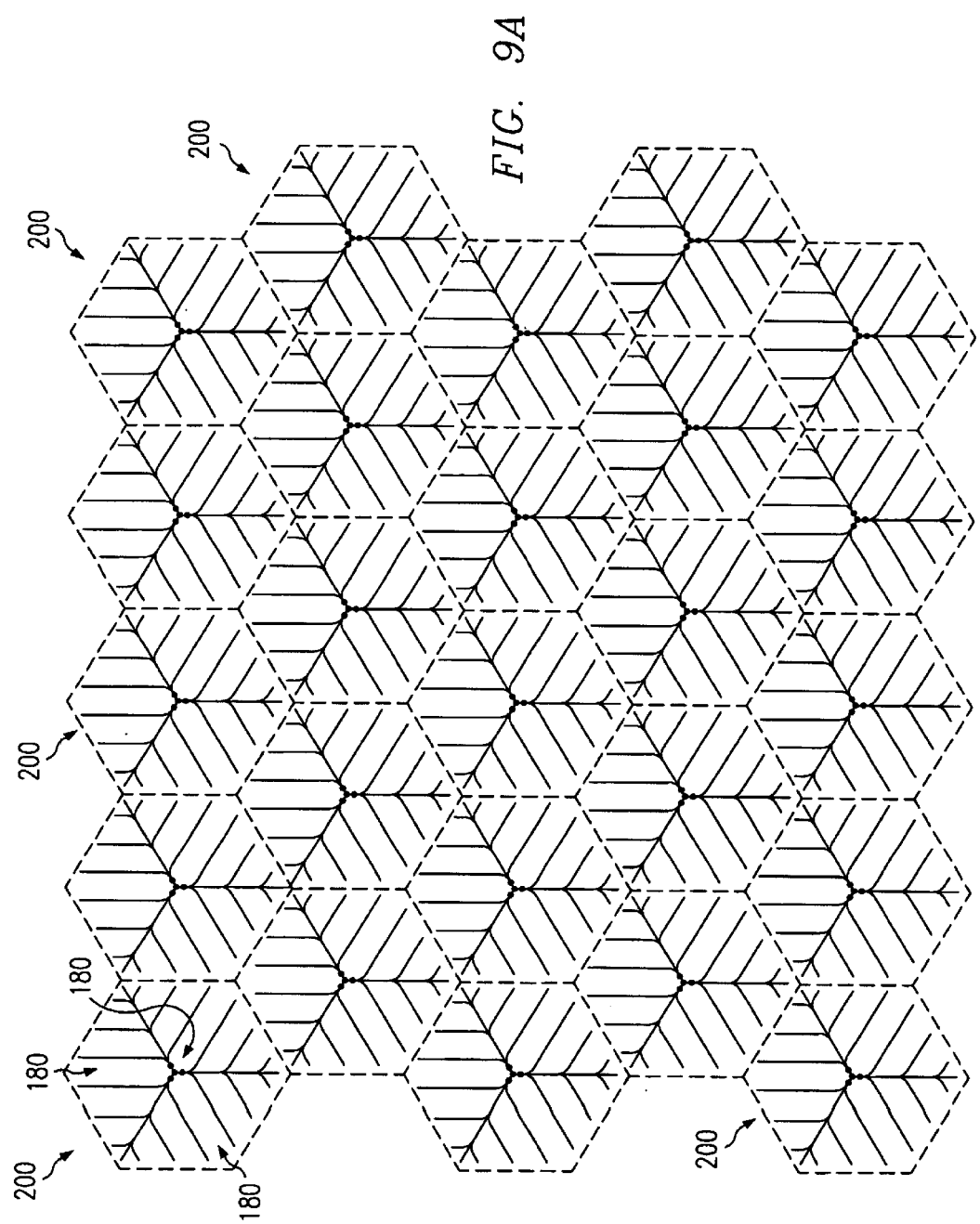
FIG. 9A is a diagram illustrating an aligned or nested arrangement of well bore patterns within a subterranean zone in accordance with an embodiment of the present invention.

FIG. 9A is a diagram illustrating an aligned or nested arrangement of well bore patterns within a subterranean zone in accordance with an embodiment of the present invention. In this embodiment, three discreet well bore patterns 180 are used to form a series of generally hexagonally configured well bore patterns 200. A desired geometrical configuration or access shape can be obtained. The quantity of discreet well bore patterns 180 may also be varied to produce other geometrically-configured well bore patterns such that the resulting well bore patterns may be nested to provide uniform coverage of a subterranean zone.

Figure 9B:
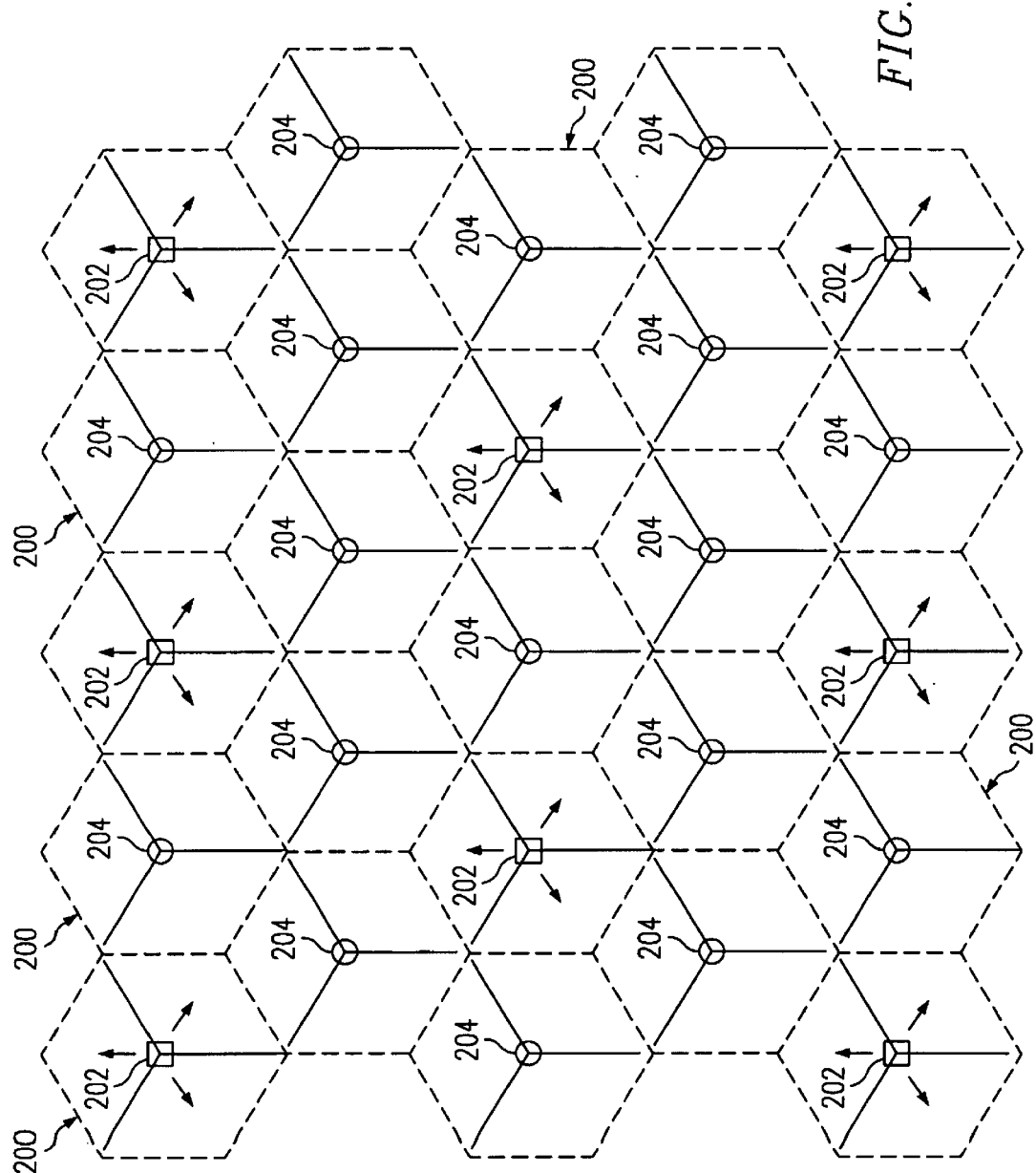
FIG. 9B is a diagram illustrating an aligned or nested arrangement of well bore patterns within a subterranean zone in accordance with another embodiment of the present invention.

FIG. 9B is a diagram illustrating an aligned or nested arrangement of well bore patterns within a subterranean zone in accordance with another embodiment of the present invention.

Referring to FIG. 9B, hexagonal well bore patterns 200 are formed as described above. For clarity, the lateral bores are not shown in FIG. 9B; however, it will be understood that the patterns 200 comprise lateral bore patterns as shown in FIG. 9A or other suitable patterns.

In the embodiment shown in FIG. 9B, some of the well bore patterns 200 are used as injection patterns 202 for injecting treatment solution. The remaining well bore patterns 200 are used as recovery patterns 204 for recovering the injected treatment solution after treatment of an underground treatment zone. Injection patterns 202 and recovery patterns 204 may be placed at the same horizontal level or, in an alternative embodiment, may be staggered.

Figure 10:
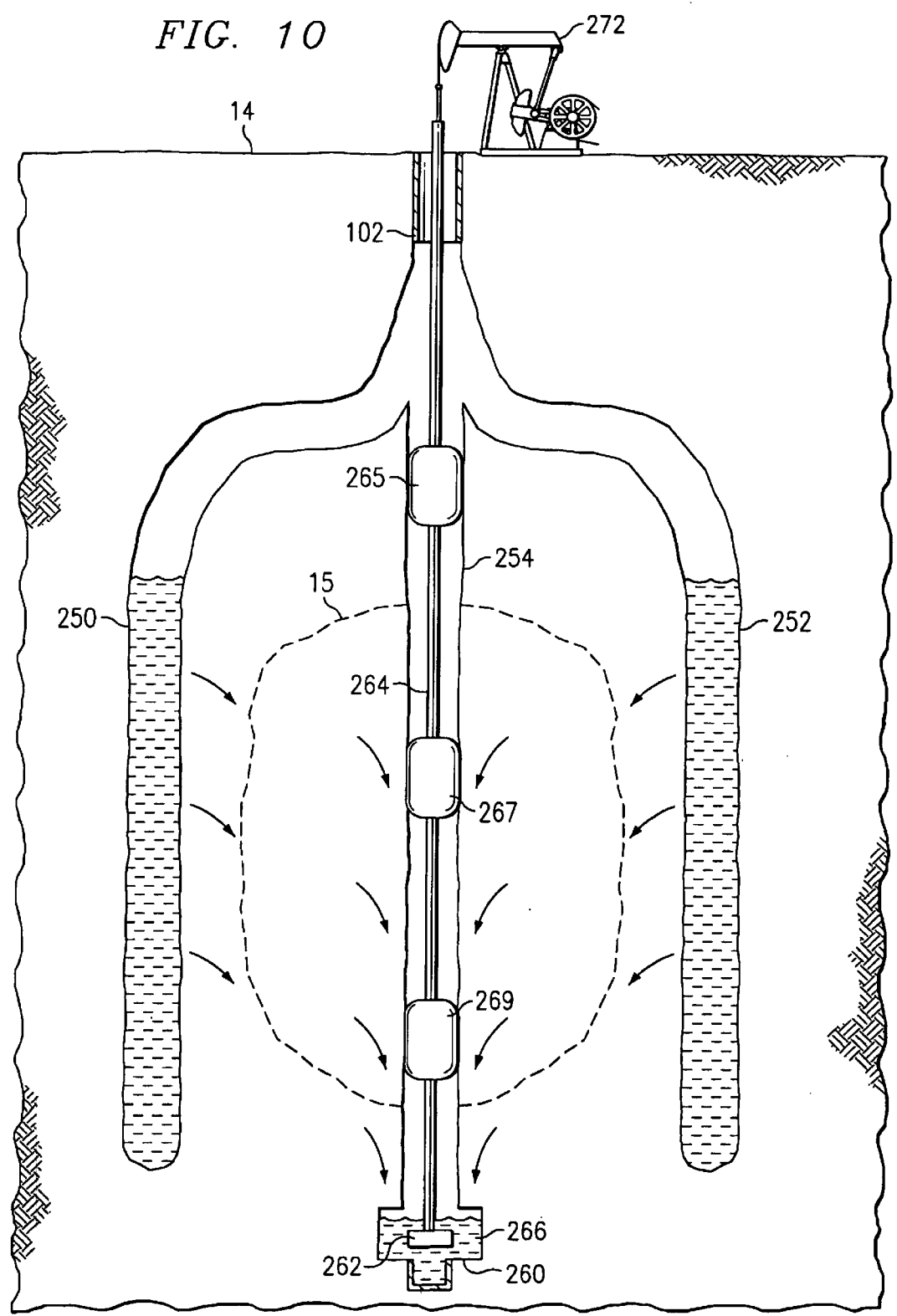
FIG. 10 is a diagram illustrating a system for underground treatment of materials in accordance with another embodiment of the present invention.

FIG. 10 is a diagram illustrating a method and system for underground treatment of materials in accordance with another embodiment of the present invention.

Referring to FIG. 10, substantially vertical well bore 254 is drilled through subsurface treatment zone 15. Well bore patterns 250 and 252 are drilled from bore 254 at junctions 256 and 258, respectively. The well bore patterns 250 and 252 lay in a substantially vertical plane on the sides of a subsurface zone 15. Well bore patterns 250 and 252 are shown edge-on in the cross-sectional view shown in FIG. 10; therefore, the details of the patterning are not shown. It will be understood in that well bore patterns 250 and 252 may comprise one of the patterns described in reference to FIGS. 7–9 or another suitable pattern or patterns.

A subsurface pump 262 is connected to pipe 264 which leads to the surface 14. One or more packers or plugs may be placed in the vertical bore 254 below the junctions 256 and 258. In the illustrated embodiment, three packers —265, 267, and 269 —are placed in the vertical bore 254. Each may be individually inflated or deflated.

Treatment solution 74 is injected into well bore patterns 268 and 270, where it may travel from the well bore patterns through zone 15. Also, depending on whether any of packers 265, 267, or 269 are inflated, treatment solution 74 may also enter zone 15 from vertical bore 254. The treatment solution 74 is recovered after travelling through zone 15 in cavity 260 of bore 254. It will be understood that, in accordance with another embodiment, bore 254 may be used for injection of the treatment solution and bores 250 and 252 as the recovery bore.

Figure 11:
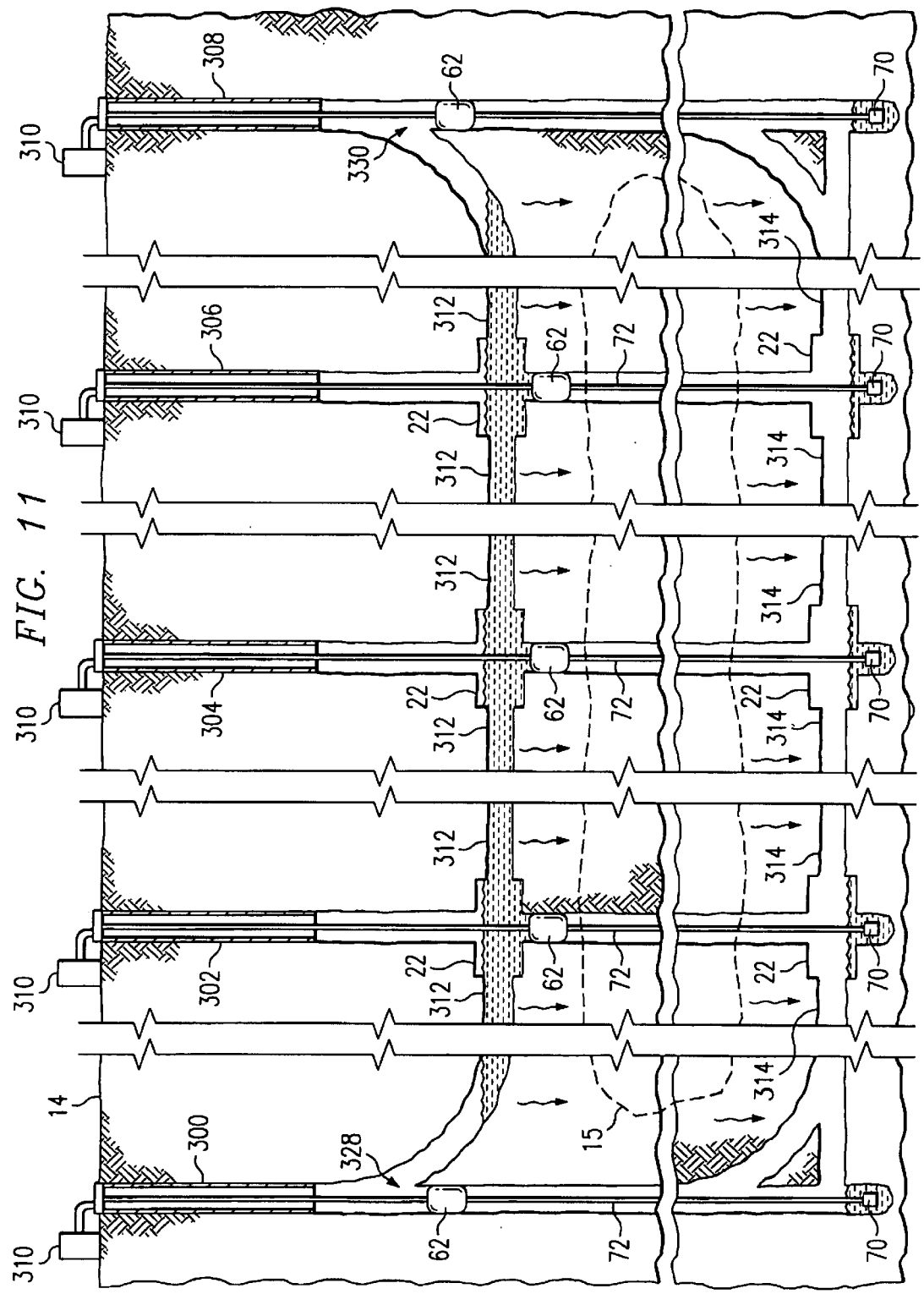
FIG. 11 is a diagram illustrating a system for underground treatment of subsurface materials in accordance with another embodiment of the present invention.

FIG. 11 is a diagram illustrating a system for underground treatment of subsurface materials in accordance with another embodiment of the present invention.

Referring to FIG. 11, injection patterns 312 and recovery patterns 314 are drilled from four substantially vertical well bores 300, 302, 304, 306, and 308 in a manner similar to that described above. The vertical bores, injection patterns, and recovery patterns may comprise a common bore; however, inflatable packers 62 may be placed at various locations to selectively prevent flow of a treatment solution or other fluid within the common bore. In the illustrated embodiment, packers 62 are placed in vertical well bores 300 and 308 below the junctions 328 and 330, respectively. Packers 62 are also placed in vertical well bores 302, 304, and 306 below the cavities 20. In this way, treatment solution may be injected through the vertical well bores and into the injection patterns so as to percolate through the subsurface treatment zone 15. The treatment solution is then recovered in the recovery patterns and pumped via pumps 70 through pipes 72 to the surface 14. Surface pump units 310 may comprise a pump jack or other apparatus to facilitate the operation of the pumps 70.

Well bore patterns 312 and 314 are shown edge-on in the cross-sectional view shown in FIG. 11; therefore, the details of the patterning are not shown. However, it will be understood that these well bore patterns may comprise a pattern shown in FIGS. 7–9 or another suitable pattern or patterns.

The packers 62 may be placed in other suitable locations and may be placed in different locations and/or at different times so as to facilitate a secondary treatment schedule, a second treatment solution, or focused treatment of a particular portion of zone 15. In this way, the common bore comprising the injection patterns and the recovery patterns, when used with the inflatable packers 62, becomes an underground "circuit" system enabling a dynamic and managed course of treatment of subsurface treatment zone 15.

Figure 12:
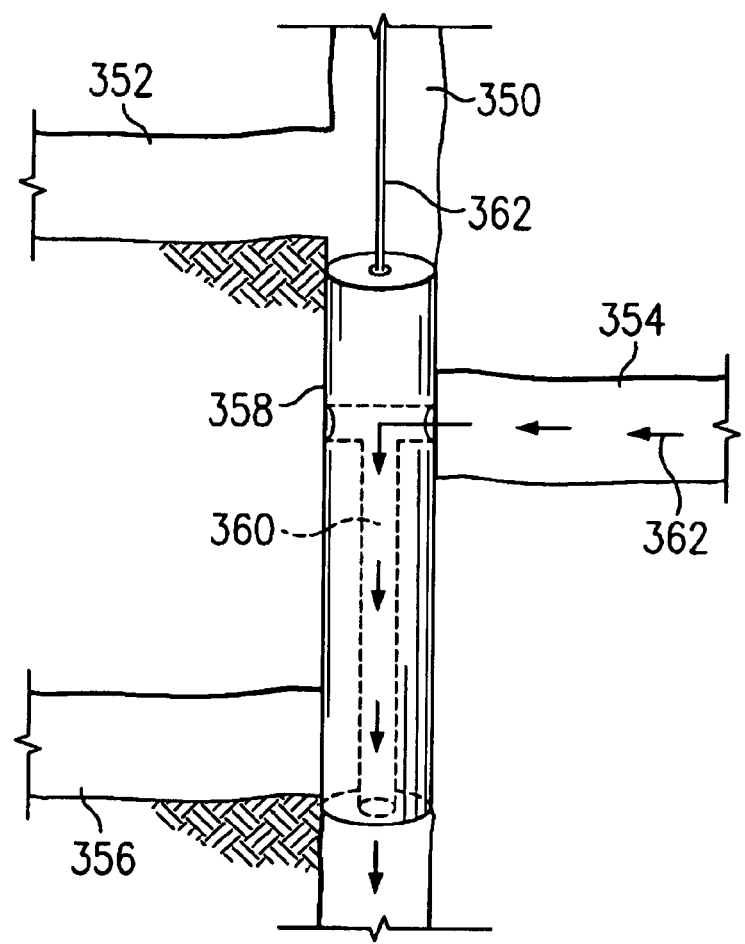
FIG. 12 is a diagram illustrating a trumpet valve within a system for underground treatment of subsurface materials in accordance with an embodiment of the present invention.

FIG. 12 is a diagram illustrating a trumpet valve with a system for underground treatment of subsurface materials in accordance with one embodiment of the present invention.

Referring to FIG. 12, the vertical well bore 350 is intersected by horizontal well bore patterns 352, 354, and 356. The trumpet valve 358 may allow for the selective flow of treatment solution or other fluids from the selected well bore patterns down vertical bore 350.

The trumpet valve 358 may comprise a solid cylinder drilled with a T-shaped cavity 360. The position of the valve 358 is controlled by control wire 362, which may be controlled from the surface via an electrically-controlled winch, sucker rod, or with other suitable subsurface or surface means.

In the example shown in FIG. 12, the trumpet valve 358 is placed in a position so as to allow for fluids to drain from bore pattern 354 and down vertical bore 350, and also as to prevent fluids from bores 352 and 356 from travelling below the valve and down vertical bore 350. Changing the position of valve 358 may allow for the selection of other flow arrangements.

Figure 13:
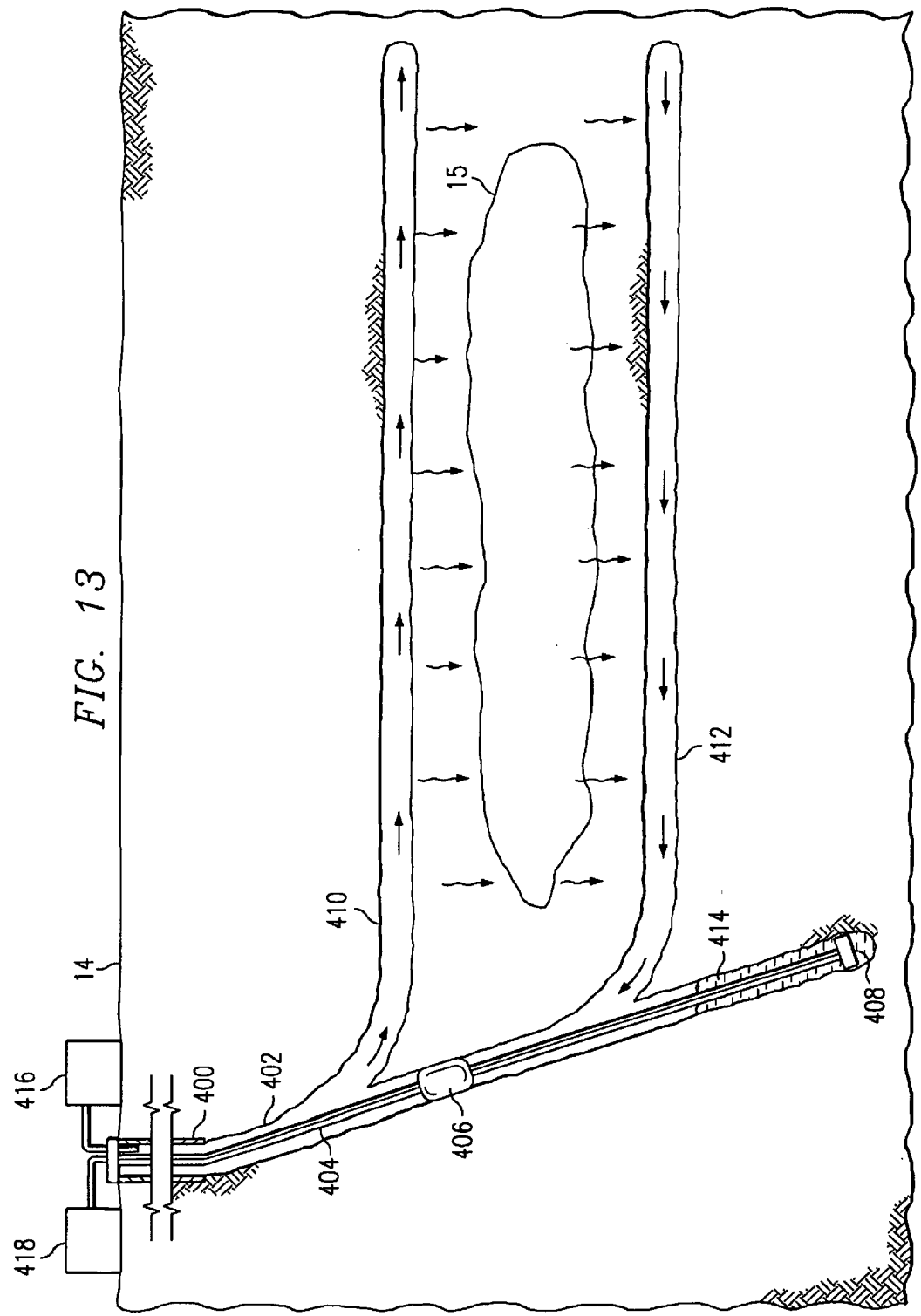
FIG. 13 is a diagram illustrating a system for underground treatment of subsurface materials in accordance with another embodiment of the present invention.

FIG. 13 is a diagram illustrating a system for underground treatment of subsurface materials in accordance with another embodiment of the present invention.

Referring to FIG. 13, the system includes an entry well bore 400, a slant well 402, a pipe 404, a packer 406, a subsurface pump 408, well patterns 410 and 412, extended portion 414, and storage tanks 416 and 418. The well bores 402 and well bore patterns 410 and 412 are drilled from the surface 14; well bore pattern 410 is drilled above subsurface zone 15 and well bore pattern 412 is drilled below subsurface zone 15. Treatment solution may be injected into the bore 404 and diverted into well bore pattern 410 by packer 406. The treatment solution may travel through zone 15 and into well bore pattern 412 to be collected and pumped to the surface by subsurface pump 408 in extended portion 414. Unused and used treatment solution would be stored in tanks 416 and 418, respectively. In the illustrated embodiment, the extended portion 414 may allow for the collection of used treatment solution in a sufficient volume to make the use of enlarged cavities unnecessary.

In another embodiment, well patterns 410 and 412 may both comprise injection patterns for sequestration of gaseous emissions from internal combustion engines, or of other materials for which disposal by underground sequestration may be appropriate. For example, certain underground formations such as coal have high absorption affinities for carbon dioxide, sulfur oxides, nitrogen oxides, and/or other gases or other materials that may comprise regulated substances or pollutants. In accordance with this embodiment, subsurface zone 15 may comprise a sequestration zone such as a coal seam into which the materials such as carbon dioxide may be sequestered. Well bore patterns 410 and 412 may be drilled proximate to the sequestration zone (adjacent to and/or within the zone) and the materials injected into the well bore patterns. In a particular embodiment, the materials comprise gases such as carbon dioxide that may first be entrained in water or another liquid. The liquid may act as a carrier medium, and the gas/carrier medium mixture is pumped into the well bore patterns with the aid of a surface pump. The pinnate pattern may provide for an increased surface area of the underground injection zone, thus providing for more efficient and effective sequestration.

Figure 14:
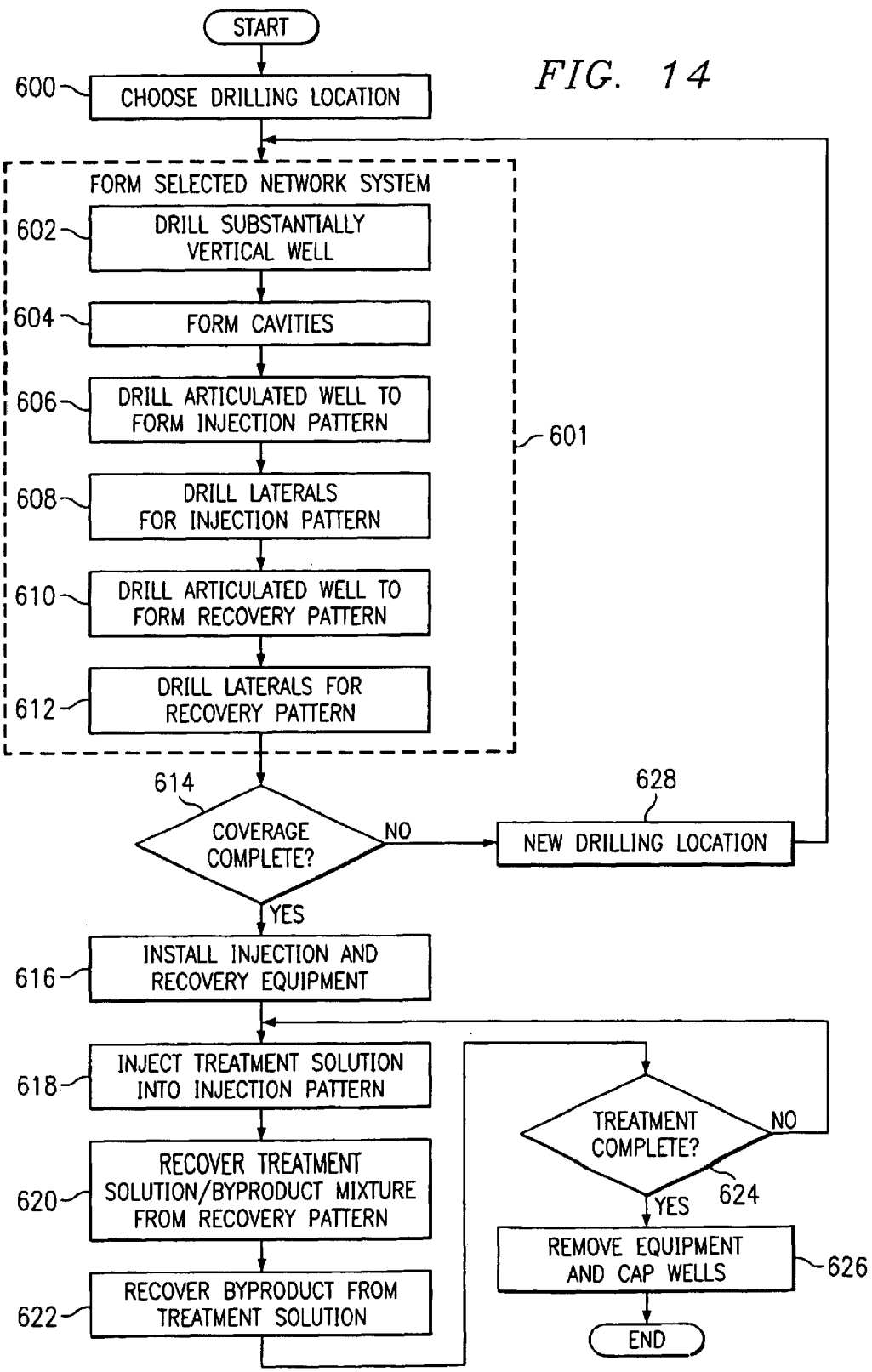
FIG. 14 is a flowchart illustrating a method for underground treatment of subsurface materials in accordance with another embodiment of the present invention.

FIG. 14 is a flowchart illustrating a method for underground treatment of subsurface materials in accordance with another embodiment of the present invention.

Referring to FIG. 14, the method begins with step 600 wherein a suitable drilling location is chosen. The location may be chosen based upon fairly complete knowledge concerning the shape, size, and orientation of the underground treatment zone 15, or may be chosen with the expectation that the drilling operations will yield data concerning the shape, size, and orientation of the underground treatment zone 15 and the drilling patterns and other drilling locations will be chosen accordingly upon receipt and analysis of that data.

Proceeding to step 601, a suitable network system is selected and formed. In the illustrated embodiment, the formation of the selected network system as is described below in relation to steps 602–612. It will be understood that network systems may be selected and formed with other methods in accordance with various embodiments of the present invention. In the illustrated embodiment, at step 602, a substantially vertical well is drilled. At step 604, cavities may be formed as described in reference to FIGS. 1A and 1B to facilitate intersection of an articulated well bore with the substantially vertical well bore.

Proceeding to step 606, an articulated well bore is drilled so as to intersect the cavities and form a main bore for the injection pattern. At 608, laterals from the articulated well bore are drilled to form an injection pattern. The injection pattern may comprise a well bore patterns as described in reference to FIGS. 7–9 or may comprise another suitable pattern or patterns. The injection pattern may be predetermined. Alternatively, the drilling of the injection pattern and the other bores may provide data concerning the shape, size, and orientation of the underground treatment zone 15. In this way, the zone 15 may be delineated during drilling operations and the injection pattern may be modified to provide suitable coverage of the zone 15.

Proceeding to step 610, the articulated well bore is drilled so as to intersect the cavities and form a main bore for the recovery pattern. At 612, laterals from the articulated well bore are drilled to form a recovery pattern. The recovery pattern may comprise a well bore patterns as described in reference to FIGS. 7–9 or may comprise another suitable pattern or patterns. The recovery pattern may be predetermined. Alternatively, the drilling of the recovery pattern and the other bores may provide data concerning the shape, size, and orientation of the underground treatment zone 15. In this way, the zone 15 may be delineated during drilling operations and the recovery pattern may be modified to provide suitable coverage of the zone 15.

The injection pattern and the recovery pattern may substantially overlay one another. Alternatively, the recovery pattern may be horizontally offset from the injection pattern so as to maximize the distance traveled by the treatment solution through the zone 15 from the injection pattern to the recovery pattern.

At decisional step 614, it is determined wither the injection and recovery patterns provide sufficient coverage of the subsurface treatment zone 15. If the injection and recovery patterns do not provide sufficient coverage of the subsurface treatment zone 15, the no branch of decisional step 614 returns to step 602.

If the injection and recovery patterns provide sufficient coverage of the subsurface treatment zone 15, the yes branch of decisional step 614 leads to step 616, wherein suitable injection and recovery equipment is installed. Such equipment may comprise storage tanks, subsurface pumps, pipes, sucker rods, walking beams, and other suitable equipment.

At step 618, treatment solution is injected into the injection pattern. The treatment solution migrates through the subsurface treatment zone 15 and, at step 620, is recovered in the recovery pattern, along with dissolved precious metals, contaminants, or other products of the treatment of zone 15. Proceeding to step 622, these byproducts are recovered from the treatment solution. Such recovery may take place at the surface using suitable recovery equipment and processes. Recovered treatment solution may be regenerated so as to be re-injected and used again for treatment.

At decisional step 624 it is determined wither the treatment of the subsurface treatment zone 15 is complete. If treatment of the subsurface treatment zone is complete, then the yes branch of decisional step 624 leads to step 626 wherein equipment is removed from the site and wells capped. If treatment of the subsurface treatment zone is not complete, then the no branch of decisional step 624 returns to step 618 for further injection, treatment, and recovery.

Although the present invention has been described with several embodiments, various changes and modifications may be suggested to one skilled in the art. It is intended that the present invention encompass such changes and modifications as fall within the scope of the appended claims.

What is claimed is:

1. A method for underground treatment of subsurface materials, comprising:
   providing an injection pattern and a recovery pattern, the injection pattern and the recovery pattern coupled to a common bore and located proximate to a subsurface treatment zone and at least one of the injection pattern and the recovery pattern comprising a plurality of lateral bores extending from a main bore;
   injecting a treatment solution through the injection pattern;
   recovering the treatment solution through the recovery pattern; and
   selectively preventing flow of the treatment solution through a point within one or more of the injection pattern, recovery pattern or common bore using at least one packer.

2. The method of claim 1, wherein the injection pattern and the recovery pattern both comprise a plurality of lateral bores extending from a main bore.

3. The method of claim 1, wherein at least one of the injection pattern and the recovery pattern are substantially horizontal.

4. The method of claim 1, wherein the subsurface treatment zone comprises an undergound resource.

5. The method of claim 1 further comprising collecting the treatment solution in an enlarged cavity coupled to the recovery pattern.

6. A method for underground treatment of subsurface materials, comprising;
   providing an injection pattern and a recovery pattern, the injection pattern and the recovery pattern coupled to a common bore and located proximate to a subsurface treatment zone and at least one of the injection pattern and the recovery pattern comprising a plurality of lateral bores extending from a horizontal bore;
   injecting a treatment solution through the injection pattern;
   recovering the treatment solution through the recovery pattern; and wherein at least one of the injection pattern and the recovery pattern comprise a pinnate pattern.

7. The method of claim 6, wherein the injection pattern and the recovery pattern both comprise a pinnate pattern.

8. A method for underground treatment of subsurface materials, comprising;
   an injection pattern and a recovery pattern, the injection pattern and the recovery pattern coupled to a common bore and located proximate to a subsurface tretment zone and at least one of the injection pattern and the recovery pattern comprising a plurality of lateral bores extending from a horizontal bore;
   injecting a treatment solution through the injection pattern:
   recovering a treatment solution through the recovery pattern; and
   wherein the subsurface treatment zone comprises a zone of contamination.

9. A method for underground treatment of subsurface materials, comprising;
   an injection pattern and a recovery pattern coupled to a common bore, the injection pattern and the recovery pattern located proximate to a subsurface treatment zone and at least one of the injection pattern and the recovery pattern comprising a plurality of lateral bores extending from a horizontal bore;
   a treatment solution, the treatment solution operable to be injected through the injection pattern and recovered through the recovery pattern; and
   wherein the underground resource comprises a precious metal deposit.

10. A system comprising:
    an injection pattern and a recovery pattern coulded to a common bore, the injection pattern and the recovery pattern located proximate to a subsurface treatment zone and at least one of the injection pattern and the recovery pattern comprising a plurality of lateral bores extending from a horizontal bore;
    a treatment solution, the treatment solution operable to be injected through the injection pattern and recovered through the recovery pattern; and
    a packer operable to selectively prevent flow of the treatment solution through a point within one or more of the injection pattern, recovery pattern or common bore.

11. The system of claim 10, wherein the injection pattern and the recovery pattern both comprise a plurality of lateral bores extending from a horizontal bore.

12. The system of claim 10, wherein at least one of the injection pattern and the recovery pattern are substantially horizontal.

13. The system of claim 10, wherein the subsurface treatment zone comprises an underground resource.

14. The system of claim 10 further comprising an enlarged cavity coupled to the recovery pattern.

15. A system for underground treatment of subsurface materials, comprising;
    an injection pattern and a recovery pattern coupled to a common bore, the injection pattern and the recovery pattern located proximate to a subsurface treatment zone and at least one of the injection pattern and the recovery pattern comprising a plurality of lateral bores extending from a horizontal bore;
    a treatment solution, the treatment solution operable to be injected through the injection pattern and recovered through the recovery pattern; and
    wherein at least one of the injection pattern and the recovery pattern comprise a pinnate pattern.

16. The system of claim 15, wherein the injection pattern and the recovery pattern both comprise a pinnate pattern.

17. A system for underground treatment of subsurface materials, comprising:
    an injection pattern and a recovery pattern coupled to a common bore, the injection pattern and the recovery pattern located proximate to a subsurface treatment zone and at least one of the injection pattern and the recovery pattern comprising a plurality of lateral bores extending from a horizontal bore;
    a treatment solution, the treatment solution operable to be injected through the injection pattern and recovered through the recovery pattern; and
    wherein the subsurface treatment zone comprises a zone of contamination.

18. A system for underground treatment of subsurface materials, comprising:
    an injection pattern and a recovery pattern coupled to a common bore, the injection pattern and the recovery pattern located proximate to a subsurface treatment zone and at least one of the injection pattern and the recovery pattern comprising a plurality of lateral bores extending from a horizontal bore;
    a treatment solution, the treatment solution operable to be injected through the injection pattern and recovered through the recovery pattern;
    wherein the subsurface treatment zone comprises an underground resource; and
    wherein the underground resource comprises a precious metal desposit.

19. A method for underground treatment of subsurface minerals, comprising:
    injecting treatment solution through a horizontal injection bore, the horizontal injection bore being drilled from a first well bore extending from above the horizontal injection bore;
    recovering the treatment solution through a horizontal recovery bore vertically offset from the horizontal injection bore, the horizontal recovery bore being drilled from the first well bore;
    injecting a second treatment solution through a second horizontal injection bore; and
    recovering the second treatment solution through the horizontal recovery bore.

20. The method of claim 19 further comprising collecting the treatment solution in an enlarged cavity coupled to the recovery bore.

21. The method of claim 19 wherein the injection bore and the recovery bore communicate with a common bore; and
    wherein injecting a treatment solution through a horizontal injection bore comprises injecting the treatment solution through the horizontal injection bore while concurrently blocking flow from the common bore into the recovery bore.

22. A method for underground treatment of subsurface minerals, comprising:
    injecting a treatment solution into an underground treatment zone;
    collecting the treatment solution from the underground treatment zone in an enlarged cavity coupled to a recovery bore, wherein at least a portion of the enlarged cavity is below the underground treatment zone; and
    recovery treatment solution from the cavity with a rod pump extending down a borehole in communication with the recovery bore and horizontally offset from the common bore.

23. The method of claim 22 further comprising recovering the treatment solution through the recovery bore.

24. The method of claim 22 wherein injecting a treatment solution into an underground formation comprises injecting the treatment solution through an injecting bore, the injection bore and the recovery bore in communication with a common bore, and concurrently blocking flow from the common bore into the recovery bore.

25. The method of claim 24 further comprising recovering the treatment solution through the recovery bore and concurrently blocking flow from the common bore into the injection bore.

26. A method for underground treatment of subsurface minerals, comprising:
   injecting a treatment solution into an underground treatment zone;
   collecting the treatment solution from the underground treatment zone in an enlarged cavity coupled to a recovery bore, wherein at least a portion of the enlarged cavity is below the underground treatment zone;
   wherein injecting a treatment solution into an underground formation comprises injecting the treatment solution through an injection bore, the injection bore and the recovery bore in communication with a common bore, and concurrently blocking flow from the common bore into to the recovery bore; and
   wherein blocking flow into the recovery bore comprises blocking flow with at least one of a packer or a valve in the common bore.

27. A method for underground treatment of subsurface minerals, comprising:
   injecting a treatment solution into an underground treatment zone;
   collecting the treatment solution from the underground treatment zone in an enlarged cavity coupled to a recovery bore, wherein at least a portion of the enlarged cavity is below the underground treatment zone;
   wherein injecting a treatment solution into an underground formation comprises injecting the treatment solution through an injection bore, the injection bore and the recovery bore in communication with a common bore, and concurrently blocking flow from the common bore into to the recovery bore;
   recovering the treatment solution through the recovery bore and concurrently blocking flow from the common bore into the injection bore; and
   wherein blocking flow into the injection bore comprises blocking flow with at least one of a packer or a valve in the injection bore.

28. A method for underground treatment of subsurface minerals, comprising:
   injecting a treatment solution into an underground treatment zone;
   collecting the treatment solution from the underground treatment zone in an enlarged cavity coupled to a recovery bore, wherein at least a portion of the enlarged cavity is below the underground treatment zone;
   wherein injecting a treatment solution into an underground formation comprises injecting the treatment solution through an injection bore, the injection bore and the recovery bore in communication with a common bore, and concurrently blocking flow from the common bore into to the recovery bore; and
   recovering treatment solution from the cavity with a rod pump extending down the common bore.

29. A method for underground treatment of subsurface minerals, comprising:
   injecting a treatment solution into an underground treatment zone;
   collecting the treatment solution from the underground treatment zone in an enlarged cavity coupled to a recovery bore, wherein at least a portion of the enlarged cavity is below the underground treatment zone; and
   wherein injecting a treatment solution into an underground treatment zone comprises injecting a first treatment solution through a first injection bore and injecting a second treatment solution through a second injection bore.

30. The method of claim 29 wherein the first injection bore and the second injection bore are in communication with a common bore, and wherein injecting a second treatment solution through a second injection bore comprises injecting the second treatment solution while concurrently blocking flow from the common bore into the first injection bore.

31. A method for underground treatment of subsurface minerals, comprising:
   injecting a treatment solution into an underground treatment zone;
   collecting the treatment solution from the underground treatment zone in an enlarged cavity coupled to a recovery bore, wherein at least a portion of the enlarged cavity is below the underground treatment zone; and
   wherein concurrently blocking flow from the common bore into the recovery bore comprises inserting a body into the common bore above the recovery bore, the body adapted to substantially block passage of fluids through the common bore past the body to the recovery bore; and
   further comprising aligning a lateral inlet of the body with the recovery bore to allow passage of fluids from the recovery bore to an outlet of the body and moving the inlet out of alignment with the recovery bore to substantially block passage of fliuds from the recovery bore to the outlet of the body.

32. A system for underground treatment of a zone, comprising:
   a horizontal well bore, the horizontal well bore including a plurality of cavities; and
   a flow control device positioned in the horizontal well bore and adapted to substantially block flow along a length of the horizontal well bore; and
   a rod pump extending down a boreble including one of the cavities of the horizontal bore.

33. The system of claim 32 further comprising an injection bore adapted to inject a treatment solution into the zone.

34. The system of claim 33 further comprising a common bore coupled to the injection bore and the horizontal bore; and
   wherein the flow control device is adapted to prevent flow of fluids from the common bore into the horizontal bore.

35. The system of claim 32 a pump inlet proximate to the horizontal well bore adapted to withdraw a treatment solution from the horizontal bore.

* * * * *

UNITED STATES PATENT AND TRADEMARK OFFICE
CERTIFICATE OF CORRECTION

PATENT NO.       : 7,360,595 B2
APPLICATION NO.  : 10/142817
DATED            : April 22, 2008
INVENTOR(S)      : Joseph A. Zupanick It is certified that error appears in the above-identified patent and that said Letters Patent is hereby corrected as shown below:

Column 1, after Title, insert -- TECHNICAL FIELD OF THE INVENTION
        This invention relates generally to the field of subsurface drilling methods and systems, and more particularly to a method and system for underground treatment of materials. --

Column 5, Line 50, delete "be"

Column 5, Line 61, delete period after "an"

Column 9, Line 49, after "the bore", insert -- 30 --

Column 9, Line 49, replace "driiling" with -- drilling --

Column 10, Line 41, replace "patters" with -- patterns --

Column 14, Claim 1, Line 35, delete "main"

Column 14, Claim 2, Line 46, delete "main"

Column 14, Claim 4, Line 51, replace "undergound" with -- underground --

Column 14, Claim 6, Line 56, replace "comprising;" with -- comprising: --

Column 15, Claim 8, Line 6, replace "comprising;" with -- comprising: --

Column 15, Claim 8, Line 9, replace "tretment" with -- treatment --

Column 15, Claim 8, Line 14, replace "pattern:" with -- pattern; --

Column 15, Claim 8, Line 15, replace "a" with -- the --

Column 15, Claim 9, Line 20, replace "comprising;" with -- comprising: --

UNITED STATES PATENT AND TRADEMARK OFFICE
CERTIFICATE OF CORRECTION

PATENT NO. : 7,360,595 B2
APPLICATION NO. : 10/142817
DATED : April 22, 2008
INVENTOR(S) : Joseph A. Zupanick It is certified that error appears in the above-identified patent and that said Letters Patent is hereby corrected as shown below:

Column 15, Claim 10, Line 33, replace "coulded" with -- coupled --

Column 15, Claim 15, Line 57, replace "comprising;" with -- comprising: --

Column 16, Claim 18, Line 32, replace "desposit" with -- deposit --

Column 16, Claim 19, Line 35, after "injecting", insert -- a --

Column 16, Claim 22, Line 66, replace "recovery" with -- recovering --

Column 17, Claim 24, Line 7, replace "injecting" with -- injection --

Column 17, Claim 26, Line 28, after "into", delete -- to --

Column 17, Claim 27, Line 46, after "into", delete -- to --

Column 17, Claim 28, Line 54, after "minerals,", insert -- further --

Column 17, Claim 28, Line 67, after "into", delete -- to --

Column 18, Claim 30, Line 19, replace "wherein" with -- where --

Column 18, Claim 31, Line 32, delete "and" and insert paragraph -- wherein injecting a treatment solution into an underground formation comprises injecting the treatment solution through an injection bore, the injection bore and the recovery bore in communication with a common bore, and concurrently blocking flow from the common bore into to the recovery bore; --

UNITED STATES PATENT AND TRADEMARK OFFICE
CERTIFICATE OF CORRECTION

PATENT NO.       : 7,360,595 B2
APPLICATION NO.  : 10/142817
DATED            : April 22, 2008
INVENTOR(S)      : Joseph A. Zupanick It is certified that error appears in the above-identified patent and that said Letters Patent is hereby corrected as shown below:

Column 18, Claim 31, Line 43, replace "fliuds" with -- fluids --

Column 18, Claim 32, Line 52, replace "boreble" with -- borehole --

Signed and Sealed this

Twentieth Day of January, 2009

JON W. DUDAS
*Director of the United States Patent and Trademark Office*